(12) United States Patent
Roeper et al.

(10) Patent No.: US 12,135,015 B2
(45) Date of Patent: Nov. 5, 2024

(54) WIND TURBINE ICE PROTECTION SYSTEM

(71) Applicant: FabricAir Canada Inc., Waterloo (CA)

(72) Inventors: Daniela Roeper, Waterloo (CA); Dylan James Baxter, Waterloo (CA); Riley Doering, Waterloo (CA); Jonathan Parkin, Vancouver (CA); Carl Saunders, Waterloo (CA); Rafael Vanegas, Waterloo (CA); Marcus Laferriere, Markham (CA)

(73) Assignee: FabricAir Canada Inc., Waterloo (CA)

( * ) Notice: Subject to any disclaimer, the term of this patent is extended or adjusted under 35 U.S.C. 154(b) by 0 days.

(21) Appl. No.: 17/560,507

(22) Filed: Dec. 23, 2021

(65) Prior Publication Data
US 2022/0195993 A1    Jun. 23, 2022

Related U.S. Application Data

(60) Provisional application No. 63/210,548, filed on Jun. 15, 2021, provisional application No. 63/129,802, filed on Dec. 23, 2020.

(51) Int. Cl.
*F03D 80/40*    (2016.01)
*F03D 1/06*    (2006.01)
(Continued)

(52) U.S. Cl.
CPC .......... *F03D 80/40* (2016.05); *F03D 1/0675* (2013.01); *F03D 17/00* (2016.05); *F03D 80/402* (2023.08);
(Continued)

(58) Field of Classification Search
CPC ........ F03D 80/40; F03D 80/00; F03D 1/0675; F03D 17/00; F03D 1/0658; F03D 80/82
See application file for complete search history.

(56) References Cited

U.S. PATENT DOCUMENTS 6,619,918 B1    9/2003    Rebsdorf
7,476,985 B2    1/2009    Gonzalez
(Continued)

FOREIGN PATENT DOCUMENTS

CA    2916300 C    * 10/2018    .......... F03D 1/0675
CN    205154494 U    * 4/2016
(Continued)

OTHER PUBLICATIONS

English translation of CN111749857A (Year: 2020).*
(Continued)

*Primary Examiner* — Woody A Lee, Jr.
*Assistant Examiner* — Wesley Le Fisher
(74) *Attorney, Agent, or Firm* — Own Innovation Inc.; James W. Hinton; Kent C. Howe

(57) ABSTRACT

Wind turbine ice protection systems and methods are provided. An ice protection system for heating a wind turbine blade includes: a heater disposed in an interior of the wind turbine blade, the heater for heating air; a blower disposed in the interior of the wind turbine blade and for moving the air across the heater to generate a heated airflow; a duct disposed in the interior of the wind turbine blade, the duct for receiving the heated airflow and releasing the heated airflow into the interior of the wind turbine blade; and an electrical control subsystem disposed in the wind turbine for controlling one or more components of the ice protection system.

20 Claims, 32 Drawing Sheets

(51) Int. Cl.
*F03D 17/00* (2016.01)
*F03D 80/60* (2016.01)
*F03D 80/80* (2016.01)

(52) U.S. Cl.
CPC ............. *F03D 80/60* (2016.05); *F03D 80/82* (2016.05); *F05B 2260/20* (2013.01); *F05B 2260/80* (2013.01); *F05B 2270/304* (2013.01); *F05B 2270/323* (2013.01); *F05B 2270/325* (2013.01)

(56) References Cited

U.S. PATENT DOCUMENTS

| | | | |
|---|---|---|---|
| 8,463,085 | B2 | 6/2013 | Cribbs |
| 9,518,561 | B2 * | 12/2016 | De Boer ................ F03D 80/40 |
| 9,631,605 | B2 * | 4/2017 | Neubauer ............ F03D 1/0658 |
| 9,784,241 | B2 | 10/2017 | Blom et al. |
| 10,371,123 | B2 | 8/2019 | Kammer |
| 10,428,802 | B2 * | 10/2019 | Cuoghi ................ F03D 1/0675 |
| 10,458,396 | B2 * | 10/2019 | Philipsen ............. F03D 80/40 |
| 10,502,192 | B2 * | 12/2019 | Zhao .................... F03D 1/0675 |
| 10,590,913 | B2 * | 3/2020 | Gaile .................... F03D 7/0224 |
| 10,823,152 | B2 * | 11/2020 | Roeper ................. F03D 80/40 |
| 10,830,215 | B2 * | 11/2020 | Zhao .................... F03D 80/40 |
| 10,927,821 | B2 * | 2/2021 | Badger ................. F03D 80/40 |
| 11,156,203 | B2 * | 10/2021 | Schuring Roelof .... F03D 13/00 |
| 11,506,183 | B2 * | 11/2022 | Xing .................... F03D 1/0675 |
| 11,639,708 | B2 * | 5/2023 | Schmid ................ F03D 80/50 416/211 |
| 2013/0101414 | A1 | 4/2013 | Weitkamp et al. |
| 2013/0243594 | A1 | 9/2013 | Skovby |
| 2013/0259686 | A1 | 10/2013 | Blom et al. |
| 2014/0178195 | A1 | 6/2014 | Blom et al. |
| 2014/0265329 | A1 | 9/2014 | Jensen |
| 2016/0312766 | A1 * | 10/2016 | Rasmussen ............ F03D 13/30 |
| 2019/0063407 | A1 * | 2/2019 | Roeper ................. F03D 80/40 |
| 2020/0355160 | A1 * | 11/2020 | Rogers ................. F03D 1/0675 |
| 2021/0079884 | A1 * | 3/2021 | Schmid ................. F03D 80/50 |
| 2022/0074392 | A1 * | 3/2022 | Oliver .................... F03D 17/00 |

FOREIGN PATENT DOCUMENTS

| | | | | |
|---|---|---|---|---|
| CN | 107905962 | A * | 4/2018 | ............ F03D 80/00 |
| CN | 109611290 | A * | 4/2019 | ............ F03D 17/00 |
| CN | 111749857 | A * | 10/2020 | |
| DE | 19644355 | A1 * | 4/1998 | ............ F03D 80/40 |
| DE | 102010051293 | A1 | 5/2012 | |
| EP | 2626557 | A1 * | 8/2013 | ............ F03D 80/40 |
| EP | 3189232 | A1 | 7/2017 | |
| EP | 2110551 | B2 | 2/2019 | |
| EP | 3690234 | A1 | 8/2020 | |
| EP | 3708830 | A1 | 9/2020 | |
| EP | 3719475 | A1 | 10/2020 | |
| WO | WO-2014202164 | A1 * | 12/2014 | .......... F03D 1/0675 |
| WO | 2017147698 | A2 | 9/2017 | |
| WO | 2020120018 | A1 | 6/2020 | |
| WO | WO-2020125895 | A1 * | 6/2020 | ............ F03D 17/00 |

OTHER PUBLICATIONS

English translation of WO2014202164A1 (Year: 2014).*
English translation of DE19644355A1 (Year: 1998).*
English translation of CN109611290A (Year: 2019).*
English translation of CN205154494U (Year: 2016).*
English translation of CN107905962A (Year: 2018).*
European Patent Office, Extended European Search Report for EP21020654.6, May 13, 2022, 9 pages.

* cited by examiner

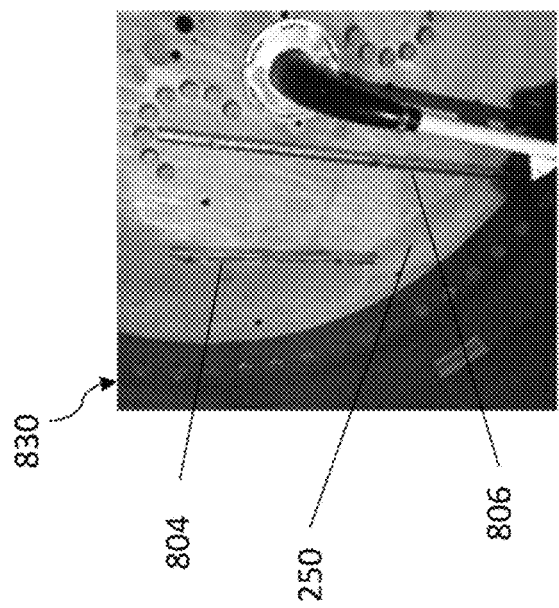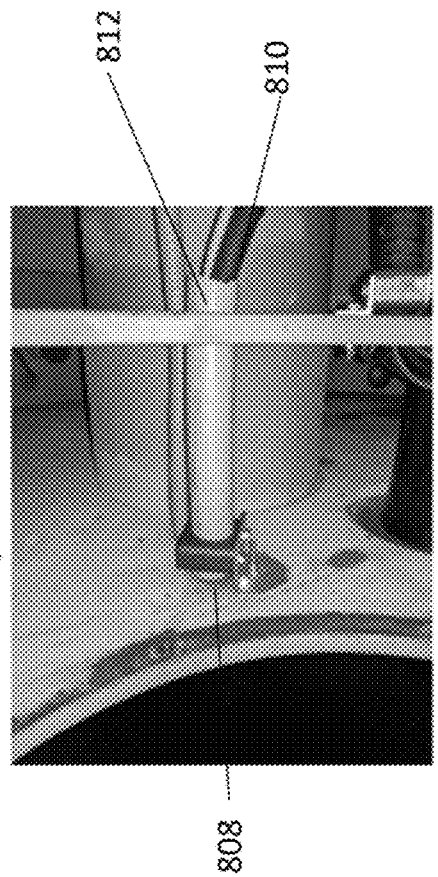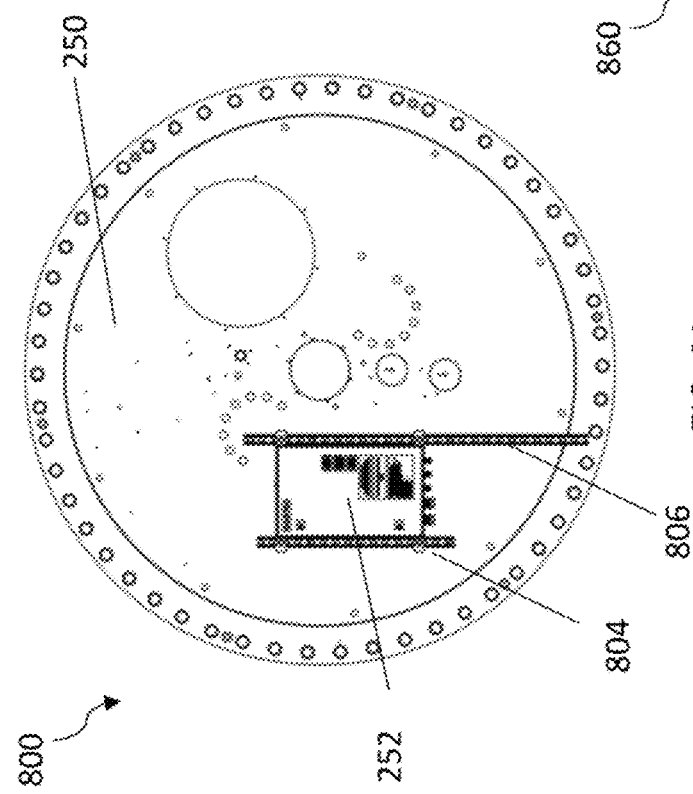
FIG. 8B
FIG. 8C
FIG. 8A

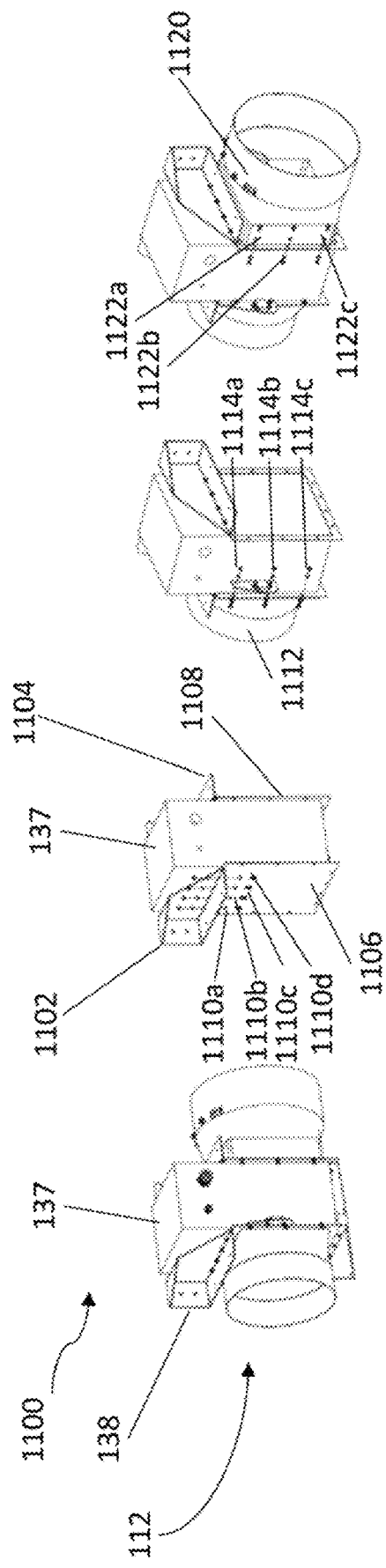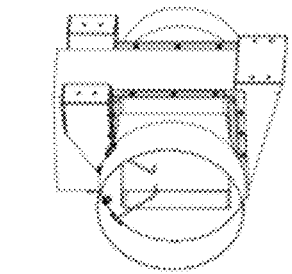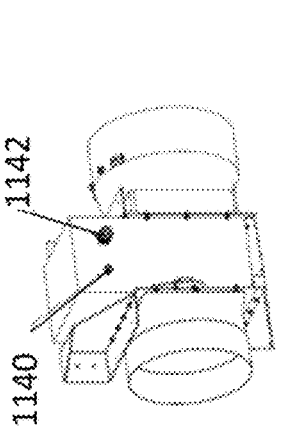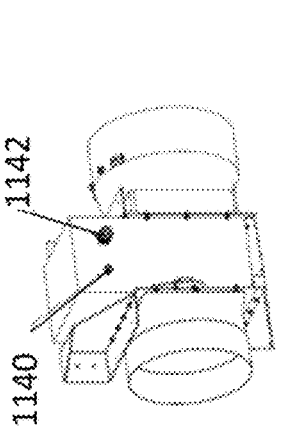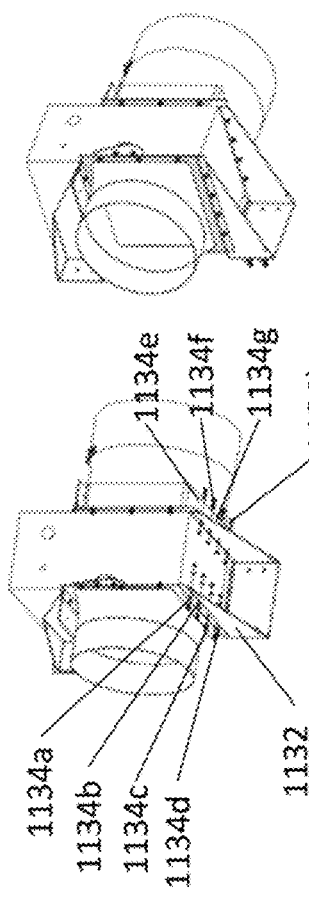

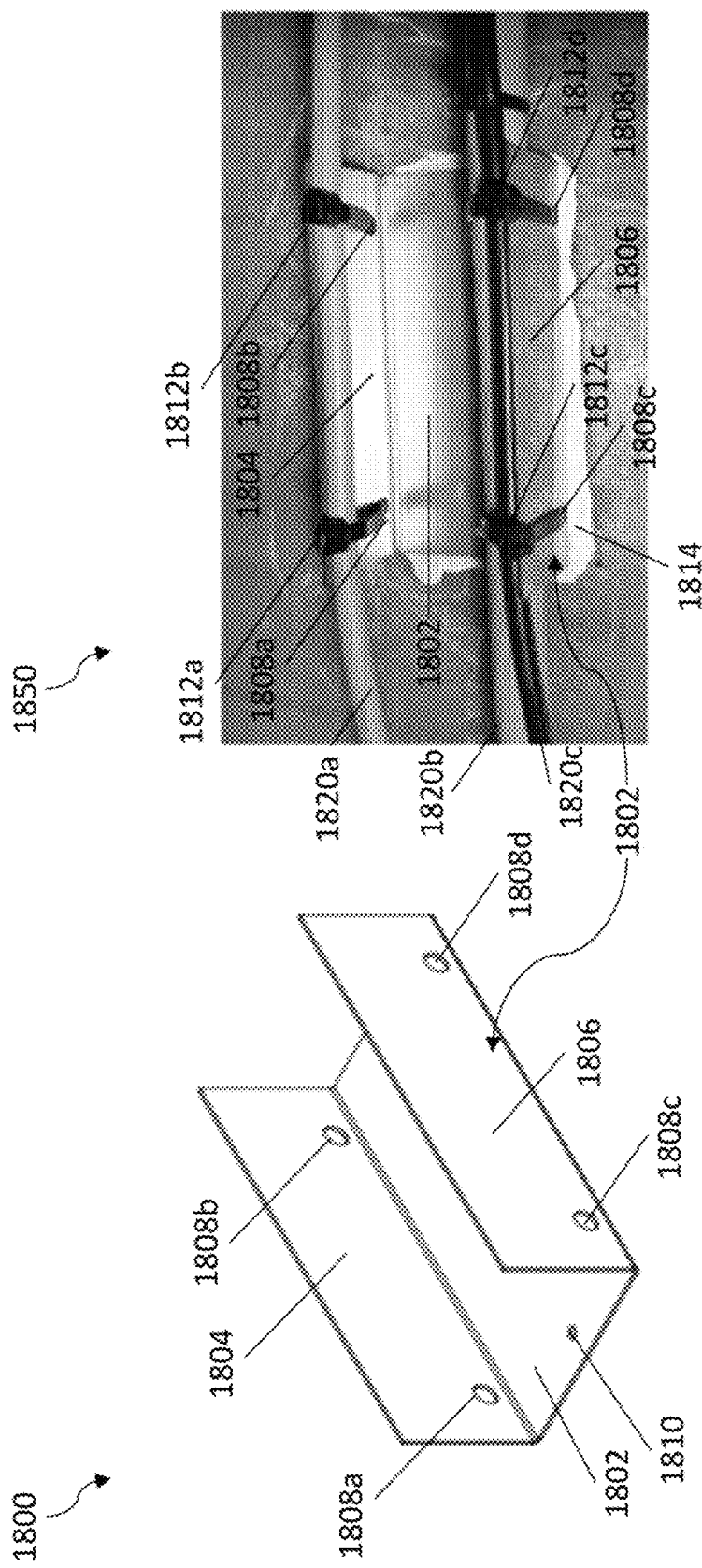

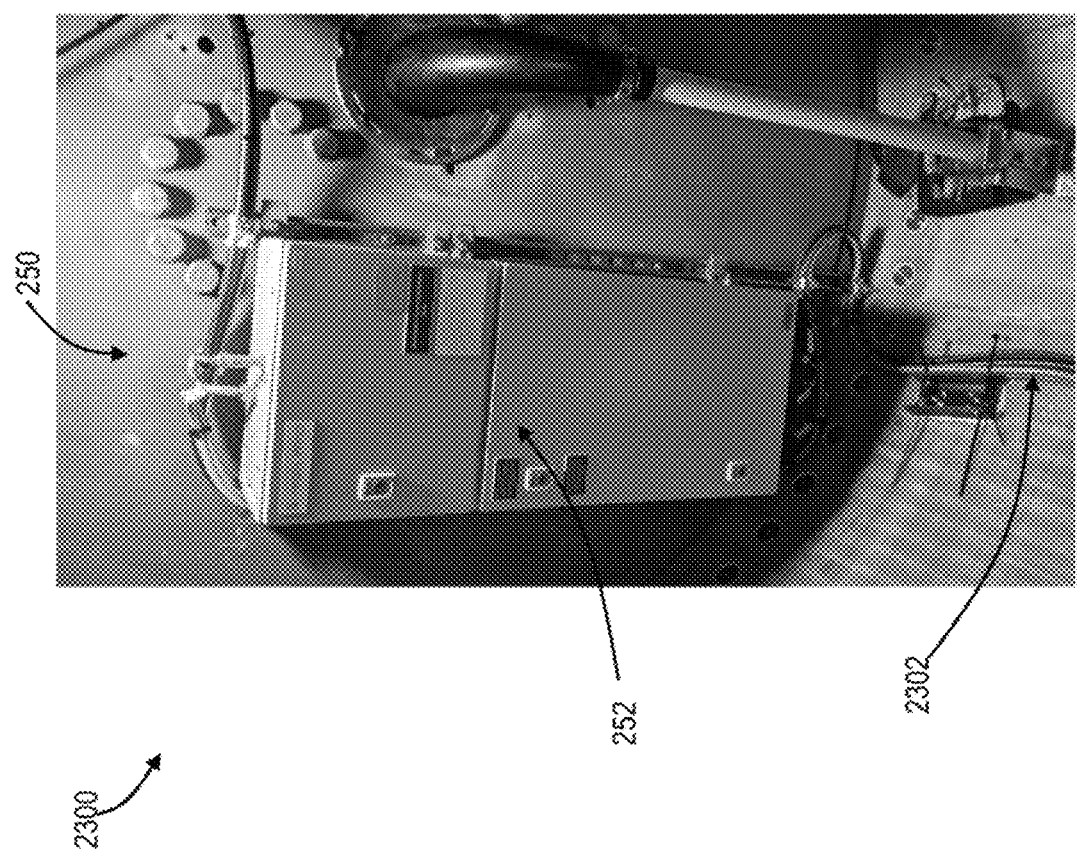

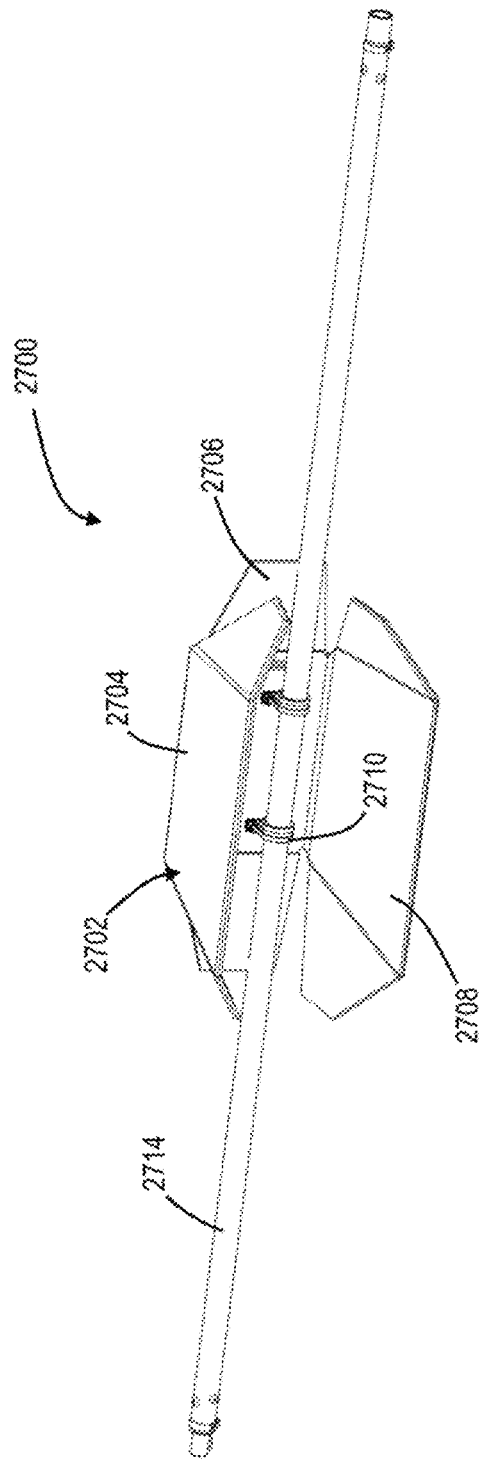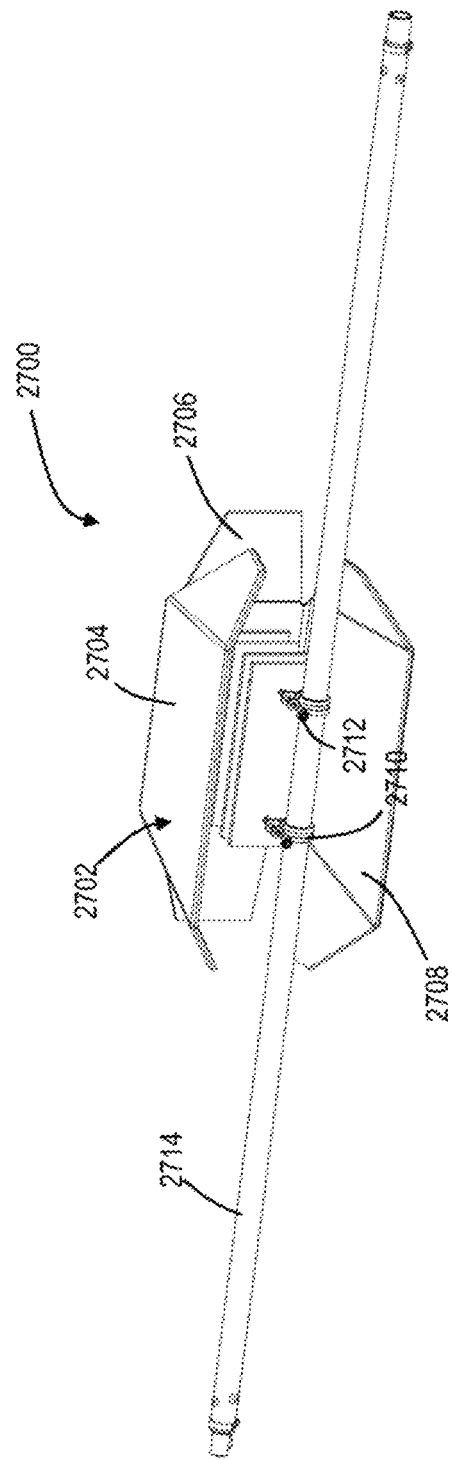

WIND TURBINE ICE PROTECTION SYSTEM

TECHNICAL FIELD

The embodiments disclosed herein relate to wind turbine subsystems, and, in particular to ice protection systems and methods for use in wind turbines.

INTRODUCTION

Wind resources for wind energy production may be located in cold, humid regions where ice may form on a blade of a wind turbine. Wind turbine blade icing may cause several problems for the operation of the wind turbine such as measurement error, prolonged power loss, mechanical failure, and safety hazards. Based on the profile of the blade, a critical area of icing may occur on the most distal third of the blade along the leading edge. The most distal third of the blade has the highest relative velocity and is therefore more likely to have ice buildup. Accordingly, it may be desirable to have a wind turbine blade ice protection system.

Conventional anti-icing systems may include the use of external coatings and paints. Further, conventional de-icing systems are often directly built into the blade during the manufacturing process of the blade. A retrofit of an existing blade involves a consideration of parameters such as energy, effect of additional mass of the system, and difficulty and cost of installation (as a retrofit). For example, these parameters indicate that a device embedded within fiberglass layers of the wind turbine blade may be unsuitable for retrofit for an existing wind turbine. Further, installation costs are a factor to be considered for externally installed devices. Fluids and machines on the blade may alter the dynamics of the system, especially as mass moves closer to the tip. Adding an ice protection system to the exterior of the blade may result in losses in power generation due to changes in aerodynamic properties of the blade that may outweigh benefits of recaptured power after icing events. Additionally, the external ice protection systems are exposed to harsh environmental conditions and erosion due to air and airborne objects, requiring frequent maintenance to maintain effectiveness.

In the aviation industry, various wing anti-icing and de-icing approaches have been considered and adopted over the past century. Methods for wing anti-icing and de-icing may include the use of anti-freeze sprays (e.g. ethylene glycol spray), pneumatic boots, and hot bleed air circulation.

Ethylene-glycol spray has been used on airplane wings as an anti-freeze spray. However, ethylene glycol spray does not de-ice, it only prevents ice formation, and only for a limited time period (e.g. 15 minutes). Such limited operative time periods work in aviation applications as the anti-freeze provides just enough time for the airplane to reach the upper atmosphere where icing is less severe. In contrast, the use of such an anti-freeze system in wind turbine applications would likely require the continuous supply of ethylene glycol spray, making the practice impractical and/or unsustainable.

Pneumatic boots use inflatable rubber strips on the leading edge of the wing blade. These methods offer alternatives to shedding ice without the energy-demanding method of providing heat to the iced regions. Although pneumatic boots may be successfully employed in the aviation industry, they are not perfect and fail to satisfy some of the specifications of wind turbines.

In the aviation industry, hot air systems are used as anti-icing systems and not as de-icing systems because the losses due to convection are significant at high airspeeds.

In wind turbines, conventional or existing approaches to ice prevention or removal may fall short due to exceeding the available electrical energy capacity. Additionally, in many cases conventional systems either cannot be installed in the wind turbine or are extremely costly to implement as a retrofit.

Therefore, it may be desirable to have an improved wind turbine blade ice protection system that may provide a retrofit to existing blades.

Accordingly, ice protection systems and methods for wind turbines are desired that overcome at least some of the disadvantages of existing techniques.

SUMMARY

There is provided an ice protection system for heating a wind turbine blade of a wind turbine. The system includes a heater disposed in an interior of the wind turbine blade, the heater for heating air; a blower disposed in the interior of the wind turbine blade and for moving the air across the heater to generate a heated airflow; a duct disposed in the interior of the wind turbine blade, the duct for receiving the heated airflow and releasing the heated airflow into the interior of the wind turbine blade; and an electrical control subsystem disposed in the wind turbine for controlling one or more components of the ice protection system.

The electrical control subsystem may include a hub input-output ("IO") panel mounted to an interior surface of a hub of the wind turbine.

The electrical control subsystem may include a power distribution panel mounted to an interior surface of a hub of the wind turbine.

The electrical control subsystem may include a transformer panel mounted to an interior surface of a hub of the wind turbine.

The electrical control subsystem may include a nacelle panel magnetically mounted to an interior surface of a nacelle of the wind turbine.

The nacelle panel may be mounted to the interior surface of the nacelle magnetically.

The electrical control subsystem may include a blade control panel mounted to a bearing plate of the wind turbine.

The blade control panel may be mounted to a hub-facing side of the bearing plate.

The blade control panel may be mounted to a blade-facing side of the bearing plate.

The blade control panel may be mounted to the bearing plate magnetically.

The blade control panel may control any one or more of which power lines are connected inside the wind turbine blade, how much electricity is being used by the wind turbine blade, and which components of the ice protection system are on.

The electrical control subsystem may include a blade junction box with the interior of the wind turbine blade and configured to receive signals from at least one sensor in the wind turbine blade and transmit sensor data towards a blade control panel.

The blade junction box may be mounted on a shear web in the interior of the wind turbine blade between the blower and the heater and above an airway of the duct.

In another aspect, there is provided an ice protection system for heating a wind turbine blade. The system includes a heater disposed in an interior of the wind turbine blade, the heater for heating air; a blower disposed in the interior of the wind turbine blade and for moving the air across the heater to generate a heated airflow; a duct disposed in the interior of the wind turbine blade, the duct for receiving the heated airflow and releasing the heated airflow into the interior of the wind turbine blade. The duct has a proximal end and a distal end, and the duct includes a plurality of duct outlets positioned between the proximal end and the distal end of the duct.

The duct may comprise a plurality of duct sections connected together to form a continuous duct.

The plurality of duct sections may be connected using any one or more of a mechanical fastener and an adhesive.

The duct may include a nozzle at an end proximal to a tip of the wind turbine blade for releasing the heated airflow into a pressurized air pocket and generating force convection.

The nozzle may be pointed towards the tip of the wind turbine blade, towards a leading edge of the wind turbine blade, or at some angle between the tip and the leading edge.

The duct may include a plurality of duct outlets for releasing heated airflow into the interior of the wind turbine blade.

The duct may be secured to a shear web of the wind turbine blade at about a 12 o'clock position of the duct, and the plurality of duct outlets may be positioned to release air towards a 6 o'clock position of the duct.

The duct may be attached or attachable to the wind turbine at a plurality of attachment points defining an attachment line that extends along a length of the duct and the plurality of duct outlets may be positioned to release the heated airflow generally opposite the attachment line.

The plurality of duct outlets may include a first row of duct outlets extending longitudinally along a first side of the duct and a second row of duct outlets extending longitudinally along a second side of the duct, the first and second sides defined by a plane extending from the attachment line through the interior of the duct and bisecting the duct longitudinally into the first and second sides.

The duct may comprise a plurality of longitudinally arranged portions and the portion of the duct nearest the heater may be impermeable.

The plurality of duct outlets may include a first row of duct outlets extending along a length of the duct at an approximately 5:50 o'clock position of the duct and a second row of duct outlets extending along the length of the duct at an approximately 6:10 o'clock position of the duct.

A portion of the duct near the heater may be impermeable.

The plurality of duct outlets may include a subset of duct outlets located in a distal third of the wind turbine blade when the duct is installed in the wind turbine.

The duct may be a flexible duct supported by internal pressure provided by the blower.

The flexible duct may be structurally reinforced in at least one of the duct sections to prevent motion or wear when the duct is not inflated.

The flexible duct may be rigidly connected to a spar or a shear web of the wind turbine blade.

The blower may be mounted to the bearing plate.

The blower may be mounted to a shear web of the wind turbine blade.

The blower may be mounted to a trailing edge of the shear web of the wind turbine blade.

The blower may be mounted to a leading edge of the shear web of the wind turbine blade.

The blower may be configured to perform at least one of pulling air from a shear web gap or send air down the shear web gap.

The blower may be configured to pull air from any one or more of an interior of a hub of the wind turbine blade, an interior of a nacelle of the wind turbine blade, and generator exhaust to reduce the amount of heat energy needed to reach a positive temperature.

Each of the plurality of duct sections may be dimensioned such that a length of each respective one of the plurality of duct sections is no longer that a length of an accessible region of the wind turbine blade.

The plurality of duct outlets may be perforations in the duct.

The plurality of duct outlets may be positioned in such a way as to direct the heated airflow towards a high ice concentration area of the wind turbine blade.

The plurality of duct outlets may be positioned such that heat airflow released via the plurality of duct outlets is directed to a leading edge of the wind turbine blade.

The duct may terminate at a blade tip of the wind turbine blade.

The duct may be attached to a shear web of the wind turbine blade and the duct may terminate at a distal end of the shear web.

The duct may include a nozzle at a distal end of the duct for pushes the heated airflow into a gap between the distal end of the duct and blade tip of the wind turbine blade.

The nozzle may have a nozzle aperture having a diameter that is smaller than a cross-sectional diameter of the duct.

The nozzle aperture may be directed towards a blade tip of the wind turbine blade, a leading edge of the wind turbine blade, or a blade interior surface between the blade tip and the leading edge.

The plurality of duct outlets may be positioned circumferentially on the duct to direct the heated airflow towards a leading edge of the wind turbine blade.

The plurality of duct outlets may be positioned on the duct in two rows positioned at approximately 175° and 185° clockwise from a point at which the duct is connected to the wind turbine blade.

The plurality of duct outlets may be positioned along a length of the duct to facilitate release of the heated airflow out of the duct at a plurality of locations along the length of the duct and thus to a plurality of locations along a length of the wind turbine blade. The plurality of duct outlets may be concentrated in a distal third portion of the wind turbine blade when the duct is installed in the wind turbine blade.

The plurality of duct outlets may be concentrated in a proximal third portion of the wind turbine blade.

There may be provided a spine for providing structural support along a length of the duct, a duct support assembly for providing mounting and circumferential support, and a duct tip constraint for supporting and constraining a distal end of the duct.

The spine may comprise a plurality of spine sections connected together to form the spine.

The duct support assembly may comprise a rib cage structure.

The rib cage may be composed of PVC piping, ABS sheets, or PEX piping.

In another aspect, there is provided an ice protection system for heating a wind turbine blade. The system includes a heater disposed in an interior of the wind turbine blade, the heater for heating air; a blower disposed in the interior of the wind turbine blade and for moving the air across the heater to generate a heated airflow; a duct disposed in the interior of the wind turbine blade, the duct for receiving the heated airflow and releasing the heated airflow into the interior of the wind turbine blade; and a control system for controlling operation of the ice protection system. The control system includes a sensor subsystem including at least one sensor for collecting sensor data and a processing unit connected to the sensor subsystem and for generating a control signal based on the sensor data, the control signal for adjusting an operating state of at least one component of the ice protection system.

The control system may monitor an environmental condition. The environmental condition may be of an interior environment of the wind turbine blade. The environmental condition may be of an exterior environment of the wind turbine blade.

The at least one component may include the blower.

The at least one component may include the heater.

The at least one sensor may include any one or more of an accelerometer, a temperature sensor, and an air pressure sensor.

The at least one sensor may include a temperature sensor configured to measure a temperature of air leaving the blower.

The at least one sensor may include a sensor configured to collect performance output data of the wind turbine. The processing unit may be configured to analyze the performance output data to determine a performance output of the wind turbine.

The control system may be configured to control operation of the ice protection system based on an RPM measurement of the wind turbine and measure wind speed data.

The processing unit may be configured to initiate or increase an output of the ice protection system upon determining that the wind turbine blade is below a reference temperature based on data provided by the sensor subsystem.

The processing unit may be configured to initiate or increase an output of the ice protection system upon determining that a threshold level of ice has accumulated on an exterior surface of the wind turbine blade based on data provided by the sensor system.

The processing unit may be configured to initiate or increase an output of the ice protection system upon determining that the wind turbine is producing less energy than expected based on a known wind speed.

The processing unit may be configured to initiate or increase an output of the ice protection system upon determining that the wind turbine is producing too much energy.

The processing unit may be further configured to generate an electronic notification upon generating the control signal and send the electronic notification to a technician device.

Other aspects and features will become apparent, to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification.

FIG. 8A is a front view schematic diagram of a bearing plate with a mounted bearing plate panel and Unistrut rails, in accordance with an embodiment;

FIG. 8B is a photograph of a bearing plate with mounted Unistrut rails, in accordance with an embodiment;

FIG. 8C is a photograph of an armored bundle of cables passing through a bearing plate, in accordance with an embodiment;

FIGS. 11A to 11H are schematic diagrams of a heater in various stages of assembly and from various perspectives, in accordance with an embodiment;

FIG. 18A is a schematic diagram of a cable tray, in accordance with an embodiment;

FIG. 18B is a photograph of a cable tray, in accordance with an embodiment;

FIG. 23 is a photograph illustrating a blade-side view of a blade control panel mounted in a wind turbine blade, according to an embodiment;

FIGS. 27A and 27B are a schematic diagram of a C-shaped duct support in non-exploded and exploded views, according to an embodiment;

DETAILED DESCRIPTION

Figure 1:
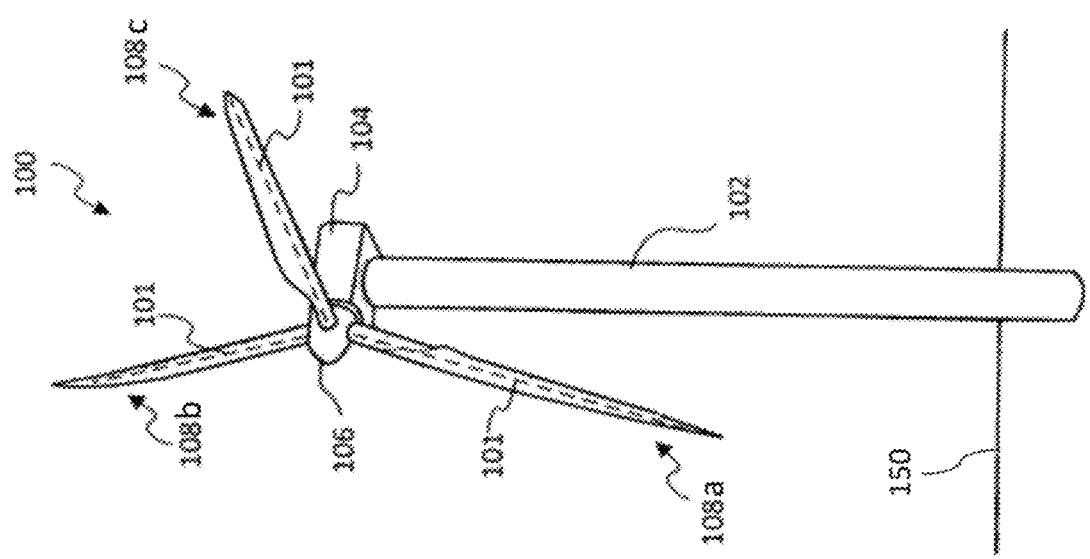
FIG. 1 is schematic diagram of a wind turbine, in accordance with an embodiment.

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below.

The various embodiments described herein generally relate to ice protection methods and systems for a wind turbine blade. The present disclosure also provides systems and methods for mounting, installing, and supporting the ice protection system.

The systems and methods described herein provide an "ice protection" function for a wind turbine blade. "Ice protection" as used herein refers to protecting a wind turbine from negative effects of ice and includes "de-icing" and "anti-icing" functions. "De-icing" refers to the removal of ice from the wind turbine blade. "Anti-icing" refers to the prevention of ice formation on the wind turbine blade. That is, the ice protection systems of the present disclosure may be used to prevent ice from forming on a wind turbine blade and/or to remove ice that has already formed on a wind turbine blade. The ice protection system may include sensors which monitor environmental conditions of the wind turbine to turn on anti-icing functions, sensors which monitor the exterior of the wind turbine to turn on ice build-up removal, or both. The ice protection systems described herein protect the wind turbine from the negative effects of ice and may operate for both de-icing and anti-icing functions. The ice protection system may include sensors which monitor environmental conditions to compare historical weather events, forecasted weather events, or both in order to curtail the turbine, stop the turbine, set the turbine yaw position, set the turbine roll position, set the turbine pitch position, or any combination thereof with the final goal of reducing the amount of ice accumulation during an icing event, reducing the thermal load on the ice protection system, or both. Curtailing the turbine decreases the wind speed across the blades and may reduce the likelihood of ice accumulation. This same effect (but exaggerated) can be seen when stopping the turbine. This may only be beneficial if the curtailment is less than the power loss that would have occurred under a "full icing event". Stopping the turbine also increases the risk of ice accumulating in areas which the ice protection system may be less efficient, such as on the trailing edge. Yawing the turbine out of the wind may prevent ice accumulating on the leading edge and drastically reduce the heat loss on the exterior of the blade. Setting the turbine roll position may be beneficial. Pointing a blade towards the ground may shelter the blade from the higher winds above. Pointing a blade towards the sky may encourage heated air inside the blade to reach and stay at the tip of the blade (further enhancing the tip-to-root, heating direction).

The ice protection systems of the present disclosure may be integrated within an existing communication network of the wind turbine.

Discussed herein are various components of an ice protection system and various installation practices for the components. It is to be understood that these installation practices may vary for different makes and models of wind turbines.

It is also to be understood that the installation process of the ice protection system may occur at manufacture of the wind turbine or at other such time before deployment to a working location, at initial installation of the wind turbine at a working location, or as a retrofit of a wind turbine (i.e. of a wind turbine already in use). Different components may also be required based on which of these milestones the system is installed during.

Installation of the ice protection system may occur when a blade is grounded (e.g. about to be assembled onto the tower for the first time). Installation of the ice protection system may occur during blade manufacturing (e.g. before the top half of the blade is moulded or before the bearing plate is attached). In such a case, the installer may have access to the inaccessible region of the blade (i.e. inaccessible when assembled) and may be able to install a system in this location which can aid in supporting a fabric duct. For example, the system may include a clothesline-type system where the fabric duct can be sent to the tip of the blade like a curtain. In another example, a rail system may be used so the fabric duct may be clipped to rollers and pushed towards the tip of the blade.

It is also to be understood that the order of the discussion about various components herein should not be taken as any indication as the order of installation or commissioning of the various components.

Broadly, the ice protection system discussed herein includes a heating system for heating an interior of the wind turbine blade and preventing or removing ice, a control system for controlling the components of the heating system, and an electrical system for providing power to electrical components of the heating system and control system. The ice protection system may include a plurality of heating systems, with one heating system in each blade of the wind turbine.

In an embodiment, a heating system includes a heater attached to an interior surface of the respective wind turbine blade, a blower for moving air across the heater to generate a heated airflow, a flexible duct to receive the heated airflow and distribute the heated airflow into an interior cavity of the wind turbine blade, a spine attached to the flexible duct, an interior surface of the wind turbine to support the flexible duct, and one or more duct supports attached to the spine which support the flexible duct.

In an embodiment, the control system includes at least one control panel, one or more sensors configured to monitor internal and/or external environmental conditions of the wind turbine blade, and control cables to connect the control system to the heating system. The control system receives information from the sensors and determines an operating state of the heating system. The operating state may be an on state or an off state. The operating state may also be a "cool down" state or a "start up" state. The "cool down" state turns off all heated elements but keep the blowers powered so that the air is circulated inside the blade until the heater elements reach a lower temperature. The "start-up" state staggers the starting time for electrical elements to accommodate for large electrical current requirements to start up the blowers and prevent over-current events which would cause fuses or circuit breakers to break. The operation modes may include heat single, heat alternate, heat all. The operating state may include additional information such as an operating level of the heating system (e.g. a temperature of air, an electrical current used, a number and identity of electric contractors engaged). The control system is further configured to generate a control signal based on the operating state determination. The control signal encodes instructions which, when received by the heating system, can be used to adjust an operating parameter of the heating system. The control system transmits the control signal to the heating system. In an embodiment, control system includes a sensor that is glued or otherwise attached to an inside surface of the blade to record a temperature of the blade material. This sensor may be located at a middle position (with respect to the distance from blade root to blade tip, and called a "mid-blade sensor"), or at the distal tip of the duct (attached to the duct or secured to the blade during manufacturing or with rope access technicians, and called a "tip sensor"), or behind the heater (a "rear-heater sensor"). The mid-blade and tip sensors are important for performance measurements (the sensor provides information on whether the heat from the heater is successfully transferring to the blade and towards the ice). The rear-heater sensor is used to provide information on whether the blade is experiencing temperatures near a safe limit of the blade (this may be the hottest spot in the system). The sensor components of the control system may be configured to monitor the external blade surface temperatures and ice thickness.

In an embodiment, the electrical system includes at least one electrical panel and a plurality of electrical cables. The electrical system provides power to the electrical components of the heating system and/or the control system. The electrical system may be an important part of the ice protection system as existing wind turbines do not generally have the capacity to power the added ice protection system using the components present in the wind turbine at manufacturing or commissioning. The electrical system is integrated with the existing wind turbine power system.

Reference will now be made to FIG. 1 which provides brief overviews of the components of an example wind turbine and an example heating system disposed in a wind turbine blade.

Referring now to FIG. 1, illustrated therein is a wind turbine 100 including an ice protection system 101, according to an embodiment.

The wind turbine 100 is used to convert wind energy into electric energy. In an embodiment, the wind energy may be kinetic energy. In this embodiment, the wind turbine 100 may use a mechanical electrical generator to perform the energy conversion.

The wind turbine 100 includes a tower 102, a nacelle 104, a hub (main shaft portion) 106, and a plurality of blades 108a, 108b, 108c (referred to generically as blade 108 and collectively as blades 108). The wind turbine 100 includes at least one blade 108. The tower 102 of the wind turbine 100 is physically connected to surface 150. The surface 150 may be ground. Ice 116, shown in FIGS. 2 and 3, may accumulate on an exterior surface 165 of the blades 108.

The hub 106, which includes a main shaft portion, is coupled to a power transmission shaft (not shown) and rotatably disposed on the nacelle 104.

The nacelle 104 houses electrical and mechanical components of the wind turbine 100.

In an embodiment, the ice protection system 101 includes a plurality of operating modes. The power in each of the blades 108 does not have to be equal in all operating conditions. The operating modes may have different power requirements. Depending on environmental conditions (which may be sensed by sensors described herein), one of the operating modes will be most efficient for removing ice and/or preventing ice accumulation. The operating modes include a first operating mode (or "heat all" operating mode) in which all blades are being heated and all blades draw power. The power per blade in the first operating mode may be ⅓ total available power. The operating modes include a second operating mode (or "heat single" operating mode) in which only one blade is heated at a time and each blade is heated sequentially. The power per blade in the second operating mode may be equal to total available power. The operating modes include a third operating mode (or "heat alternate" operating mode) in which two blades are heated at a time and the pairs of blades are heated sequentially. The power per blade in the third operating mode may be ½ total available power. In an embodiment, a current regulator may be used so that exactly ½ or ⅓ of total available power is being used. In an embodiment where the maximum power required in one blade is less than the total available power, the surplus power may be routed to an "off" blade to pre-heat it before heating or to keep it warm after heating.

Figure 2:
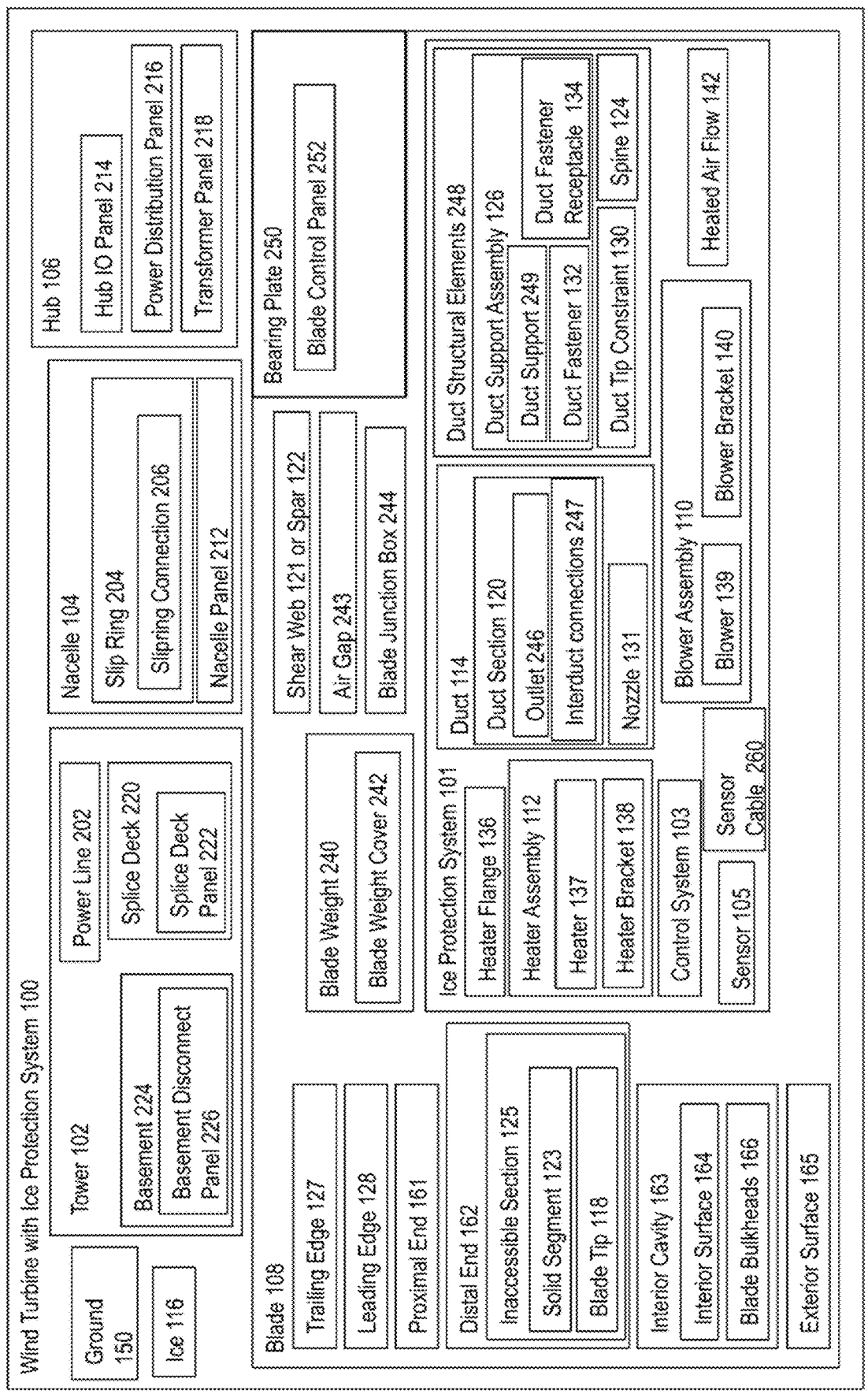
FIG. 2 is a block diagram of a wind turbine including an ice protection system, in accordance with an embodiment.
Figure 9:
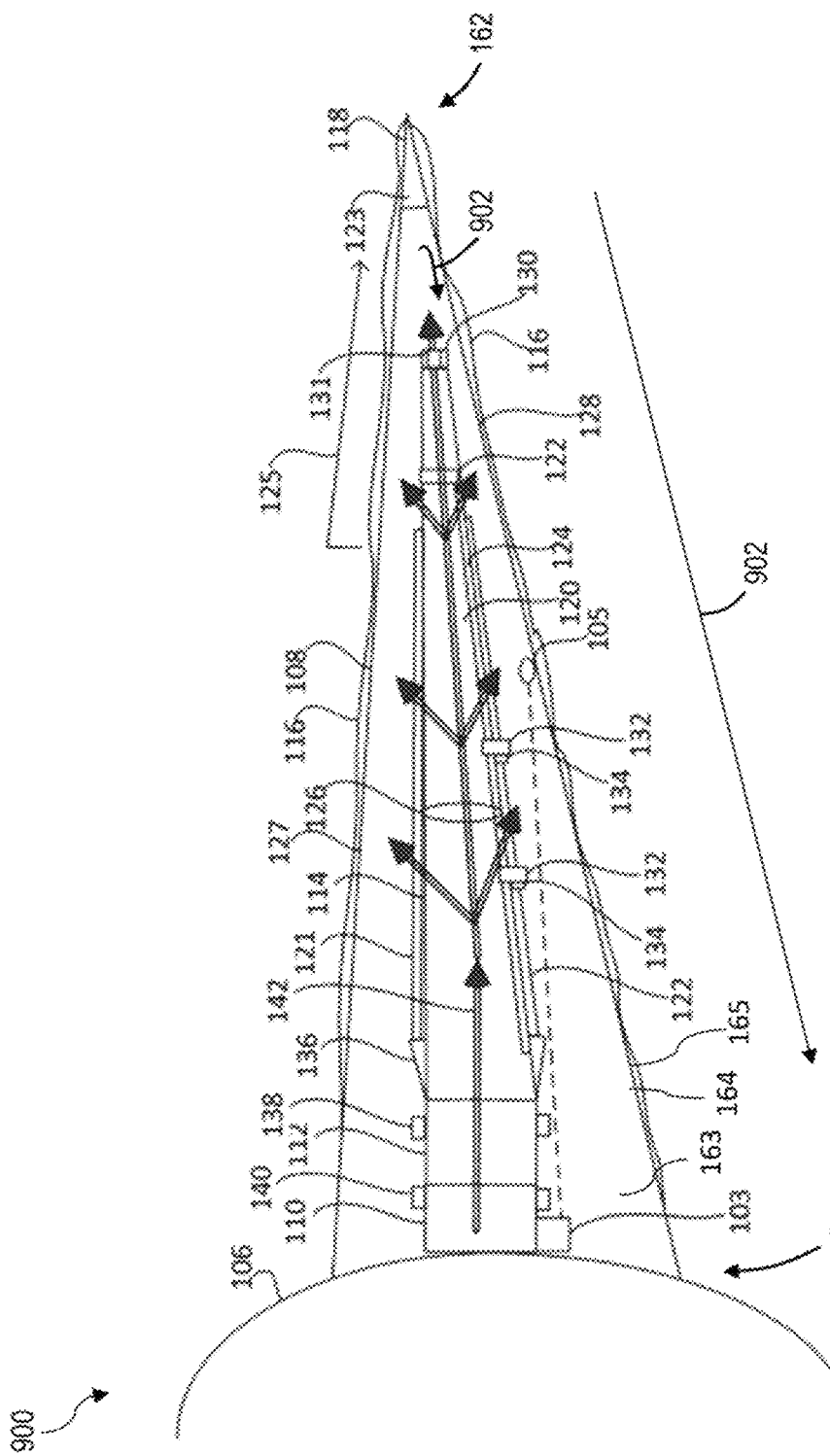
FIG. 9 is a cross-section view of a wind turbine blade including an ice protection system, in accordance with an embodiment.

Referring now to FIG. 2, shown therein is a block diagram illustrating the components of the wind turbine 100 including the ice protection system 101, in accordance with an embodiment. The ice protection system 101 is configured to perform ice protection for a wind turbine blade 108. The ice protection system 101 is not shown to scale. FIG. 9 is a schematic representation of a subset of the components of FIG. 2, according to an embodiment.

The Tower 102 of FIG. 1 includes a basement 224. The basement 224 is typically used to route ground-level cables, to anchor ground-level cabinets to a concrete pad, and to house some hydraulic components. The basement 224 may include a basement disconnect panel 226. The basement disconnect panel 226 may be mounted to a strut (which may be a custom strut).

In some embodiments, the wind turbine 100 power system may include a power line 202 for providing power capacity to the ice protection system 101. The power line 202 may be a high voltage cable. The power line 202 may be routed from the basement 220 through the tower 102 to the nacelle 104. The nacelle 104 includes a slipring 204 which maintains electrical connection with hub 106 during rotation to transmit power to the hub 106. The power line 202 runs from the basement 224 to the splice deck 220 where a high strength torsion cable connects the splice deck panel 222 to the nacelle panel 212. A torsion cable is used because as the turbine 100 yaws the torsion cable gets twisted.

In some embodiments, an upgrade to the power system may be made, particularly if the existing power system of the wind turbine 100 provides insufficient power to accommodate the ice protection system 101. The upgrade may include adding an additional power line and slipring connection to the existing components of the power system. In an embodiment, the additional power line may be run from the ground 150 to the hub 106 by winching the additional power line up through the interior of the tower 102. In another embodiment, the additional power line may be run from the basement 224 to the hub 106 by winching the additional power line up an exterior surface of the tower 102 and then feeding the additional power line back down to the basement 224. This embodiment may be preferred as it may require less time to implement than the previously described embodiment. The additional power line and additional slipring connection may be used exclusively by the ice protection system 101.

The nacelle 104 may have a nacelle panel 212 mounted within. The nacelle panel 212 is a control panel that facilitates functionality of the ice protection system 101 based on the input from sensors 105. The nacelle 104 may communicate with the hub 106 via wireless communication.

The Nacelle panel 212 may be plugged into one of multiple manufacturer nacelle panels. The nacelle panel 212 may pull 230V from the manufacturer nacelle panel cabinet. The nacelle panel 212 may also pull turbine data from the manufacturer nacelle panel cabinet AA3 (e.g. data such as the turbine rotation speed, generated power, external wind speed, external wind temperature, etc.). A nacelle cabinet of the nacelle panel 212 may also connect to a network of the wind-farm network via manufacturer nacelle panel. The system may further include a server at an operation maintenance (O&M) building at each site. The server may facilitate remote collection of data, pushing of software upgrades to the ice protection system, and allow a user to view and control how their systems are behaving. The server may be connected to the wind farm's local network (so that it can communicate with the wind turbines). The manufacturer nacelle panel cabinet may also be connected to this local network. Therefore, by connecting the Nacelle panel 212 of the ice protection system to the manufacturer nacelle panel cabinet, remote communication with the ice protection system can be facilitated.

Figure 3B:
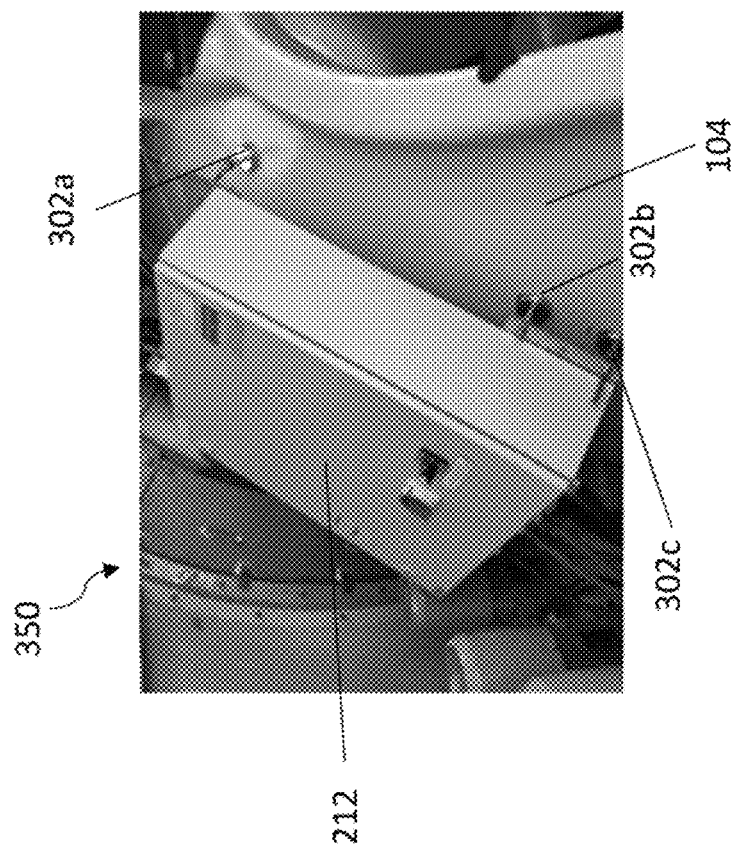
FIG. 3B is a photograph of a nacelle panel mounted in a nacelle, in accordance with an embodiment.
Figure 3A:
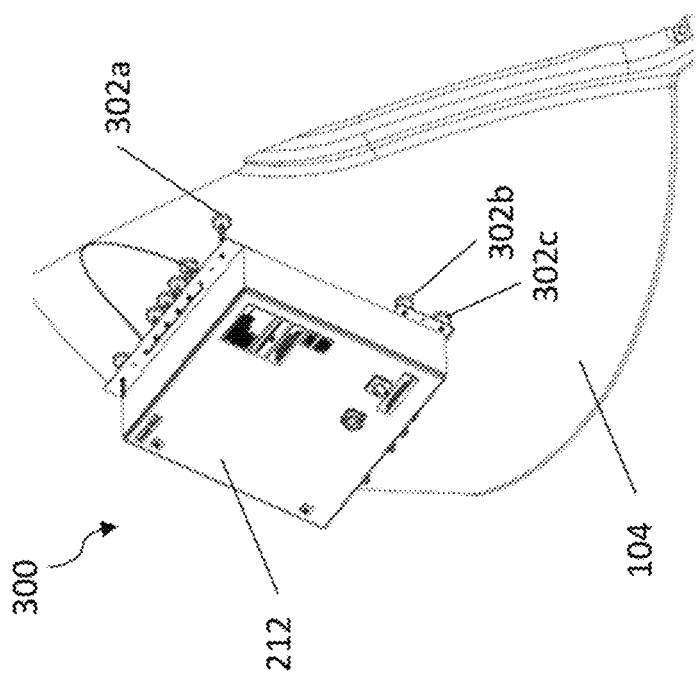
FIG. 3A is a schematic diagram of a nacelle panel mounted in a nacelle, in accordance with an embodiment.

Referring now to FIGS. 3A and 3B shown therein is a schematic diagram 300 and photograph 350, of the nacelle panel 212 of FIG. 2 mounted on the nacelle 104 of FIG. 1, according to an embodiment. In particular, FIG. 3A shows the nacelle panel 212 and mounting for a SWT3.2 G1.0 wind turbine design. Design changes may be implemented for another wind turbine design, such as a SWT3.2 G2.0 wind turbine design. The Nacelle panel 212 may be mounted in different locations in other wind turbine designs, such as an LM45 G1.0 design.

The nacelle panel may is mounted to an interior surface of the nacelle 104. The nacelle panel 212 of FIGS. 3A and 3B is mounted magnetically. In other embodiments, the nacelle panel 212 may be mounted using non-magnetic means, such as a mechanical fastener or the like. The nacelle panel 212 may be mounted in the nacelle 104 by magnets assemblies 302a, 302b, 302c (referred to generically as magnet assembly 302 and collectively as magnet assemblies 302). In one embodiment, the nacelle panel 104 is mounted by ten magnet assemblies 302. In other embodiments, the nacelle panel 104 may be mounted by more or fewer than ten magnet assemblies 302, or by other mounting means. The placement of the magnets assemblies 302 may vary in other embodiments.

Referring again to FIG. 2, the tower 102 may include a splice deck 220. The splice deck 220 divides the stationary part of the tower 102 from the rotating part (yaw rotation). The splice deck 220 has a panel whose function is to splice together a long tower cable that runs vertically up the tower 102, to a shorter torsion cable that can withstand high torque before breaking. The torsion cable is installed with slack and is commonly called "the cable drip" or "the cable drop". The system torsion cable follows pre-existing cable paths to minimize risk of wear on the system and the turbine. This subsystem allows the turbine 100 to yaw in a circle (north-east-south-west-repeat, or in the opposite direction) three or four times before it needs to unwind. The splice deck 220 may include a splice deck panel 222. The splice deck panel 222 may be mounted to a strut (which may be a custom strut) or floor mounted directly to the splice deck.

The basement disconnect panel 226 may be connected to the splice deck panel 222 via a cable (power line 202). The power line cable may be run from the basement 224 to the hub 106. Such a power line cable run may require a cable of approximately 100 m. The power line cable may be secured to the tower's 102 pre-existing cable ladder or cable trays.

The hub 106 may also include any one or more of a hub input/output (IO) panel 214 or a hub ethernet box, a power distribution panel 216, and a transformer panel 218. The panels 214, 216, 218 are used by the ice protection system. The internals of the panels 214, 216, 218 may be custom assembled.

The Hub IO panel 214 or hub ethernet box may accept all the data being collected between the blades 108 and the nacelle 104. The hub ethernet box accepts and distributes data between the blades 108 and the nacelle 104 via ethernet cables, whereas the Hub IO box 214 relies on voltage signals.

In an embodiment, the transformer panel 218 may be divided into three different transformers and placed in each blade control panel (bearing plate panel 252). The hub IO panel 214 may be downsized and components thereof divided into each blade control panel. The foregoing configurations of the transformer panel 218 and hub IO panel 214 may advantageously reduce the total number of cables in the subsystem, which can decrease installation time significantly. Cables passing between the hub panels 214, 216, 218 can have connectors on either side to reduce the amount of installation time up tower 102. Cables passing between the hub panels 214, 216, 218 may be given extra length to account for deviations between installers. The extra cable length may be coiled and secured to the side of the panels which may be equipped with adhered or mechanically fastened mounting locations.

Figures 4A, 4B:
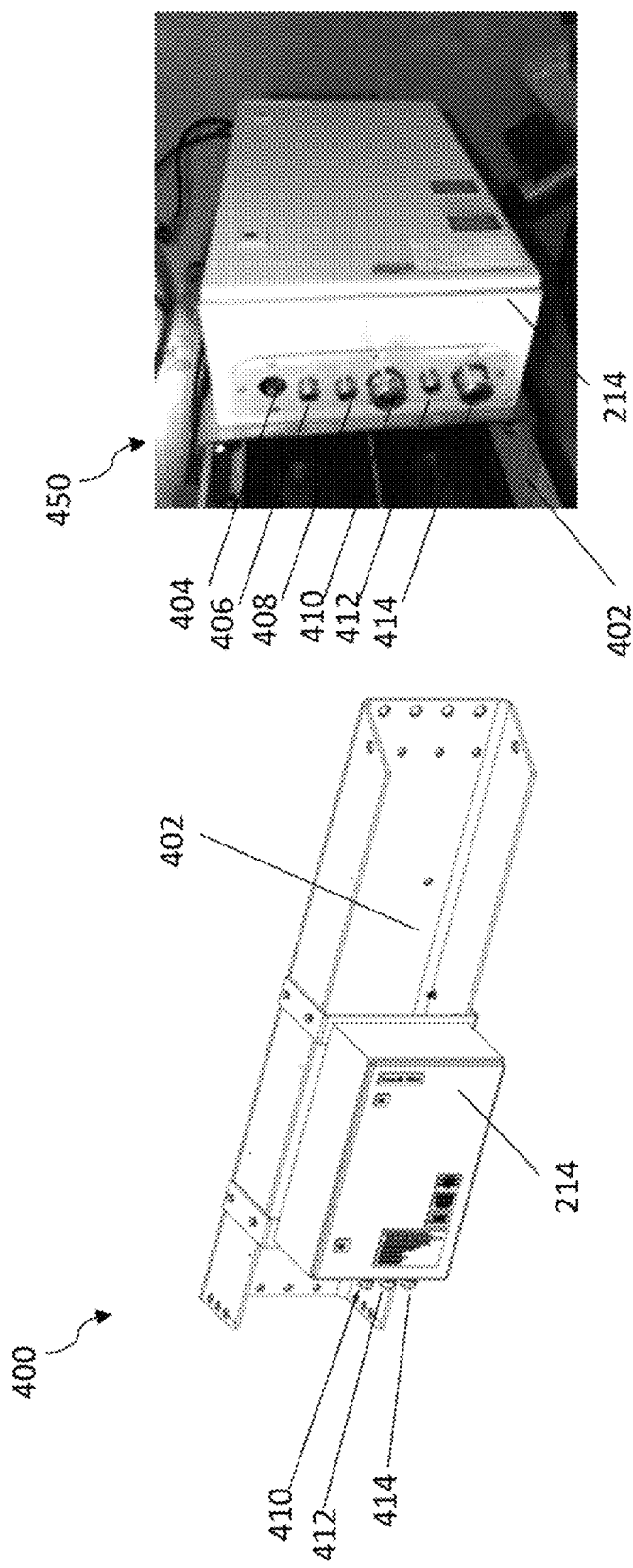
FIG. 4A is a schematic diagram of a hub IO panel mounted on a bracket, in accordance with an embodiment.
FIG. 4B is a photograph of a hub IO panel mounted on a bracket in a hub, in accordance with an embodiment.

Referring now to FIGS. 4A and 4B shown therein is a schematic diagram 400 and photograph 450 of the hub IO panel 214 of FIG. 2 mounted on an interior surface of the hub 106 of FIG. 1, according to an embodiment.

The hub IO panel 214 is mounted to the hub 106 by a hub IO panel mounting bracket 40. The hub IO panel 214 includes glands 404-414 which are used for power and data cables running to the transformer, the blades, and a wireless communication device (or wireless module). In an embodiment, a wireless communication receiver and transmitter may be both mounted in the hub 106 so that they are in direct line of sight of each other, one on the rotor, and one on the stator. In an embodiment, the wireless communication receiver may be mounted to a hub panel (e.g. the hub ethernet box, or Hub IO box 214) and the transmitter may be mounted to the nacelle panel 212.

Figure 5:
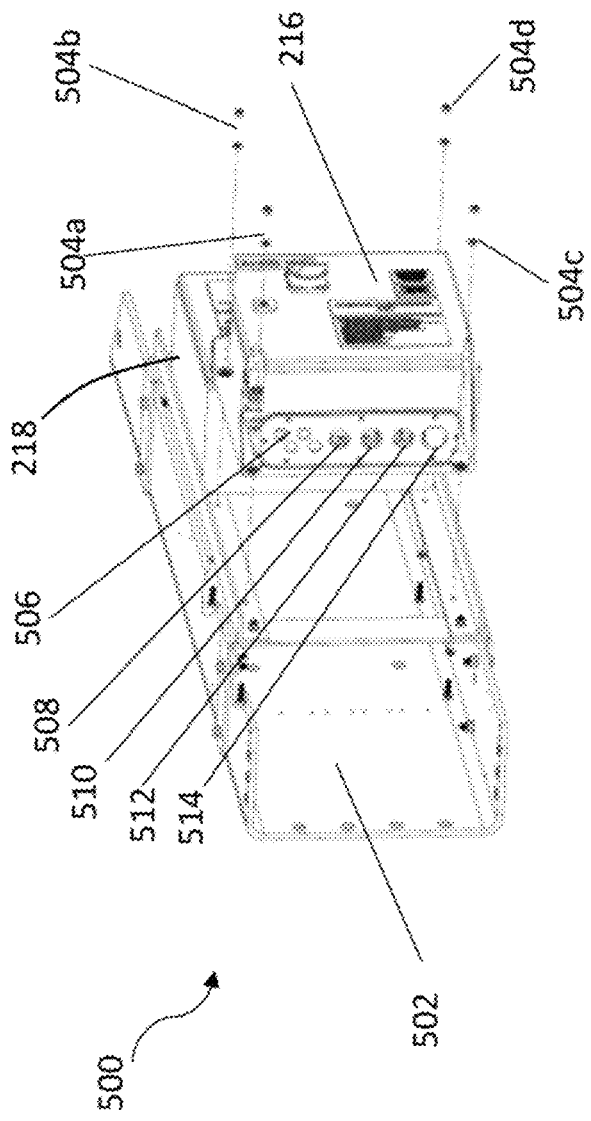
FIG. 5 is a schematic diagram of a power distribution panel mounted on a bracket, in accordance with an embodiment.

Referring now to FIG. 5, shown therein is an exploded view schematic diagram 500 of the power distribution panel 216 of FIG. 2 mounted on the hub 106 of FIG. 1, according to an embodiment. The power distribution panel 216 is mounted to the hub 106 by a power distribution panel mounting bracket 502. In an embodiment, the power distribution panel 216 is secured to the power distribution panel bracket 502 by six screw, washer, nut sets 504*a*, 504*b*, 504*c*, and 504*d*. The power distribution panel 216 also includes cable glands 506-514. FIG. 5 shows the transformer panel 218 behind the power distribution panel 216.

Figure 6B:
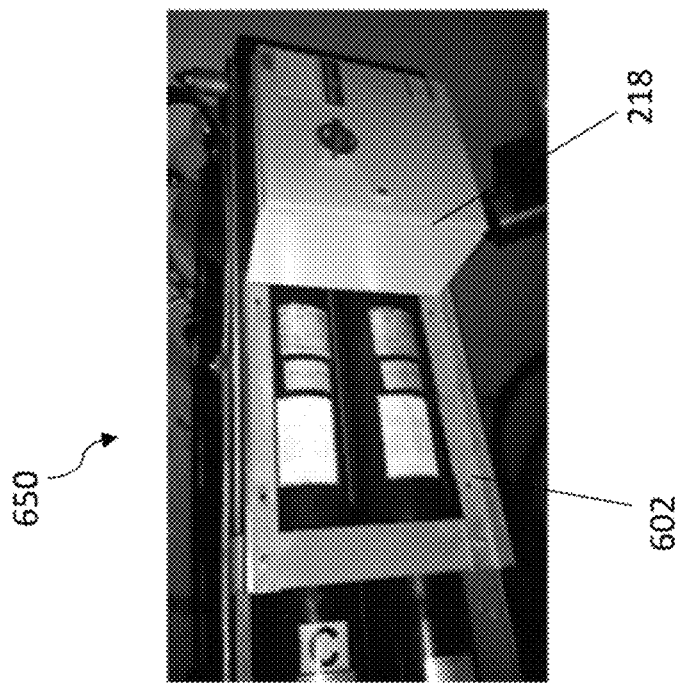
FIG. 6B is a photograph of a transformer panel mounted on a bracket in a hub, in accordance with an embodiment.
Figure 6A:
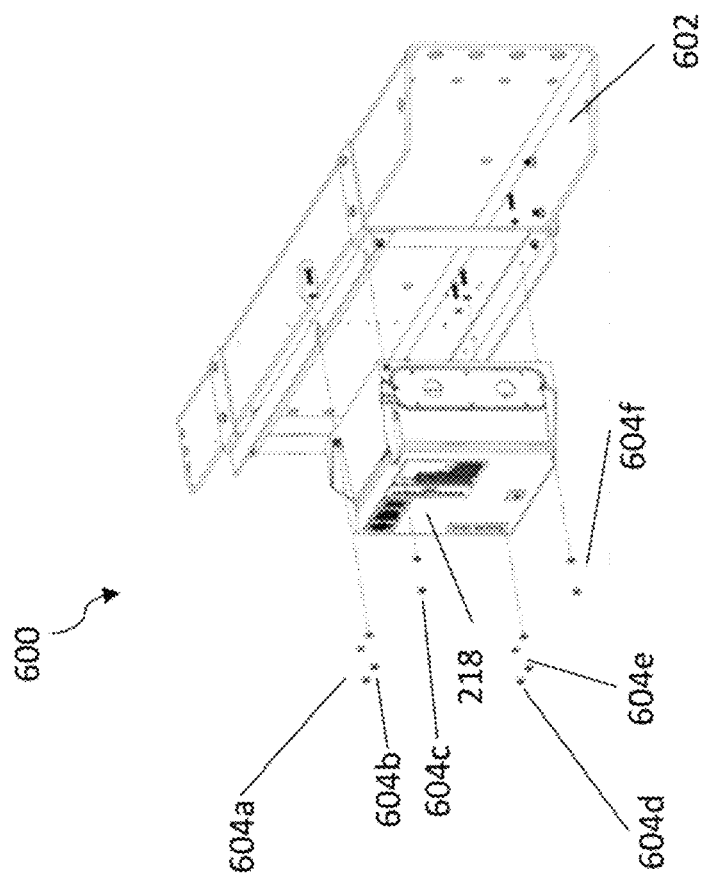
FIG. 6A is a schematic diagram of a transformer panel mounted on a bracket, in accordance with an embodiment.

Referring now to FIGS. 6A and 6B shown therein is an exploded view schematic diagram 600 and photograph 650, of the transformer panel 218 of FIG. 2 mounted on the hub 106 of FIG. 1, according to an embodiment. The transformer panel 218 is mounted to the hub 106 by a transformer panel mounting bracket 602. In an embodiment, the transformer panel 218 is secured to the power distribution panel bracket 602 by four screw, washer, nut sets 604*a*, 604*b*, 604*c*, 604*d*, 604*e*, and 604*d*. In an embodiment where the transformer panel 218 interior components and part of the Hub IO panel 214 interior components are separated and placed into each blade control panel 252, the transformer panel 218 may be removed and the hub ethernet box 214 may be placed on the same mounting bracket as the power distribution box 216.

Figure 7:
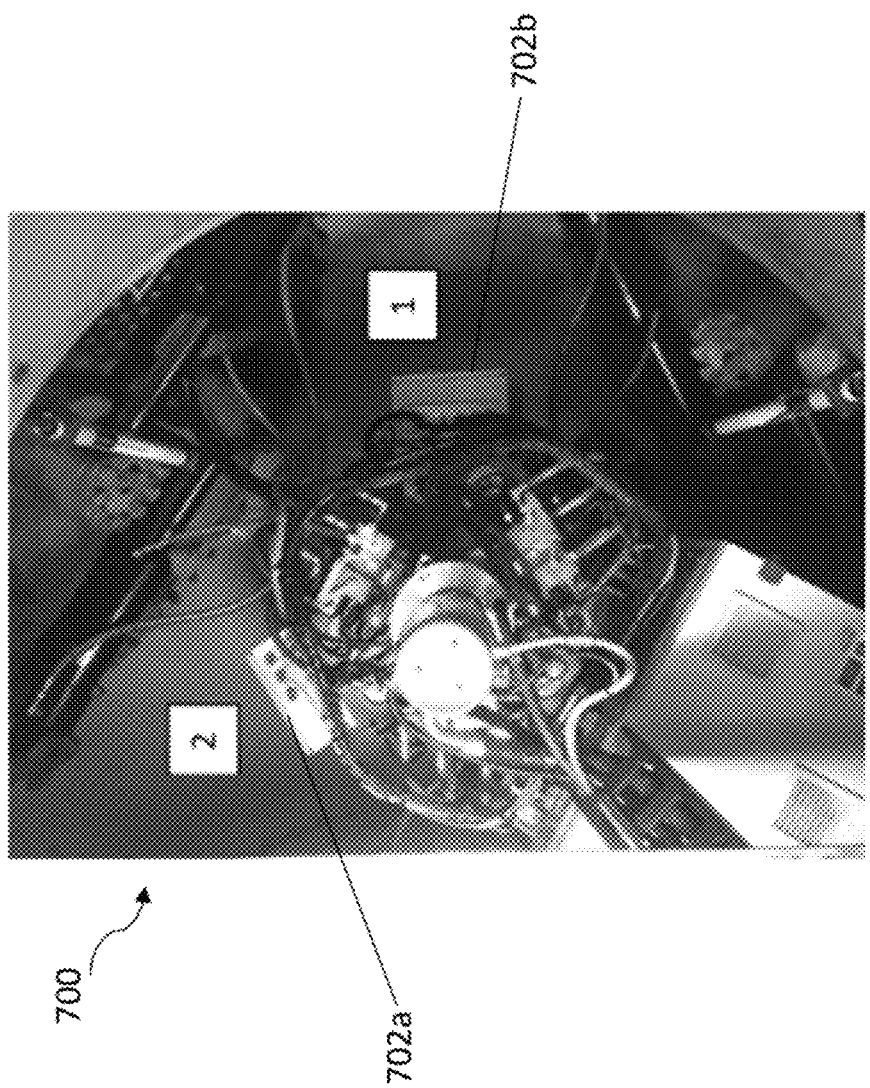
FIG. 7 is a photograph illustrating the location of two panel mounting brackets in a hub, in accordance with an embodiment.

Referring now to FIG. 7, shown therein is a photograph 700 of the hub 106 from the perspective of the nacelle 104, according to an embodiment. Photo 700 shows the slipring can be seen in the center, the Hub IO 702*a* and the power distribution box 702*b*.

The hub IO panel mounting bracket 402, the power distribution panel mounting bracket 502, and the transformer panel mounting bracket 602 may be bolted onto or otherwise attached to accumulator trays (not shown) which are already present within the hub 106. Using the existing accumulator brackets may advantageously eliminate the need for additional components as well as minimize the space taken up within the hub 106 by the panels. The mounting brackets may be custom designed to fit onto the accumulator brackets and withstand the fatigue loading experienced when the hub 106 is rotating.

Referring again to FIG. 2, the hub 106 is connected to the blade 108 of FIG. 1 by a bearing plate 250. The bearing plate 250 is generally a strong and thick plate which sits at the root of the blade 108 and helps reinforce the blade 108 where the blade 108 secures to the hub 106. The bearing plate 250 may include a circular or square access port which restricts the size of ice protection system components. The bearing plate 250 may be used for mounting electrical panels for powering the ice protection system 101.

The bearing plate 250 may comprise metal or fiberglass coated wood. The bearing plate 250 may have a single or double-walled design. In a particular embodiment, the bearing plate 250 is metal and single-walled. Metal bearing plates are stronger in comparison to wood, so the metal bearing plate 250 can hold more panels. Further, the metal can be tapped and threaded. The metal bearing plate 250 provides the option of using magnets to mount the panels (e.g. instead of fasteners). In contrast, a wood bearing plate may require fasteners which go completely through the bearing plate 250 and is generally unable to support as much weight as metal bearing plates. As a result, in cases using a wood bearing plate 250, multiple small electrical panels may be used or electrical panels may be mounted to the shear web 121. Electrical panels may be installed on the blade-side of the bearing plate 250 if the bearing plate 250 is metal. Electrical panels may be installed on the hub-side of the bearing plate 250 if the bearing plate 250 is wood. This is to avoid the potentially catastrophic failure of "bolt tear out" if the electrical panel was installed on the blade-side of a wood bearing plate.

The bearing plate 250 accommodates the rotation of the various components that pass from the hub 106 into the blade 108. For example, electrical cables and control cables may pass through the bearing plate 250 to connect to electrical and sensor components of the ice protection system 101 which are located within the blade 108 (e.g. a blower). In some embodiments, the wind turbine 100 includes two parallel bearing plates 250 through which cables may pass to get from the hub 106 into the blade 108. The bearing plate 250 may have a bearing plate panel 252 mounted thereto. The bearing plate panel 252 (or blade control panel) houses contactors which are used for controlling which power lines are connected inside the blade 108 (i.e. how much electricity is being used by each blade 108, and which components are on/off). In an embodiment, a hub IO PLC is divided into three PLCs and one is put into each bearing plate panel 252. To accommodate the additional panel components, it may be necessary to bay two enclosures together to make the bearing plate panel 252. Bayed panels are advantageous because they are slim enough to fit through the bearing plate access port, and they can be detached if they are too long to fit through other constricting access points like between the hub 106 and the hub shroud in an embodiment of the turbine 100.

Referring now to FIGS. 8A and 8B shown therein is a schematic 800 of a bearing plate 250 with a bearing plate panel 252 mounted thereto and a photograph 830 of a portion of a bearing plate 250, according to an embodiment. The configuration shown in FIGS. 8A and 8B may be used for a SWT3.2 G1.0 wind turbine design.

In FIG. 8A, the bearing plate panel 252 is mounted to a blade-side of the bearing plate 250. FIG. 8A illustrates a bearing plate panel 252 mounted onto two Unistrut rails 804 and 806 which are attached to the bearing plate 250 by bolts (not shown). Brackets (not shown) on the back of the bearing plate panel 252 are attached to the Unistrut rails 804 and 806. FIG. 8B shows the Unistrut rails 804 and 806 photographically. Hole locations for the hardware used to mount the Unistrut rails may be highly specific and measured with accuracy using other easily identifiable pre-existing holes in the bearing plate 252.

In other embodiments, other bearing plate panel 252 mounting configurations may be used for other wind turbine designs (e.g. SWT3.2 G2.0 and LM45 G1.0). An example of a configuration that may be used with an SWT3.2 G2.0 wind turbine design is illustrated in FIG. 23. FIG. 23 is a photograph 2300 illustrating a bearing plate panel 252 mounted to a bearing plate 250. The bearing plate panel 252 has a plurality of cables 2302 connected to the bearing plate panel 252, for sending and receiving signals to and from the bearing plate panel 252.

Referring now to FIG. 8C, shown therein is a photograph 860 of a cable pass-through 808 in a bearing plate 250, according to an embodiment. The bearing plate 250 may include holes 808 which can be used for the passage of cables 810 from one side of the bearing plate to the other. Hole availability may depend on the particular wind turbine. The holes 808 may be preexisting in the bearing plate 250

(i.e. not specially created or configured for the ice protection system 101). If an existing hole is used as a pass-through for cables, larger holes may be preferably used over smaller holes. Holes may be used which are closer to the center of the bearing plate 250, which may limit movement of the cables at these locations. In some situations, new holes may be created in the bearing plate 250 (e.g. via drilling) to accommodate the cables 810. New holes may preferably be positioned as close to the center of the bearing plate 250 as possible. In some cases, a hatch covering the access port through the bearing plate 250 may be modified to accommodate one or more cables.

The cables 810 may be surrounded by armor 812. The armor 812 may protect the cables against wear that may occur from abrasion where the cables 810 pass through the bearing plate 250 due to rotation of the bearing plate 250 while the wind turbine 100 is in motion or pitching. The armor 812 may include a material coating. The material coating may be Polytuff™ or the like. The material coating may be applied over a portion of the cable that passes through the bearing plate 250. The armor 812 may include a covering material such as a polymer or other material such as metal. The cables 810 may be bundled together to pass through the bearing plate 250.

Referring now to FIG. 9, shown therein is a cross-section schematic 900 of a wind turbine blade 108 containing an ice protection system 101, according to an embodiment. The ice protection system 101 extends outwards from the hub 106 (i.e. from a proximal end 161 of the wind turbine blade 108 towards a distal end 162 of the wind turbine blade 108, where the terms proximal and distal refer to position relative to the hub 106).

FIG. 9 includes components which have counterparts in FIG. 2. The counterpart components in FIG. 9 represent examples of the counterpart components of FIG. 2, according to an embodiment. A counterpart component in FIG. 9 is represented by a reference number having the same last two digits as its counterpart component in FIG. 2. For example, a component having number 1xx in FIG. 9 is to be understood to be a counterpart component of the component 1xx of FIG. 2, according to the embodiment of FIG. 9 (e.g. control system 103 is an example of control system 103).

The blade includes a trailing edge 127 and a leading edge 128. The trailing edge 127 is the edge of the blade 108 last encountered as the blade 108 rotates. The leading edge 128 of the blade 108 is the edge of the blade 108 first encountered as the blade rotates. The blade 108 includes a proximal end 161 and a distal end 162. The proximal end 161 is the end of the blade 108 closest to the hub 106. If a first component is referred to as proximally located relative to a second component, the first component is closer to the hub 106. The distal end 162 is the end of the blade 108 farthest from the hub 106. If a first component is distally located relative to a second component, the first component is farther from the hub 106 than the second component.

The distal end 162 may include an inaccessible section 125 that is not reachable or accessible by a person for installation purposes. The inaccessible section 125 may include a solid segment that is filled with a solid material. The inaccessible section 125 may be hollow and obstructed to prevent access. The inaccessible section 125 may be too restricted in space or configuration to allow access. The inaccessible section 125 includes a blade tip 118 which is the most distal portion of the blade 108.

The blade 108 includes an interior and an exterior. The interior includes an interior cavity 163 bounded by an interior surface 164. The exterior includes an exterior surface 165 onto which ice 116 may accumulate.

The interior 163 includes blade bulkheads 166. The blade bulkheads 166 may be located in the leading edge 128, the trailing edge 127, or both leading and trailing edges 127, 128. The blade bulkheads 166 may be thin foam walls coated in fiberglass and bonding-paste. The blade bulkheads 166 are used for structural assistance during blade transportation and alignment during manufacturing. The presence of bulkheads 166 may require drastic installation process changes (for example, using a bulkhead removal tool), and design changes to the ice protection system.

In some embodiments, the blade 108 may contain one or more shear webs 121 or spars 122, referred to herein as shear web 121. The shear web 121 runs along the interior surface 164. The shear web 121 may terminate before the blade tip 118. The shear web 121 may be located along the trailing edge 127 or along the middle of the interior surface 164. The shear web 121 may provide a preferred location at which to attach components as it is a reinforced section of the blade 108 and therefore is likely to be able to accommodate the load from the added components. The shear web 121 is the second strongest part of the blade 108 after the bearing plate 250. As there may not be enough space to put all system components on the bearing plate 250, system components may be placed on the shear web 121. Heating system components may be isolated to the leading edge 128 side of the shear web 121 so that such components are as close possible to the critical icing area of the blade 108 (the tip third and leading edge of the blade). Components may be positioned on the trailing edge 127 side of the shear web 121 if there is not enough space on the leading edge 128 side of the shear web 121.

In some cases, the blade 108 may include two shear webs 121 side by side with a gap (e.g. 3" or larger) between the two shear webs 121 running parallel along the entire length of the blade 108. In some cases, one of the two shear webs 121 may stop before the second shear web does. The shear web 121 may end at some length down the blade 108. The separated cavities may or may not join together to create one cavity beyond termination of the shear web 121.

The trailing edge inaccessible region may or may not be further from or closer to the tip with respect to the leading edge inaccessible region. The spars 122 may also be of varying thicknesses along the length of their respective lengths. There may also be a C-cut which has only fiberglass or a few wood supports, which is structural and should not be modified during install. The C-cut may be used as a measuring datum for all shear-web mounted components. In an embodiment, the bearing plate 252 is used as a measuring datum for all shear-web mounted components because it will result in the fewest deviations when comparing between blades 108. There may also be bulkheads which are perpendicular to the shear web 121 and occupy the entire leading edge cavity at cross sections of ~2 inches. The bulkhead may be foam sandwiched with fiberglass and glued into place. The bulkheads are not structural and can be removed. Also, the spars 122 may be joined into the airfoil surface through filleted fiberglass layers. Sections of the spar 122 may have lightning protection running through the spar 122 which interrupts mounting and should be avoided. The blade 108 may also have a bearing plate 250 that is a single or double plate system. The bearing plate(s) 250 may be made from steel or fiberglass. There may be one or more electrical distribution or control panels mounted to the bearing plate 250.

In some embodiments, the ice protection system may include a blade junction box 244 within an interior of the blade 108. The blade junction box (or panel) 244 may be configured to receive signals from one or more sensors in the blade 108 (this may include all sensors in the blade), group the signals into a single signal cable, and send data towards the blade control panel (bearing plate panel 250). The blade junction box 244 may be mounted on the shear web 121 between the blower and the heater and above the duct airway. This positioning of the blade junction box 244 is advantageous as it positions the blade junction box 244 close to the sensors, which can minimize the distance the sensor cables have to travel before the sensor cables can be terminated and joined to more robust cables which are generally selected to better endure the operational environment inside the turbine 100. The blade junction box 244 may be equipped with adhered or mechanically fastened mounting locations which can be used to route cables and to secure extra cable lengths. The ice protection system includes a blade junction box 244 for each blade 108 of the turbine 100.

The blade portion of the ice protection system 101 (i.e. those components of the ice protection system 101 contained within the blade 108) may include a blower assembly 110 to move air throughout the blade 108, a heater assembly 112 to generate a heated airflow 142, a duct 114 for receiving the heated airflow 142 and for releasing the heated airflow 142 into the interior cavity 163 of the blade 108, duct structural elements 249 of FIG. 2 to support and secure the duct 114 inside the blade 108, and a control system 103 with sensors 105 to control the heating system (e.g. heater 137 and blower 139). Each ice protection system 101 also includes electrical and mounting components.

In some cases, the duct 114 may extend as far as possible to the tip of the blade 108. In some cases, the duct 114 may extend only to the end of the shear web 121.

The duct 114 may include a nozzle 131. The nozzle 131 pushes a jet of hot air (heated airflow 142) into a pressurized air pocket and generates force convection. The nozzle 131 located at the end of the duct 114 proximal to the tip 118 of the blade 108 and is pointed towards the tip 118 of the blade 108. The nozzle 131 may be pointed towards the leading edge 128 (where icing is prevalent) or at some angle between the two.

The duct 114 may be a flexible duct. The flexible duct may be porous, perforated, meshed, permeable, impermeable, or nozzled. These features may be in clusters, a single row, or multiple rows, and direct heat towards the leading edge 128 and away from the spar 121. This may generate turbulence increasing internal heat transfer from the air to the surface. Shooting a jet of air perpendicular to the bulk air flow (aka cross-flow injection) can generate massive amounts of turbulence. Turbulence results in higher heat transfer coefficients, which means that the heat from the air transfers to the blade 108 surface quickly. It may be advantageous to shoot hot air at the bottom of a vertical plate to take advantage of natural surface convection. This means that the 6:10 o'clock and 5:50 o'clock positions may be most advantageous if the leading edge 128 is at the 6:00 o'clock position and the shear web 121 is at the 12:00 o'clock position. This also means that the blade pitch may be controlled to encourage the heated air to rise towards the leading edge 128. It may be most preferred for gravity to be pointing in the 12:00 o'clock position, least preferred for gravity to be pointing in the 6:00 o'clock position, and a gradient of preference between the two directions.

The duct 114 may be porous. The duct 114 may be perforated, have one or more strips of mesh, or have nozzled bleed-outs. The duct 114 may be permeable or impermeable.

As embodiments of the duct 114 using mesh have shown that the mesh may wear faster than the rest of the duct fabric, it may be preferable to have the duct 114 include perforations with a nozzle at the tip of the duct 114 pointing towards the blade 108 tip.

In embodiments where the duct 114 is perforated, the positioning of the perforations may affect performance. If the duct 114 is secured to the shear web 121 at the 12 o'clock position, it may be desirable to shoot air towards the 6 o'clock position where ice is most prevalent (see FIG. 20 for an example cross-section view of a duct with clock position references). However, the duct 114 may lie flat when not inflated, which can create a crease right at the 6 o'clock and 12 o'clock locations. To prevent the duct 114 from ripping or wearing along this crease, rows of perforations may be positioned at approximately the 5:50 and 6:10 locations. Perforations should generally not be placed near the 9 o'clock position, 12 o'clock position, or the 3 o'clock position because this can result in hot air being forced onto the shear web 121. The shear web 121 is structural and should be the coldest surface inside the blade 108. Also, the clustering of these perforation locations may increase performance. For example, if the perforations begin 1 m away from the heater 137, the hot air may circulate back into the blower 139 before it can cool down, limiting the amount of energy that can be put into the blade 108. Thus, the sections of the duct 114 near the heater 137 may, in some embodiments, be impermeable.

Figure 19:
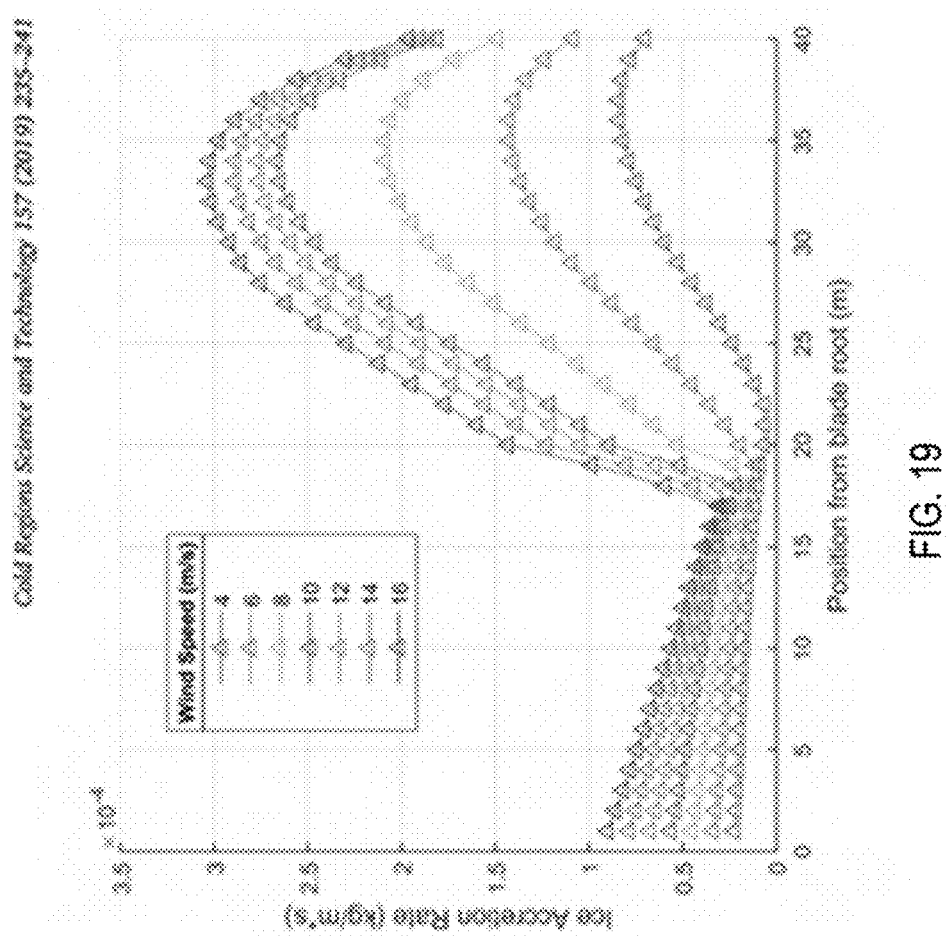
FIG. 19 is a graph illustrating a plot of ice accretion rate versus position from blade root which may be used in determining positioning of perforations in a duct of an ice protection system of the present disclosure.

It has been learned that icing is most prevalent in the distal (tip) third of the blade 108. Accordingly, it may be desired for the duct 114 to be configured such that airflow escapes the duct 114 through perforations to match the graph shown in FIG. 19. This may involve having no perforations in the duct 114 up to approximately the 15 m point and the most perforations at approximately the 35 m point.

The flexible duct 114 may be supported by internal pressure provided by e.g. the blower. The flexible duct 114 may be reinforced at certain duct sections to prevent motion and wear while the blower 139 is off and the duct is not inflated. Reinforcements of the flexible duct 114 may include any one or more of internal ribs, coils, and thicker fabric. While the duct 114 is not inflated, the duct 114 is free to pivot around the mounting location. Areas have been identified inside the blade 108 where this motion results in wear, which can affect the performance of the duct 114. Near the ½ way point down the blade 108 there may be blade weights 240 (e.g. in a 49 m blade they may be present at the 25 m location). Blade weights 240 may comprise cement blocks which are secured to the shear web 121, such as with a threaded and nuts. The robustness of the duct 114 may be increased at this location. Similar reinforcements may be provided at bulkhead locations as well. Similar reinforcement may be provided along the fold lines as well.

The fabric duct 114 may further be rigidly connected to the spar 121. The fabric duct 114 may be connected to the spar 122 via fasteners, or from contact with a rod which is mounted to the shear web 121, or with a rail system which is mounted to the shear web 121, or via cable which is anchored to the shear web 121 with pulleys at specific locations, or clips/carabineers which are sewn directly into the duct 114.

The blower 139 may be mounted to the bearing plate 250, or into the trailing edge of the shear web 121 and route air from the trailing edge 127 It may be mounted to the leading edge of the shear web as well. This may be advantageous to keep recycling the warm air back into the heater if the weather is extremely cold, because heat will not be wasted on the trailing edge where icing is not as prevalent. It may be advantageous to place the blower in the trailing edge to pull in cold air if the weather is only slightly cold, because this will heat up more of the space and ensure that the entire blade surface is heated equally. to the leading edge 128. The blower 139 may be mounted to the leading edge of the shear web 121. This may be advantageous to keep recycling the warm air back into the heater if the weather is extremely cold, because heat will not be wasted on the trailing edge where icing is not as prevalent. The blower may be placed in the trailing edge, which may provide an advantage by pulling in cold air if the weather is only slightly cold, because this will heat up more of the space and promote heating the entire blade surface equally. In another embodiment, air may be pulled from or sent down the shear web gap in (e.g. in a Senvion MM92). The system may be configured to pull warm air from the hub 106, the nacelle 104, or from generator exhaust to reduce the amount of heat energy needed to reach positive temperatures.

The duct 114 may be sectioned into a plurality of duct suctions 120 which are joined together. The duct sections 120 may be joined together using any one or more of zippers, Velcro, buckles, or buttons. The duct 114 may be sectioned so that the duct 114 can be bundled into reasonable sizes for installation purposes. For example, the bundle may need to be small enough to pass through all the small access ports of the turbine 100. Further, the length of each duct section 120 may be limited such that the length is not longer than the accessible region of the blade 108.

Figure 20:
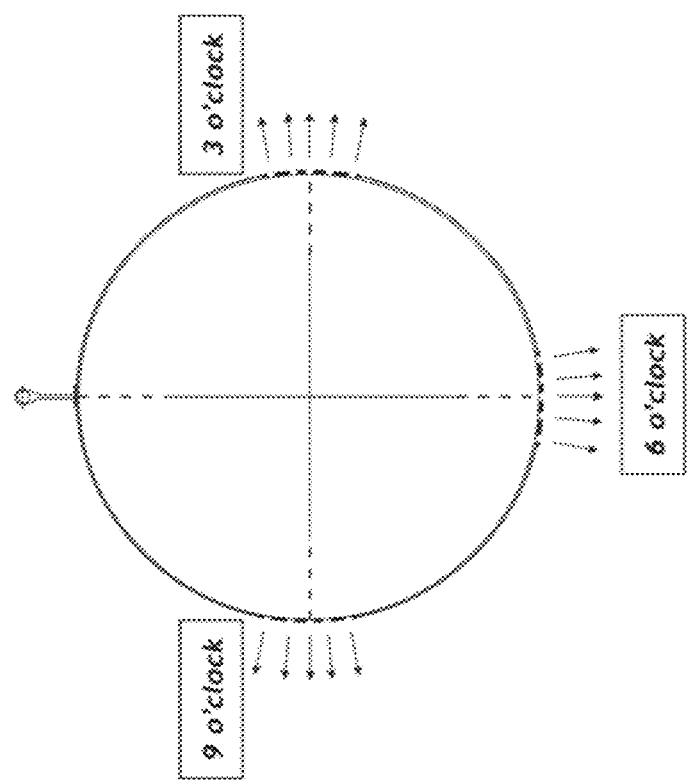
FIG. 20 is a schematic cross-section view of a duct including clock position references, according to an embodiment.

In an embodiment in which the duct sections 120 are joined using zippers, zipper terminals may be located at the 3 o'clock position (see FIG. 20 for an example of 3 o'clock position). This is because the 3 o'clock position is facing up during installation, making it easier to access and recurring installation time. In an embodiment in which duct sections 120 are joined using zippers, it may be advantageous to have interchangeable duct lengths in the accessible region to account for manufacturing deviations in blade length and volume. In an embodiment where a fabric duct 114 is secured to the heater 137 via a round metal duct connector 136, ratchet straps or cinch straps with a mechanical locking system may be used to squeeze the fabric ducting 114 to the connector 136. Set screws, adhesive, rubberized materials sewn or adhered to the fabric, elastic cords, or slings may be used as a secondary fastening method. In an embodiment which uses ratch straps or cinch straps to secure the fabric duct 114 to a round metal duct connector 136, it may be advantages to embed the strap in the fabric so that if the duct 114 slips off during turbine operation, the strap remains attached to the duct 114.

The blade 108 portion of each ice protection system 101 is installed on the interior surface 164 of the interior cavity 163 of the blade 108 of the wind turbine 100. This installation may occur during manufacturing, at erection, or as a retrofit. Installation on inaccessible regions of the shear web 121 may be performed before such regions become inaccessible. During installation, the components of the ice protection system 101 are transported from the ground 150 and the location of the component's installation. During this transportation, the components may encounter limited space and accessibility conditions. The components and the pieces that make them up may be sized, shaped, or apportioned according to the most limiting encounter in order to accommodate installation.

The blower assembly 110 includes a blower 139 to move air throughout the blade 108 and a blower bracket 140 to secure the blower assembly 110 to the blade 108.

The blower assembly 110 is mounted in the interior cavity 163 of the blade 108 at or near the proximal end 161 of the blade 108. In some embodiments, the blower assembly 110 may be mounted to the shear web 121. In other embodiments, the blower assembly 110 may be mounted to a blade bearing plate 250.

In other embodiments, the blower assembly 110 may be mounted to the trailing edge 127 of the shear web 121 or between the two walls which create a double shear web. In such embodiments, fish plates or sheets of varying materials may be used to distribute the bolt loads on the surface of the shear web 121. At least one vibrational damping mat or washer may be used on the leading or trailing edge of the blower bracket 140 to isolate the blower 139 from the shear web 121 and prevent vibration induced damage to the shear web 121 and to reduce the overall noise of the system. Noise reduction can be very important because of the strict environmental regulations under which wind turbines must often operate. Nylock nuts or Loctite or any combination may be used to prevent vibrational loosening of the blower bracket 140 attachment. Nylock nuts or Loctite or any combination may be used on other hardware in the ice protection system as well and not just on the blower. In systems with two parallel shear webs 121 that have an air gap 243 between the shear webs, a spacer or support may be added to prevent separation failure. In some cases, holes may be drilled in the shear web 121 to provide access to the shear web air gap 243 (e.g. near the accessible limit). In an embodiment, the blower assembly 110 is mounted proximally relative to the heater assembly 112.

The blower assembly 110 may also be mounted to avoid contact with lightning protection such as a lightning strip. The turbine blade 108 may include a lightning protection system ("LPS"). The LPS may be a metal strip or wire extending from the tip of the blade 108 to earth ground. The metal strip may be exposed to air or buried inside the blade 108 material. The strip may be in the leading edge 128, the trailing edge 127, or between the spar 122 walls. The ice protection system 101 may be configured such that components of the ice protection system 101 avoid contacting the LPS. This may be achieved, for example, through changing or using particular mounting positions. For example, the blower 139 may typically be mounted in the center of the shear web 121 (from top to bottom) but may be offset to avoid drilling a fastener hole through the LPS. This mounting position may be used to minimize the stress flowing around the bolt holes (i.e. holes at the center of the shear web 121 have lower impact on the structural integrity of the shear web 121 compared to holes that are further away from the "neutral axis"). In another example, a fishplate, which is typically a single sheet of metal used on the trailing edge 127 side of the blower mounting assembly may be divided into two separate plates so it does not touch the IPS.

In some embodiments, the blower assembly 110 includes multiple pieces which are assembled in the blade 108 to form an assembled blower assembly 110. A custom positioning tool may be used to position and support the blower bracket 140 attachment in the correct location during installation.

Referring now to FIGS. 10A to 10D, shown therein are schematics 1000 of the blower assembly 110 in various states of assembly, according to an embodiment. Descriptions of various components of the blower assembly 110 and their application follow. The blower illustrated in FIGS. 10A to 10D may be used for a SWT3.2 G1.0 wind turbine design.

Figure 10A:
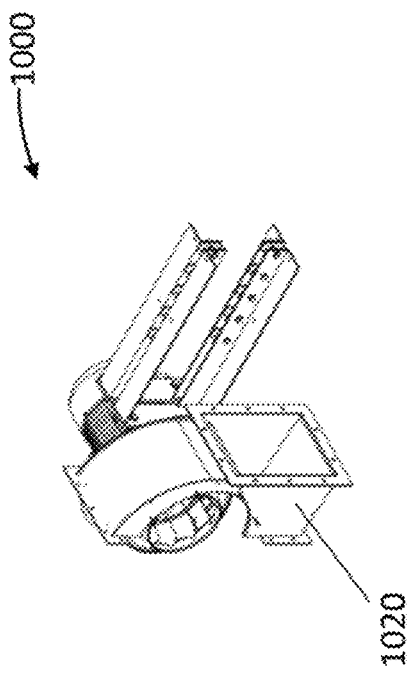
FIGS. 10A to 10D are schematic diagrams of a blower in various stages of assembly, in accordance with an embodiment.

FIG. 10A shows a blower motor 1002 for turning a blower fan 1004, a blower fan 1004 for providing an airflow, a blower intake 1006 through which air enters the blower from the internal cavity 163 of the blade 108, a blower flange 1008 for mounting rigid ducting, and the blower bracket 140 of FIG. 2 to secure the blower assembly to the blade 108. In some cases, the configuration of the blower assembly may change to accommodate smaller blade volumes in different wind turbine designs (e.g. FIG. 24). Sensor locations on the blower may also move depending on the wind turbine design.

The blower bracket 140 may include a flat first piece 1010 referred to as the blower bracket plate 1010 and T-Shaped second and third pieces 1012a and 1012b individually referred to as blower bracket arm 1012 and collectively as blower bracket arms 1012. The blower bracket arms 1012a and 1012b may include predetermined holes therein which are used as mounting locations for routing sensor and electrical cables. The blower bracket arms 1012a and 1012b may include adhered or mechanically fastened mounting points for routing sensor and electrical cables. The blower bracket arms 1012a and 1012b may include adhered vibrational damping pads to reduce installation time. The blower bracket plate 1010 may be attached to the casing of the blower motor 1002, for example using a bolted connection. The blower bracket arms 1012 are each connected to the blower bracket plate 1010 at a substantially right angle and may be parallel to each other such that they mirror each other's orientation. The trunk of the T of each blower bracket arm 1012 is oriented such that it points at the mirrored opposing other blower bracket arm 1012. Bracket arm 1012 includes holes 1014 therethrough for housing bolts which go through the shear web 121.

In an embodiment, the blower bracket 140 is mounted to the shear web 121. In this embodiment, bracket arms 1012 straddle the shear web. A bolt is passed through one side of one bracket arm 1012, then through the shear web 121 and then the other bracket arm 1012 to secure the blower bracket 140 to the shear web.

Figure 10B:
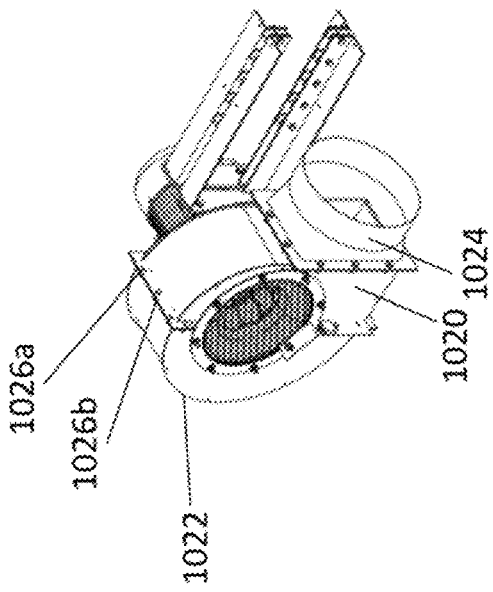
Figure 10C:
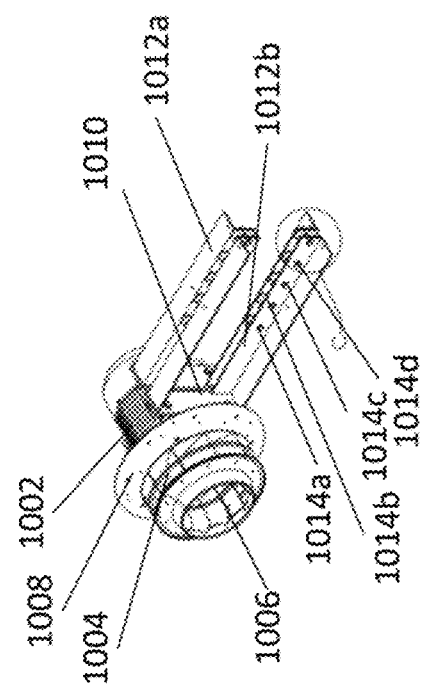
Figure 10D:
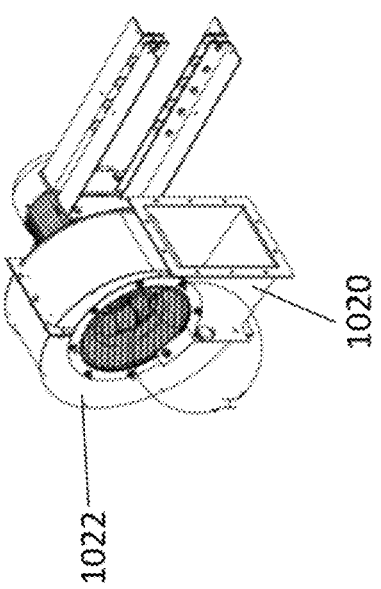

FIGS. 10B to 10D show the components of the blower 139 in FIG. 10A as well as a blower shell and blower outlet 1024 of the blower assembly 110. The blower shell and blower outlet 1024 provide structure to the blower assembly. They also collectively direct air outputted from the blower 139 to the heater assembly 112 of FIG. 2. The blower shell includes a first piece 1020 and a second piece 1022. The pieces of the blower shell 1020 and 1022 may be attached to each other via fasteners (i.e. screws or bolts) including at representative locations 1026a and 1026b. In an embodiment, the blower inlet is covered with a fine metallic mesh. The mesh may prevent large objects from entering the fan.

Referring again to FIG. 2, during blower assembly a blower sensor bracket may be attached to the blower assembly 110 to hold sensors 105. These sensors 105 collect various sensor information. The sensor information collected by the sensors 105 may include, for example, an air speed of the blower 139, a temperature of the air passing through the blower 139, or a pressure of the air exiting the blower 139. The sensors 105 may include an accelerometer in the blower sensor bracket of at least one of the blades 108. In an embodiment, the sensor bracket is a low profile addition to the inlet attached to the outside of a metallic mesh covering the blower inlet. In another embodiment, the sensors are attached directly to the blower outlet 1024. The positioning of the sensors 105 with respect to the blower assembly 110 may vary depending on the model of wind turbine blade.

The heater assembly 112 includes a heater 137 to provide a heated airflow 142 and a heater bracket 138 to secure the heater assembly 112 to the blade 108.

The heater assembly 112 may be mounted to a surface in the interior cavity 163 at or near the proximal end 161 of the blade 108. The heater assembly 112 may be mounted distally relative to the blower assembly 110. The heater assembly 112 may be mounted to the blade 108 using similar methods and connectors to that of the blower assembly 110. The blower assembly 110 may be connected to the heater assembly 112 using any one or more of fabric, brackets, or a combination of fabric and brackets.

The heater 137 has a heater maximum output temperature. The heater maximum output temperature may be set to avoid softening the epoxy or resin of turbine components. This heater maximum output temperature may account for the temperature gradient between the heater 137 and the blade 108 components and therefor may be higher than the maximum allowable temperature of the duct components. The heater maximum output temperature may incorporate a factor of safety.

A material which reflects radiative heat or prevents conductive heat transfer may be inserted between the heater 137 and blade 108 components as a means of isolating the blade 108 components from the high temperature of the heater 137 and thereby increasing the gradient. Tape, gasketed, or chemical sealant or a chemical coating may also be used to prevent hot air from leaking through cracks in the heater assembly 112 and jetting towards turbine components.

Referring now to FIGS. 11A to 11H shown therein is a schematic representation 1100 of the heater assembly 112 at various stages of assembly and orientation, according to an embodiment.

FIG. 11A shows a complete heater assembly 112.

FIG. 11B shows the heater 137 connected to the upper pieces of the heater bracket 138. The upper parts of the heater bracket 138 may include a proximal upper heater bracket piece 1102, a distal upper heater bracket piece 1104, a proximal lower heater bracket piece 1106, and a distal lower heater bracket piece 1108. The heater 137 and the pieces 1102-1108 may be connected by bolts such as depicted 1110a-1110d.

FIG. 11C shows the components of FIG. 11B and a heater inlet 1112. The heater inlet 1112 may be connected to the heater by bolts such as depicted 1114a-1114c. The heater inlet 1112 is connected to the blower outlet 1024 of FIG. 10D using any one or more of fabric, brackets, or a combination of fabric and brackets.

FIG. 11D shows the components of FIG. 11C further including a heater outlet 1120. The heater outlet 1120 may be connected to the heater 137 by bolts such as depicted 1122a-1122c.

FIG. 11E shows the components of FIG. 11D and further includes a bottom heater bracket piece 1132 of the heater bracket 138. The bottom heater bracket piece 1132 may be connected to the heater 137 by bolts such as depicted 1134a-1114h.

FIGS. 11F and 11G show proximal and distal perspectives of FIG. 11E.

The heater 112 includes glands 1140 and 1142. Glands 1140 and 1142 are cable glands for housing and holding a data cable and a power cable, respectively, of the heater 112.

In other embodiments, the heater may include sensors positioned at the heater inlet and on the square section of the ducting. This may avoid placing sensors in riskier areas, such as in the embodiment of FIG. 11. Generally, location of the sensors relative to the heater may vary in different embodiments (and depending on the particular wind turbine design).

Referring again to FIG. 2, the duct 114 receives the heated airflow 142 from the blower 139 and the heater 137 and distributes the heated airflow 142 into the interior cavity 163 of the blade 108.

The proximal end 161 of the duct 114 may be connected to the heater outlet 1120 of FIG. 11D via the heater flange 136. In an embodiment, the heater flange tapers so that the cinch pressure on the duct 114 increases as the duct 114 is pulled away from the heater outlet 1120. In an embodiment, the heater flange 136 includes a rolled lip on its distal edge. The rolled lip can catch the strap if the duct 114 slips towards the distal edge during turbine operation.

The heated airflow 142 is forced through the duct 114 by the blower 139 along the heated airflow 142 direction. The heated air flow 142 exits the duct 114 through the duct outlets 246. The heated airflow 142 may also exit the duct 114 through the nozzle 131. The duct outlets 246 and nozzle 131 may be positioned and designed to optimize the amount of the heated airflow 142 directed toward high ice concentration areas of the blade 108 to optimize the effect of the ice protection system 101 in ice protection the blade 108.

In an embodiment, air travels: through the blower 139; through the fabric ducting between the blower 139 and heater 112; through the heater 112 which heats the air; out of the heater 112 and into the fabric ducting 114 which extends to the tip 118 of the blade 108; once the blade 118 reduces in size enough to require the duct 114 to reduce in size, the bleed outs begin; therefore, small portions of the air will jet out towards the leading edge (for example, at approx. 6 o'clock); the air that has jetted out via the bleed outs is then be pulled back towards the root because of the negative pressure created by the blower 139 and the cycle begins again; the remainder of the air continues down the duct 114 towards the tip 118 of the blade 108, slowly bleeding out as the duct 114 continues to taper; at the very tip of the duct 114, there may be a nozzle that shoots the remaining hot air towards the very tip of the blade 108 (into the tip cavity, or towards the solid tip piece); this air is then coaxed back towards the root of the blade 108 by the negative pressure created by the blower 139 and the eventual high pressure created by more air exiting the nozzle; the air returning to the root mixes with the hot air coming from the perforations and cools down as it passes the cold blade surface, giving a tip-to-root heating direction (which is very advantageous as opposed to a root-to-tip heating direction); some air leaving the nozzle of the duct 114 may be sucked into the trailing edge instead of the leading edge (depending on the localized pressure at the nozzle), which is not advantageous because any residual heat from that air is dissipated towards the trailing edge which does not see much ice accumulation; and the cycle continues.

As noted above, the ice protection system of the present disclosure may advantageously provide a blade tip to blade root heating direction. This tip to root heating direction is represented in FIG. 9 by heating direction arrow 902. Generally, the heated air flows to the tip 118 of the blade 108 through the duct 114. The heated air comes into contact with the cold outer surface as the air is returning to the root (proximal end 161). This flow provides tip to root directed heating. The hottest air comes out the end of the duct 114 (end of the nozzle). Perforations in the duct 114 may replenish the tip to root heating flow, which can help provide the system with good control of the flow of heated air. The perforations may be positioned in the duct 114 such that air flowing out is directed to the leading edge (see, for example, FIG. 12). As noted, the tip to root heating direction provided by the ice protection system of the present disclosure provides significant advantages over a system using root to tip heating. In a root to tip heating scheme, heat is sucked into the environment without raising the temperature of the blade material. The heat is pulled out so fast that the system just pulls cold air down to where icing is most severe, which is not helpful.

The duct 114 may include a plurality of duct sections 120 that form a tube through which the heated airflow 142 passes. The duct 114 may be a longitudinally extending tube which comprises a plurality of duct 120 sections of flexible material which are joined together.

In an embodiment, the duct 114 may run from the proximal end 141 to the distal end 142 of the blade 108. In other embodiments, the shear web 121, to which the duct 114 is attached, may terminate before the blade tip 118. In these embodiments, the duct 114 may run from the proximal end 141 of the blade 108 to the distal end 142 of the shear web 121. This creates a gap between the distal end 162 of the duct 114 and the blade tip 118 necessitating that the heated airflow 142 be accelerated or "pushed" into the region of the interior cavity 163 which extends beyond the shear web 121. In this embodiment, the duct 114 may terminate in a nozzle 131 that directs the remaining heated airflow 142 into this gap. The diameter of the nozzle 131 aperture may be smaller than the cross-sectional diameter of the rest of the flexible duct 114. This cross-sectional area reduction accelerates the heated airflow 142 exiting the nozzle 131.

The nozzle 131 aperture may be directed towards the blade tip 118, the leading edge 128, or a blade interior surface 164 in between to optimize the effect of the heated airflow 142 exiting the duct 114.

The nozzle 131 may be made of multiple layers of fabric around a plastic cone (to retain shape).

The duct section 120 may include plurality of duct outlets 246 to allow heated airflow 142 to exit the duct 114. The duct sections are connected via interduct connections 247 described below. The duct 114 may be made from various materials or combinations of materials that may be porous, nonporous, semi-porous, or combinations thereof. Different sections of the duct 120 may be composed of different materials with different porous natures.

Duct section sizing may be determined based on accessibility throughout the turbine 100 particularly with respect to the size of ports in the wind turbine 100. In an embodiment, interduct connections 247 may include zippers. In an embodiment, the zipper terminals may be positioned 90° clockwise from the point at which the duct sections 120 are secured to the blade 108 to provide easy access during installation. In other embodiments, duct sections 120 may be joined with any one or more of Velcro, buckles, tape, and buttons. Duct sections 120 may also include any one or more of springs, foam, and ribs for reinforcement or to prevent deflation to mitigate abrasive wear while the blower 139 is off.

Figure 12:
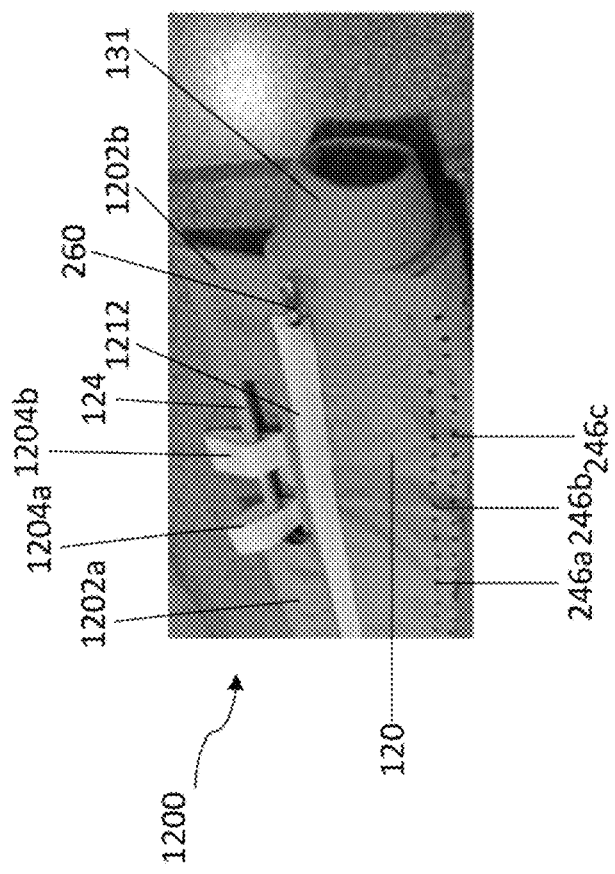
FIG. 12 is a photograph of a distal end of a duct, in accordance with an embodiment.

Referring now to FIG. 12, shown therein is a photograph 1200 of the distal end of a duct 114 including a duct section 120 and a nozzle 131 of FIG. 2, according to an embodiment.

The duct 120 may include one or more duct outlets (such as representative duct outlets 246a, 246b, 246c) referred to individually as duct outlet 246 and collectively as duct outlets 246. The duct outlets allow the heated airflow 142 to exit the duct 114. The duct outlet 246 may include any one or more of a nozzle, a perforation, a mesh, a permeable fabric, and a non-permeable fabric.

In an embodiment, duct outlets 246 may be positioned circumferentially on the duct 114 to direct the heated airflow 142 towards the leading edge 128 of the blade 108. In a further embodiment, duct outlets 246 are positioned approximately at 175° and 185° clockwise from the point at which the duct section 120 is connected to the blade 108. This positioning of the duct outlets 246 may optimize the amount of the heated airflow 142 directed toward high ice concentration areas while avoiding wear caused by inflation cycling at the crease located 180° from the point at which the duct section 120 is connected to the blade 108.

Also, duct outlets 246 may be positioned along the length of the duct section 246 to facilitate the transfer of heated airflow 142 out of the duct at various locations along the length of the duct, and thus to various locations along the length of the blade. In an embodiment, duct outlets 246 may be omitted in a portion (e.g. 1 m) of the duct 120 closest to the heater assembly 112. Such absence of the duct outlets 246 may prevent hot air from circulating back into the blower 139 before it cools.

Also, in an embodiment, duct outlets 246 may be concentrated in a proximal third portion of the blade 108. Such concentration of duct outlets 246 may be used to address the likelihood of greater ice buildup in this area of the blade 108.

Referring again to FIG. 2, the duct 114 may be supported by one or more duct structural elements 248 to provide structure and support to the duct 114. The duct structural elements may also mitigate side to side motion of the duct 114. The duct structural elements 248 also may serve as structures to mount the duct 114 to the blade 108. In an embodiment, the duct structural elements may include a spine 124 for providing structure along the length of the duct, a duct support assembly 126 for providing mounting and circumferential support, and a duct tip constraint 130 for supporting and constraining the distal end 162 of the duct.

The duct 114 may be supported by a tip constraint (e.g. duct tip constraint 130). The tip constraint supports a distal end of the duct 114 without attaching to the interior surface of the wind turbine blade 108. The tip constraint may not be used exclusively at the tip. For example, constraints may be used intermittently along the length of the duct 114 in the inaccessible region 125. The "tip constraint" may include a plurality of tip constraints for keeping the unfixed section of the system constrained within the blade 108. The tip constraints may have a consistent design the size of which varies according to the blade taper, or there may be a mixture of tip constraint designs used. In an embodiment, "3D" and flat shapes are used to achieve the function of constraining the duct 114 in the blade 108.

In an embodiment, the tip constraint includes a pair of tip constraint flanges for circumferentially supporting the flexible duct. In another embodiment, the constraints may be fixed to the spine rods and bowing rods may be used to friction-fit it to the interior of the blade 108. Constraints may lie flat to prevent side-to-side motion in areas of the blade 108 where the duct 114 occupies the full height of the cavity 163. The constraints may join together to stand up (like stacking cards) in areas where an inflated duct does not occupy the full height of the cavity 163. Constraints may be designed either to fit in a specific area of the blades 108 or the constraints may be designed to collapse or adjust such that the same constraint can be used at multiple locations in the blade 108. The constraints may not necessarily support the duct 114 directly. The constraints may not encircle the duct 114. For example, in an embodiment, the tip constraint may sit vertically on the shear web 121 and above or below the duct 114. The constraints may be configured such that the duct 114 can be clipped into the constraints, or the constraints may be physically separate from the duct 114 and only attach to the flexible rods.

Referring again to FIG. 12, each duct section 120, except for the most distal duct section 120, may include at least two pleats 1202a, 1202b (referred to collectively as pleats 1202 and generically as pleat 1202). The pleats 1202 may contain the spine 124 which supports the duct 114 when assembled. There may be a plurality of pleats 1202 which run the length of the duct 114 and hold the spine 124 in place to support the duct 114. The pleats 1202 may include an inner cavity through which a spine 124 passes to support the duct 114. At the location where two duct sections 120 are connected there may not be a pleat 1202 and the spine 124 may be exposed to the interior cavity 163.

The spine 124 may be sectioned into a plurality of spine sections. This may facilitate passage of the spine 124 up the tower 102. Each section of the spine 124 may be composed of rods or tubes. Each section of the spine 124 may additionally be made from a different material than the other sections. In an embodiment, more flexible and lightweight materials may be used as the spine 124 progresses from the proximal end 161 to the distal end 162 of the blade 108. The spine 124 may be cantilevered into the inaccessible section 125 until the blade tip 118. Obstructions may have to be removed to allow the spine 124 to extend into the inaccessible section 125.

Sections of the spine 124 may be connected to one another using a spine section connector. The spine section connector may be any one or more of a push button connector, a sleeve connector, or a spring action connector and/or adhesive. The spine section connector is configured to lock two adjacent spine sections together and help distribute forces. The spine section connector may be a mechanical locking connector. The mechanical locking connector may include at least two modes of locking to prevent vibrational loosening. The connector may include a secondary locking mechanism that can only be placed after the first mechanical locking mechanism is properly locked. For example, locking or installation of the secondary locking mechanism may be prevented when the first locking mechanism is improperly placed or installed. This may guarantee that the installer places at least one locking mechanism correctly. In an embodiment, a "spring pin" or "roll pin" may be placed under a push button to prevent the button from compressing and to prevent the installer from improperly decompressing the button.

Figure 13:
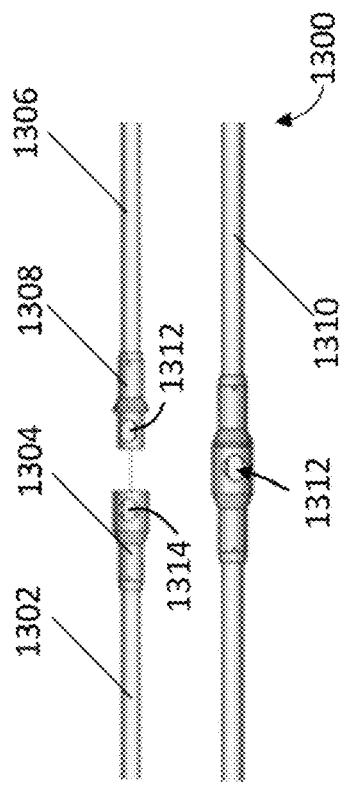
FIG. 13 is a schematic diagram of two rods, shown in both an unconnected and connected state, used to make a spine, in accordance with an embodiment.

Referring now to FIG. 13, shown therein is an example connection mechanism 1300 used to connect two spine segments of a spine, according to an embodiment. The connection mechanism 1300 may be implemented at each instance where adjacent spine segments meet along the length of the spine.

The spine 124 includes a first rod 1302 having a first interspine connector 1304 and a second rod 1306 having a second interspine connector 1308. The first rod 1302 and the second rod 1306 connect via the interspine connectors 1304, 1308 to form the connected rod 1310. First rod 1302 may, at its other end (not shown) have an instance of second interspine connector. Second rod 1306 may, at its other end (not shown) have an instance of first interspine connector. The second interspine connector 1308 includes a male component (e.g. button) 1312. The first interspine connector 1304 includes a female component (e.g. slot) 1314 for receiving the male component 1312. The male and female components 1312, 1314 may together form a push-button connection mechanism.

Rigid rods which are strong in axial tensile loading may be weak in lateral loading. The rods may be equipped with a circumferential reinforcement to increase the ability of the rod to withstand lateral loading. In an embodiment, a stainless steel "ear clamp" may be placed around the rod near the connector. In an embodiment, steel strapping may be wrapped around the rod near the connector.

In some embodiments, the connection mechanism 1300 may include a roll-pin. The roll-pin may prevent vibrational loosening of the push-button mechanism.

In embodiments, the connection mechanism 1300 is a mechanical locking connector (such as in FIG. 13).

Referring again to FIG. 2, in some embodiments, the duct 124 is secured directly to the blade 108 via webbing loops such as representative webbing loops 1204*a* or 1204*b* of FIG. 12. In other embodiments, the duct 124 is connected to the blade 108 using a rail system. In yet other embodiments, the spine 124 is mounted to the blade 108 using any one or more of pipe clamps, loop clamps, j-hooks, carabineers, and routing clamps. In such embodiments, the connection may be made to the blade 108 itself (i.e. an interior surface of the blade 108) or via the shear web 121. Axial motion of the spine 124 and duct 114 during operation may be further prevented by adding U-bolts to the rod of the spine 124 around the routing clamps. The routing clamps may be strong stainless-steel brackets that pin the rod to the shear-web 121. As the rod is forced towards the tip 118 of the blade 108, the U-bolt that penetrates the rod on either side of the routing clamp transfers that axial force from the rod onto the clamp, and from the clamp onto the shear web 121 to prevent the rods from moving. The routing clamps may be located at the most distal accessible location, and in some cases on the rod right by the heater.

The duct 114 may be supported by a duct support assembly 126. The duct support assembly 126 may include a duct support 249 for providing support and structure, a duct fastener 132 for securing the duct to the blade 108, and a duct fastener receptacle 134 for receiving the duct fastener 132.

In an embodiment, the duct support 249 may include a rib cage. In an embodiment, the rib cage includes PVC, ABS, Polycarbonate, or PEX piping or formed sheets. PEX may be preferred as PEX may advantageously not become brittle in cold temperatures. In another embodiment, fiberglass rods are used to form fiberglass ribs secured to a "backbone" and "sternum" using a connector such as set screws or glue. In another embodiment, the fiberglass ribs may be replaced by sheets to form a hoop. The rib cage may be pressure fit into the blade 108.

A duct support 249 may be connected to the spine 124 at the locations where the spine 124 is exposed between pleats 1202 of FIG. 12.

Figure 14:
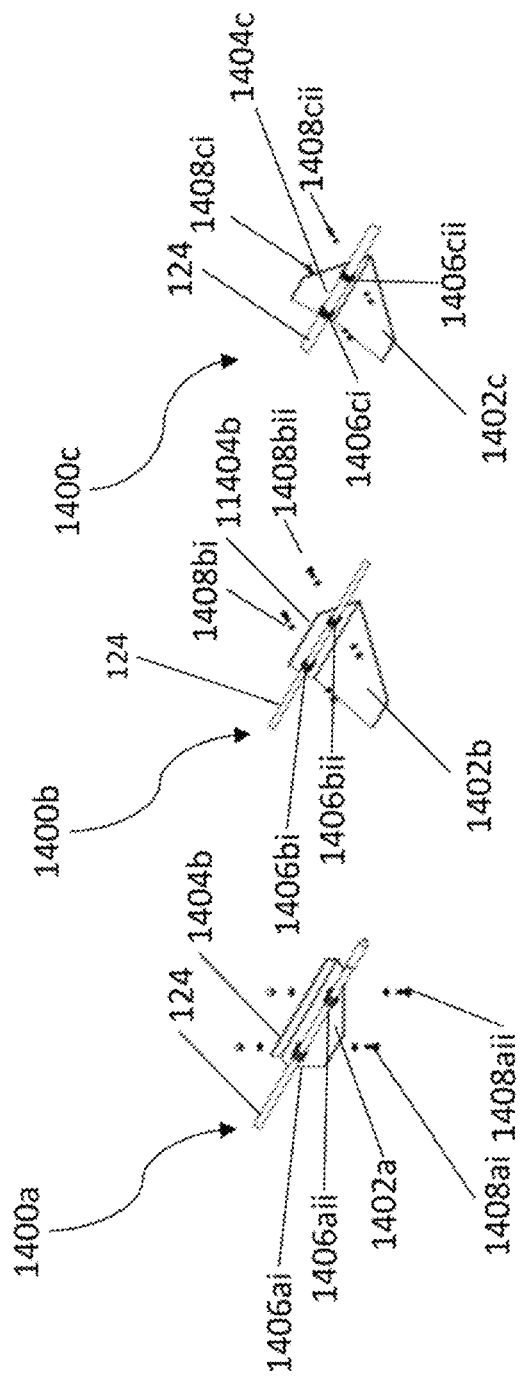
FIG. 14 is a schematic diagram of three flat duct supports, in accordance with an embodiment.

Referring now to FIG. 14, shown therein are perspective views 1400*a*, 1400*b*, and 1400*c* of flat duct supports assemblies connected to a spine 124, according to an embodiment. These flat duct supports assemblies are referred to collectively as flat support assemblies 1400 and individually as flat duct support assembly 1400. The flat duct support assemblies' 1400 components and pieces are similarly referred to. Flat duct support assemblies 1400*a*-1400*c* may be used for the same duct 114 but at various locations along the length of the spine 124. The duct support assemblies may have a consistent shape when used in different blade types 118 but may vary in thickness, dimensions, and hole locations.

The flat duct support assembly 1400 may include a flat plate first piece 1402 significant perpendicular to a flat plate second piece 1404. Two loops 1406*i* and 1406*ii* may be mounted to the first piece 1402 for flat duct support assembly 1400*a* or the second piece 1404 for flat duct support assemblies 1400*b* and 1400*c* for connecting the spine 124 to the flat duct support assembly 1400. Two bolts 1408*i* and 1408*ii* may be placed through the first piece 1402 for flat duct support assembly 1400*a* or the second piece 1404 for flat duct support assemblies 1400*b* and 1400*c* for connecting the flat duct support assembly 1400 to the blade 108.

In an embodiment, flat duct supports may be equipped with flanges which act as "skid plates". The skid plate flange provides an angled surface which transfers the installers axial force into a vertical or horizontal motion when the skid plate reaches an obstruction. This transformation of axial force into vertical or horizontal motion may allow the duct support to pass over obstructions in the accessible and inaccessible regions of the turbine blade 108.

Skid plates may be present on the distal side of a duct support or on the proximal side of the duct support. The distal side skid plate may transform the axial pushing force into vertical or horizontal motion during installation. The proximal side skid plate may transform the axial pulling force into vertical or horizontal motion during un-installation.

Figure 15B:
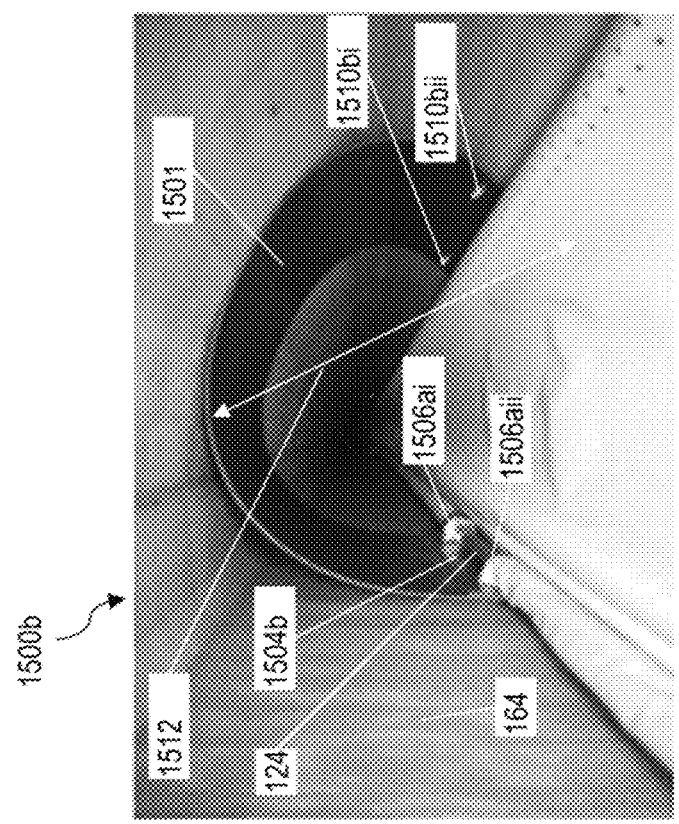
FIG. 15B is a photograph of a hoop duct support supporting a duct in a wind turbine blade, in accordance with an embodiment.
Figure 15A:
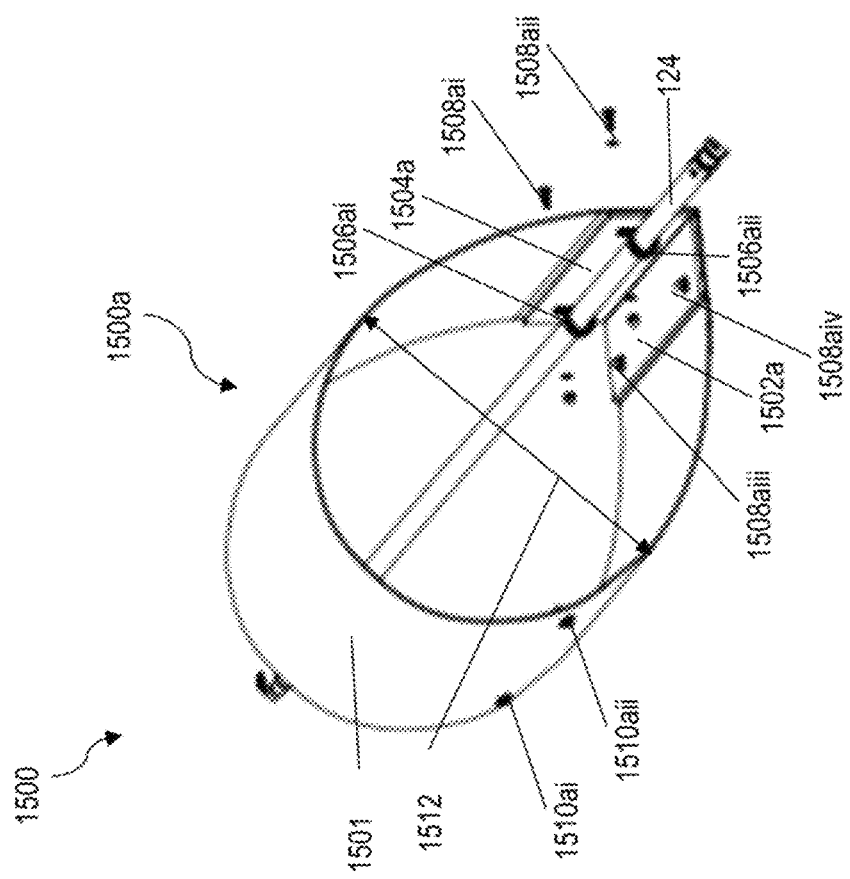
FIG. 15A is a schematic diagram of a hoop duct support, in accordance with an embodiment.

Referring now to FIG. 15A therein is a hoop duct support assembly 1500 connected to a spine 124, according to an embodiment. FIG. 15B is a photograph 1500*b* illustrating an example implementation of the hoop duct assembly 1500 of FIG. 15A in a wind turbine blade (e.g. wind turbine blade 108 of FIG. 1). Counterpart components in FIGS. 15A and 15B are denoted with the same reference numbers.

The hoop duct support assembly 1500 may include a hoop 1501 (which may be made from a flat sheet) and a bracket including a flat plate first piece 1502 arranged substantially perpendicular to a flat plate second piece 1504. Two loops 1506*i* and 1506*ii* may be mounted to the first piece 1502 or the second piece 1504 for connecting the spine 124 to the hoop duct support assembly 1500. Four bolts 1508*i*-1508*iv* may be placed through the first piece 1502, the second piece 1504, or both for connecting the hoop duct support assembly 1500 to the blade 108 and the hoop 1501. Two additional fasteners 1510*i* and 1510*ii* referred to individually as hoop fastener 1510 and collectively as hoop fasteners 1510 may be placed through the hoop into the interior surface 164 of the blade 108 to further connect the hoop duct support assembly 1500 to the blade 108. These hoop fasteners 1510 may be located at varying positions along the hoop depending on the geometry of the interior surface 164 at the installation location.

The hoop duct support cross-sectional diameter 1512 may vary along the length of the blade 108 depending on the geometry of the interior surface 164. For example, hoop duct supports' cross-sectional diameters 1512 may decrease in size for each support as they progress along the length of the blade 108 from the proximal end 161 to the distal end 162. The size of the other components of the hoop duct support assembly 1500 may also scale accordingly.

In an embodiment, the bracket including the flat plate first piece 1502 and flat plate second piece 1504 may be constructed from a flat plate (not shown) which is bent to form the two pieces. The flat plate 1520 may have a plurality of rows of bolt locations (e.g. holes through which a bolt can pass and be secured). The rows of bolt locations can be used to form hoops of different sizes. A desired hoop size may be achieved by securing bolts through a particular row of bolt locations. This technique can be used to assemble different sizes of hoop supports. This construction method may serve as a means to produce fewer sizes of hoop duct support brackets that result in multiple planned sizes of assembled duct support, e.g. using the first row of bolt location produces a first size, using the second row produces a second size, etc. This construction method may also advantageously provide a precise fit in the interior cavity 164 by accommodating imprecise manufacturing or differences in the interior cavity 164 geometry from manufacturer's claimed size.

In an embodiment, the hoop 1501 may be equipped with "skid plates". The skid plates may be attached to or detached from the hoop 1501 as necessary. The skid plate position with respect to the 90 degree corner may vary from turbine to turbine and may be placed at specific positions to be most effective at sliding the hoop 1501 past obstructions. The skid plate may be made of the same material and thickness as the hoop or may be made of a more rigid or thicker material to ensure that the hoop 1501 deforms into a smaller circumference before the skid plate deforms. If the skid plate deforms before the hoop 1501 does, then the hoop 1501 will not pass the obstruction.

In an embodiment, spacers may be used around the bolts 1508aii between the clamping hardware 1506aii and the duct support bracket 1504a in order to distance the spine 124 from the shear web 164 (where obstructions may be present). Distancing the spine 124 from the shear web 164 may decrease the chances of the spine 124 hitting an obstruction. Once the spine 124 hits an obstruction, it can be difficult or impossible to move the spine 124 laterally to pass the obstruction manually, depending on the size and profile of the obstruction. Spacers may be advantageous when the assembly 1500 is required to pass obstructions, but it may be disadvantageous to increase the space between the spine 124 and the shear web 164 because larger torques and moment will be induced on the hardware 1508 when compared to an embodiment with zero spacers.

Generally, hoop duct supports 1500 are used in locations located proximally relative to locations in which flat duct supports 1400 are used.

Referring again to FIG. 2, the ice protection system 101 may include a control system 103. The control system may monitor the environmental conditions inside and outside of the blade 108. This may include receiving sensor data from various sensors and analyzing the received sensor data. The control system may also control the operating condition of the heater 137 and blower 139.

The control system 103 includes a plurality of sensors 105. The sensors 105 may be coupled to the control system 103 using a sensor cable 260. In some cases, multiple sensors may use a single sensor cable. This may advantageously decrease the total number of cables in the blade 108 to reduce the chance of items wearing, and typically larger cables have more robust armor/insulation around them. Multiple sensors may send data down their respective manufacturer's cables, which may terminate in a junction box (typically the blade junction box) where that signal is passed into a different cable which extends towards the Blade Control Panel 252 or Hub IO panel 214. The sensors 105 collect data about the conditions within, without, and of the wind turbine blades 108, and provide the collected sensor data to the control system 103 for analysis by a processing unit of the control system 103. The sensor cable 260 communicatively connects the sensor 105 to the control system 103. The sensor cable 260 enables data transmission from the sensor to the control system 103 for analysis.

The control system 103 may adjust the operating state and parameters of one or more of the heater 137 and blower 139, collectively referred to as the heating systems, based on an operating condition determined by the control system 103. The operating condition is determined based on an analysis of the sensor 105 data by the processing unit of the control system 103. The operating condition may also be determined using additional information, such as an operating level of the heating systems (e.g. a temperature of air, or power consumed by each heater 137). The control system 103 is further configured to generate a control signal based on the operating condition determination. The control signal encodes instructions which, when received by the heating system, can be used to adjust the operating state or an operating parameter of the heating system. The operating state of the heating systems may be off or on. The operating parameter may be one or more of blower 139 speed or heater 137 intensity. The control system 103 transmits the control signal to the heating system.

The sensors 105 may include any one or more of accelerometers, temperature sensors, air velocity sensors, and air pressure sensors. Each blower assembly 110 may include a temperature sensor to measure the temperature of the air entering or leaving the blower 139. One or more blower assemblies 110 of the ice protection system 101 may include an accelerometer. The sensors 105 may include sensors configured to monitor a performance output of the wind turbine 100. The performance output sensor data can be analyzed by the control system 103 processing unit to determine if the wind turbine 100 at an expected level considering other known parameters.

The sensors 105 may include a temperature sensor for sensing an air temperature of interior of the wind turbine blade 108. The sensors 105 may include a temperature sensor for measuring the temperature of an internal surface of the wind turbine blade 108. The control system 103 may adjust an output of the heater 137 or the blower 139 based on an input provided by the temperature sensor(s) (e.g. temperature sensor data). The control system 103 may adjust an output of the heater 137 or blower 139 based on SCADA data. For example, the control system 103 may control the ice protection system 101 (e.g. an output of the heater 137 or blower 139) based on an RPM of the turbine 100 and measured wind speed.

The control system 103 perform certain operations automatically. For example, the control system 103 may automatically calculate an expected payback for curtailing a turbine 100 to assist the ice protection system 101 using any one or more of historical "learned power curves" and weather forecasts, and machine learning. The control system 103 may combine data from the reported power output of the turbine 100, current weather conditions (e.g. wind speed, wind temperature, humidity), and ice sensors (e.g. fos4X, Eologix) to determine if the turbine 100 is currently iced or at a high risk of experiencing icing. If the turbine 100 is iced or at a high risk of icing, the ice protection system 101 may be turned on (e.g. by operation of the control system 103) without interrupting operation of the turbine 100. If the control system 103 still believes that the turbine 100 is iced, the control system 103 may calculate a potential payback of curtailing the turbine 100 to help the deicing procedure. This may only be beneficial if the icing event has passed and weather conditions are within the deicing range. To calculate the payback, the control system 103 may refer to a learned curve. The learned curve may be created for each specific turbine 100 and become more accurate with more data points. The learned curve may become more accurate by increasing the number of environmental factors and turbine parameters on which the curve is dependent, including but not limited to temperature, humidity, wind direction, turbine status codes, turbine RPM, and turbine blade pitch. If the turbine 100 is spinning fast, it may be very difficult to deice. Therefore, if the wind is very high and the turbine 100 is underproducing at a medium RPM level, and deicing can be performed at a lower RPM, it may be advantageous to reduce the RPM (therefore losing power production) during a short deicing period in order to return to a higher RPM (and produce more power at the deiced high RPM than we would have at the iced medium RPM level). The control system 103 automatically notifies a technician that the control system 103 has engaged the ice protection system 101. Then, before the control system 103 curtails the turbine 103, the control system 103 may request permission from the technician before proceeding (it would explain the projected power production without curtailment and the projected power production with curtailment).

The control system 103 may be configured to initiate (i.e. turn on) the ice protection system 101 when the control system 103 senses that the blade 108 is below a certain reference temperature or that a certain amount of ice has accumulated on the exterior of the blade 108. The control system 103 may be configured to initiate the ice protection system 101 when the control system 103 determines that the turbine 100 is producing less energy than expected based on a known wind speed or is producing too much energy which indicates that the anemometer is iced up and therefore reading unrealistically low wind speeds.

Figure 16:
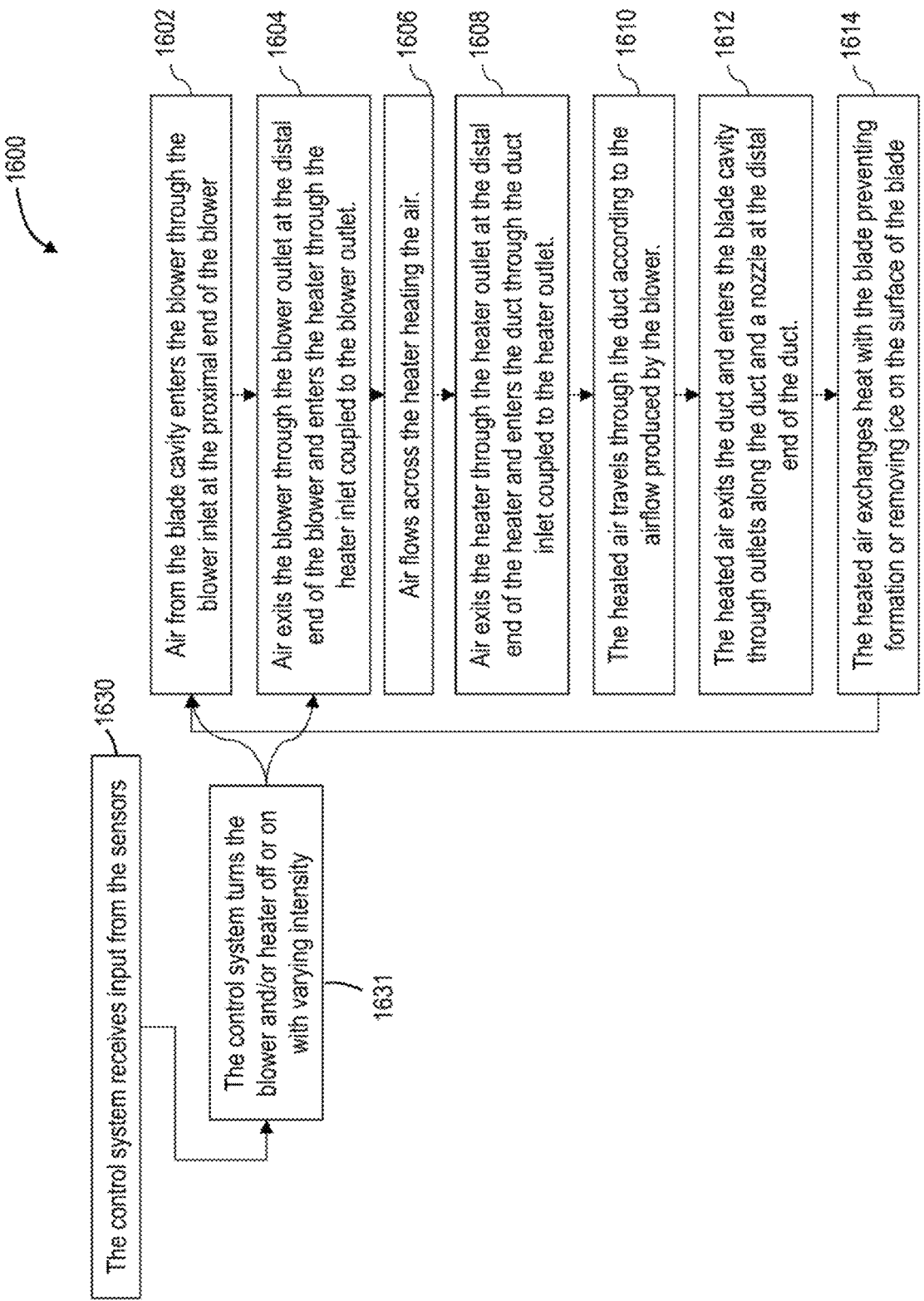
FIG. 16 is a flow diagram of a method of heating a wind turbine blade using an ice protection system, according to an embodiment.

Referring now to FIG. 16, shown therein is a flow diagram of a method 1600 of heating a wind turbine blade using an ice protection system, according to an embodiment. The method 1600 may be implemented by the ice protection system 101 of FIG. 2.

At 1602, air enters the blower 139 through the blower inlet (e.g. blower inlet 1006 of FIG. 10) at the proximal end of the blower 139.

At 1604, air exits the blower 139 through the blower outlet (e.g. blower outlet 1020 of FIG. 10). Air also enters the heater 137 through the heater inlet (e.g. heater inlet 1112 of FIG. 11), which is coupled to the blower outlet 1024.

At 1606, air flows across the heater 137 and is heated into a heated airflow 142.

At 1608, the heated airflow 142 exits the heater 137 through the heater outlet (e.g. heater outlet 1120 of FIG. 11). The heated airflow 142 also enters the duct 114 which is coupled to the heater outlet.

At 1610, the heated airflow 142 travels through the duct 114.

At 1612, the heated airflow 142 exits the duct 114 through one or more of the nozzle 131 and the outlets 246. The heated airflow 142 enters the cavity 163 of the blade 108.

At 1614, the heated airflow 142 exchanges heat from the heated airflow 142 with the blade 108. This may prevent ice formation on the blade 108 or removal of ice formed on the blade 108.

At 1602. the air (having exchanged heat with the blade 108) may further mix with ambient air in the interior cavity 163 of the blade 108 near the blower inlet and reenter the blower 139 through the blower inlet 1006.

At 1630, the control system 103 receives input from the sensors 105.

At 1631, the control system 103 adjusts the operating state of one or more of the blower 139 and heater 137 based on the received sensor input. This may include turning the blower 139 or heater 137 on or off or varying the output of the blower 139 or heater 137.

Referring again to FIG. 2, in some embodiments, the blower 139 may pull air from and/or send air to the duct 114. In other embodiments the blower 139 may pull air from and/or send air to the shear web 121 gap. In other embodiments the blower 139 may use a combination of the above or alternatives as air sources or routes. In embodiments, the blower 139 may pull air from or send air to all or part of these sources and routes. The heater assembly 112 may be an intermediary for any of these sources and routes.

The blower 139 may also control the amount of waste heat lingering around the heater assembly 112. The blower assembly 110 may also be designed with one or more filters for preventing particles from travelling through the heater assembly 112. The filter may be used as a permanent addition to the blower assembly 110, or the filter may be used for a short period of time directly after installation and removed once the airborne particles have been collected on the filter. Collecting and removing airborne particles may reduce the likelihood of particles attaching to the blower impeller 1006 or the heated elements inside the heater assembly 112. This may advantageously reduce the fire risk inside the blade 108 and prolong the lifetime of the blower assembly 110 and the heater assembly 112.

Referring again to FIG. 2, in some embodiments, the blade 108 may contain one or more blade weights 240. A blade weight 240 is added to an interior surface 164 of the wind turbine blade to balance the weight of the multiple blades 108 of the wind turbine 100 against each other. In some cases, a given blade 108 may have no blade weights 240 while others may have at least one. In an embodiment, a blade 108 may have between zero and four blade weights 240.

The location of the blade weight 240 may be such that the duct 114 may rub against the blade weight 240, causing damage to the duct 114. To prevent this wear on the duct 114, the blade weight 240 may be covered.

Figures 17A, 17B:
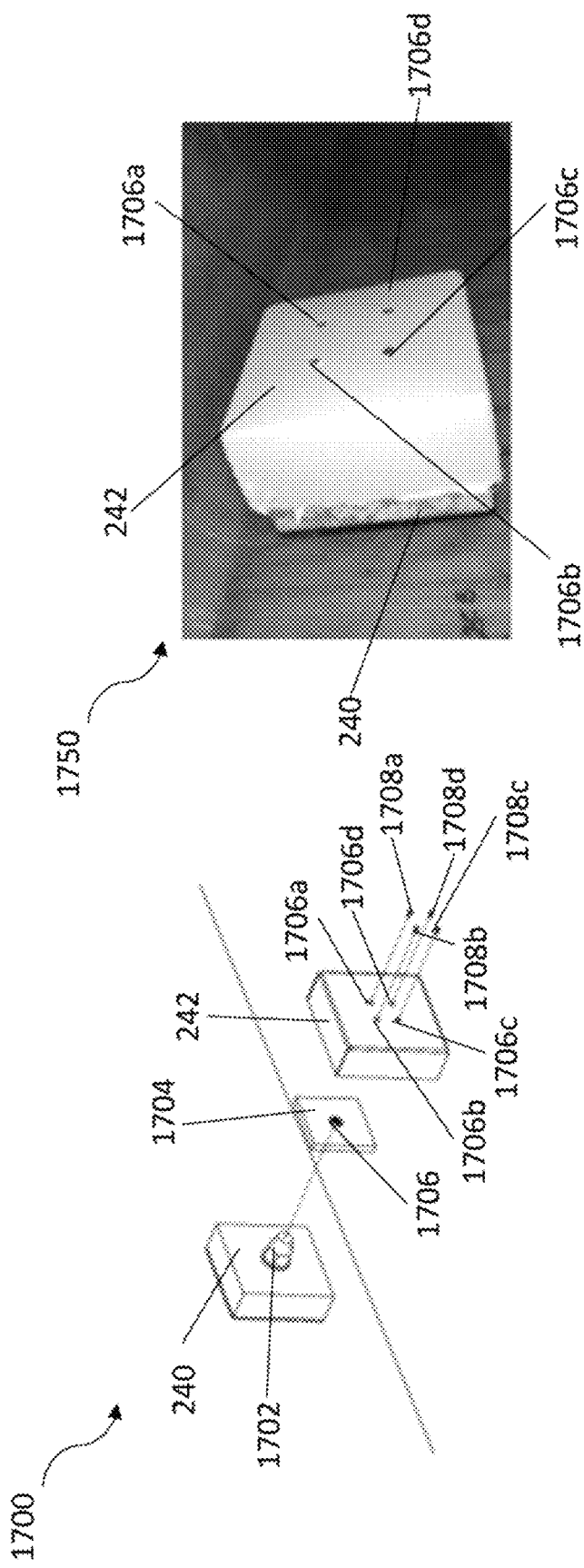
FIG. 17A is an exploded view schematic diagram of a blade weight and blade weight cover, in accordance with an embodiment.
FIG. 17B is a photograph illustrating a covered blade weight including blade weight and blade weight cover in a wind turbine blade, in accordance with an embodiment.

Referring to FIGS. 17A and 17B, shown therein is an exploded view schematic diagram 1700 and a photograph 1750 of a blade weight cover assembly, according to an embodiment.

The blade weight 240 may include a central bolt 1702 which secures the blade weight 240 to the interior surface 164. A square spacer 1704 with an appropriately threaded hole 1706 to receive the central bolt may be added to the blade weight 240 such that a blade weight cover 242 can be mounted thereto. The blade weight cover 242 may be made of a material that has low friction when in contact with the flexible duct 114. The material may be High Density Polyethylene ("HDPE") or ABS (e.g. to match material used for the duct supports).

The blade weight cover 242 may have four recessed bolt holes 1706a, 1706b, 1706c, and 1706d through which screws 1706a, 1706b, 1706c, and 1706d can be attached to the square spacer 1704 to secure the cover onto the blade weight 240.

Referring again to FIG. 2, various cables, which may include power cables, sensor cables, and control cables, may be used to communicatively and electrically connect various components of the ice protection system 101. The connected components may include the three hub panels 214, 216, and 218, the slip-ring 204, the nacelle panel 212, the blade junction box 244, the blower, 139, the heater 137, the control system 103, and the sensors 105.

Management of the cables within the wind turbine may not be straightforward as each wind turbine may have been manufactured differently. For example, differences may exist between different wind turbine/blade types, between different manufacturers of the same blades, between different instances of the same type of wind turbine (e.g. from one site to a different site), or between turbines at the same site. There may also be variance in blades 108 in the same turbine. For example there is a certain level of ambiguity left for installers to decide how cables are routed that results in slight differences depending on the installer. Therefore, the routing of the cables may be different for each installation. Preferably, all cables for the ice protection system follow established wind turbine 100 cable paths as determined by the manufacturer of the wind turbine 100. Cables should be bundled wherever possible while separating cables that are high voltage from those that are low voltage. Preferably, all cables will be secured to stationary metallic structures and protected from locations that could cause wear.

In some cases, the system may use short metal cable trays which allow for blade flexing. In other embodiments, the system may use thick ABS trays that provide the same or similar form and function. The ABS material may decrease costs, reduce the chance of cables wearing on the metal (ABS is softer than metal), and reduce the number of metallic components in the blade 108, thereby reducing the chance of lightning strikes or Electro-static-discharge. Further, an adhesive may be used to keep the cable trays down. In an embodiment, the footprint of the cable tray may include holes which allow for adhesive to squeeze through and increase bonding strength to the cable tray. In an embodiment, the footprint of the cable tray may include holes which are used to mechanically fasten the tray to a surface with hardware connectors such as screws or bolts. In an embodiment, cables may be glued directly to the blade 108. The flattest surface may be used, and surface pretreatment may be performed. Wires may be routed through the bearing plate 250 and protected from wear.

The cables within the ice protection system may be fiberoptic. For example, some or all temperature sensor cables may be fiberoptic. Fiberoptic cables may advantageously provide a lower likelihood of lightning damage or electro-static discharge damage compared to copper wires. The fiberoptic cables may be coiled onto a cable coil holder.

Referring again to FIGS. 8A-8C, the cables 810 which pass from the bearing plate panel 252 through the bearing plate 250 may first be mounted to the Unistrut rails 804 and 806 to which the bearing plate panel 252 is mounted according to an embodiment. The cables may be mounted to the Unistrut rails 804 and 806 using mustang clamps. The cables may be mounted in an S curve configuration. The S curve configuration may promote knotting of the cable if the cable comes loose (as opposed to the cable slipping out completely). Knotting can prevent the failure from propagating to more delicate components. For example, if the cable-ties that keep the cable on the cable trays break, then the cable weight will be transferred to the knot at the mounting point instead of to the terminal blocks inside the panel. It is also much worse to have cables loose in the blade because they will hit other components and cause external damage.

Referring again to FIG. 2, in some embodiments, some of the cables may terminate close to the proximal end 161. Examples include some cables of the cables 810 of FIG. 8 which are connected to the blower 139. These cables may be zip-tied to the blower bracket 140 due to its proximity to the bearing plate and convenience of existing holes.

Other cables may need to travel farther down the blade 108 to components connect to components located therein. Examples include the sensor cable 260 of FIG. 2. In an embodiment, these cables may be secured within the blade 108 by any of Velcro and cable trays.

Referring again to FIG. 12, the flexible duct 114 may include one or two Velcro strips collectively referred to as the sensor cable Velcro 1212. The sensor cable Velcro may be attached to and run along a length of the duct 114. The flexible duct 114 may include a secondary sensor cable Velcro strip attached to a flap which folds down onto the primary strip in order to sandwich the sensor cable between the primary and secondary Velcro strip. The sensor cable Velcro 1212 may be used to secure a fiberoptic sensor cable 260 therebetween. The sensor cable 260 may run the length of the duct 114.

The sensor cable 260 which runs along the duct 114, and which experiences motion during turbine operation, transfers to a component or blade feature which is stationary during turbine. In an embodiment, the sensor cable 260 may run along the heater 137 before terminating in the blade junction box 244. In an embodiment, the sensor cable 260 may transfer to the shear web 121, then along the heater 137, then terminating in the blade junction box 244. The transfer from a moving component like the duct 114, to a fixed component like the shear web 121 may require a strain relief mechanism. In an embodiment, the strain relief mechanism includes a plurality of cable tie mounts (e.g. 5 or fewer) adhered to the shear web 121 with the sensor cable 260 secured to the mounts with Velcro strips and the cable placed in a wave form. If the cable is pulled towards the distal section of the blade, the cable may slip through the first Velcro easily. If the tension continues and increases, the cable may slip through the second Velcro, but not as easily as the first due to the increased friction created by the wave orientation. This pattern of staggered slipping with increasing tension continues until the entire wave orientation has been flattened. If the tension continues and increases after the wave is flat, the Velcro may disconnect before the cable experiences a breaking force.

Referring now to FIGS. 18A and 18B, shown therein is a perspective view schematic 1800 and photograph 1850 of a cable tray 1802, for managing and securing one or more cables (e.g. electrical system cables, control system cables) within an interior cavity 163 of a wind turbine blade 108, according to an embodiment.

The cable tray 1802 includes a flat rectangular first piece 1802 substantially perpendicular to a flat second piece 1804 and a flat third piece 1806, the flat second piece 1804 and flat third piece 1806 being substantially parallel to each other.

The cable tray 1802 includes cable tray holes 1808a-1808d individually referred to cable tray hole 1808 and collectively as cable tray holes 1808. Cables such as cables 1820a-1820c individually referred to cables 1820 and collectively as cable 1820, may be secured to the cable tray using zip ties 1812a-1812d which may pass through a cable tray hole 1808.

The cable tray 1802 may be mounted onto an interior surface within the interior cavity 163. In an embodiment, the cable tray 1802 may be mounted directly onto the shear web 121. In this embodiment, the cable tray 1803 may be glued to the shear web 121. The glue 1814 used may be Sikaflex 292i. In another embodiment, the cable tray may also be mounted the interior surface 164 of the wind turbine blade 108. In this embodiment the cable tray may be glued or fastened to the interior surface 164. If fasteners are used the cable tray 1802 may include a hole such as represented by 1810 through which the fastener may pass.

The cable tray 1802 is designed to enable the separation of high voltage and low voltage cables, i.e. separation between the sensor cables and the power cables. At each cable tray, each cable may be bundled with cables of similar voltage (one low voltage, one high voltage). For example, cables 1820*b* and 1820*c* are bundled separately from cable 1820*a*. The separate cable bundles may be secured to opposite flat cable tray pieces using zip ties separating them from each other. For example the bundle comprising of cable 1820*a* is secured to the flat cable tray second piece 1804 using zip ties 1812*a* and 1812*b* and the bundle comprising of cables 1820*b* and 1820*c* is secured to flat cable tray third piece 1806 using zip ties 1812*c* and 1812*d*.

The length of cable that passes between cable tray pieces 1804 and 1806 may be pulled taught before being zip tied to the cable tray 1802. This may ensure the length of cable is as short as possible thereby minimizing movement of the cable. This minimizing of movement may minimize strain on the cable tray 1802.

The ice protection system 101 may be active in a plurality of wind turbine 100 states. For example, the ice protection system 101 may be active while the wind turbine 100 is in operation, curtailment, idle, or parked.

Figure 21:
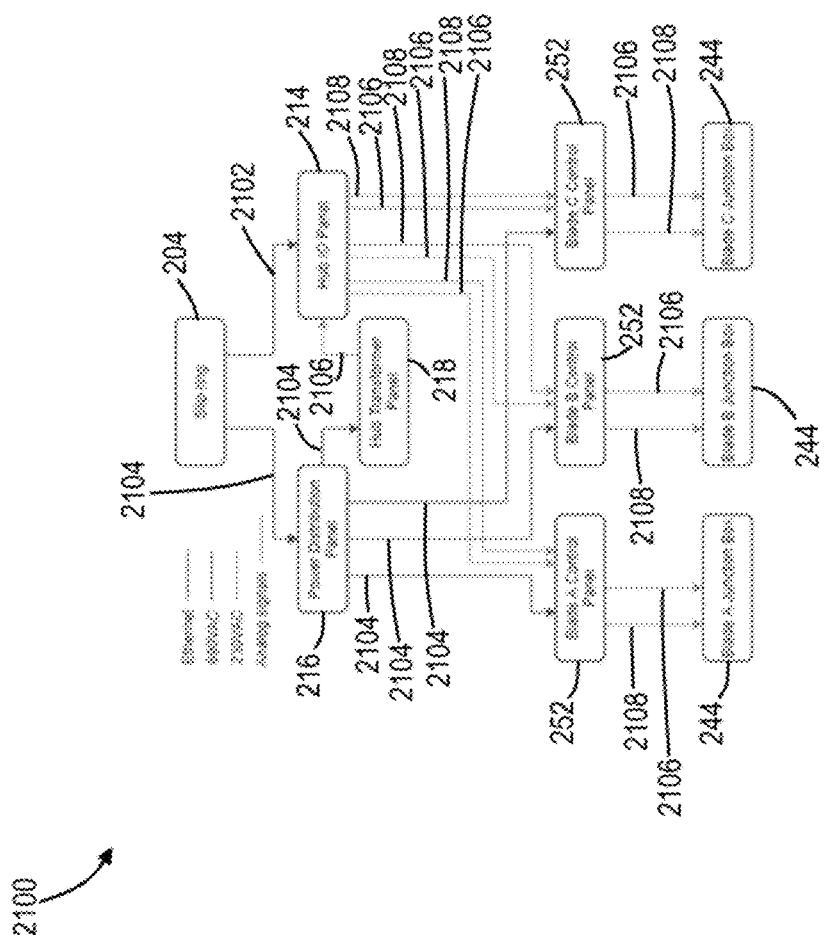
FIG. 21 is a block diagram of a panel network, according to an embodiment.

Referring now to FIG. 21, shown therein is a panel network 2100 for use with an ice protection system in a wind turbine, according to an embodiment. The panel network 2100 may be used, for example, in a SWT3.2 G1.0 wind turbine design.

The panel network 2100 includes a slip ring 204, a power distribution panel 216, a hub IO panel 214, a hub transformer panel 218, blade control panels 252, and blade junction boxes 244.

The various components of the panel network 2100 communicate via ethernet connection 2102, 690 VAC 2104, 230 VAC 2106, and analog signals 2108.

The slip ring 204 outputs signals to the power distribution panel 216 via 690 VAC 2104 and the hub IO panel 214 via ethernet connection 2102.

The power distribution panel 216 outputs signals to the hub transformer panel 218 and each of the blade control panels 252 via 690 VAC 2104.

The hub transformer panel 218 outputs signals to the hub IO panel 214 via 230 VAC 2106.

The hub IO panel 214 outputs signals to the blade control panels 252 via 230 VAC 2106 and analog signals 2108.

The blade control panels 252 receive the signals from the power distribution panel 216 and the hub IO panel 214 and each output signals to respective blade junction boxes 244 via 230 VAC 2106 and analog signals 2108.

Figure 22:
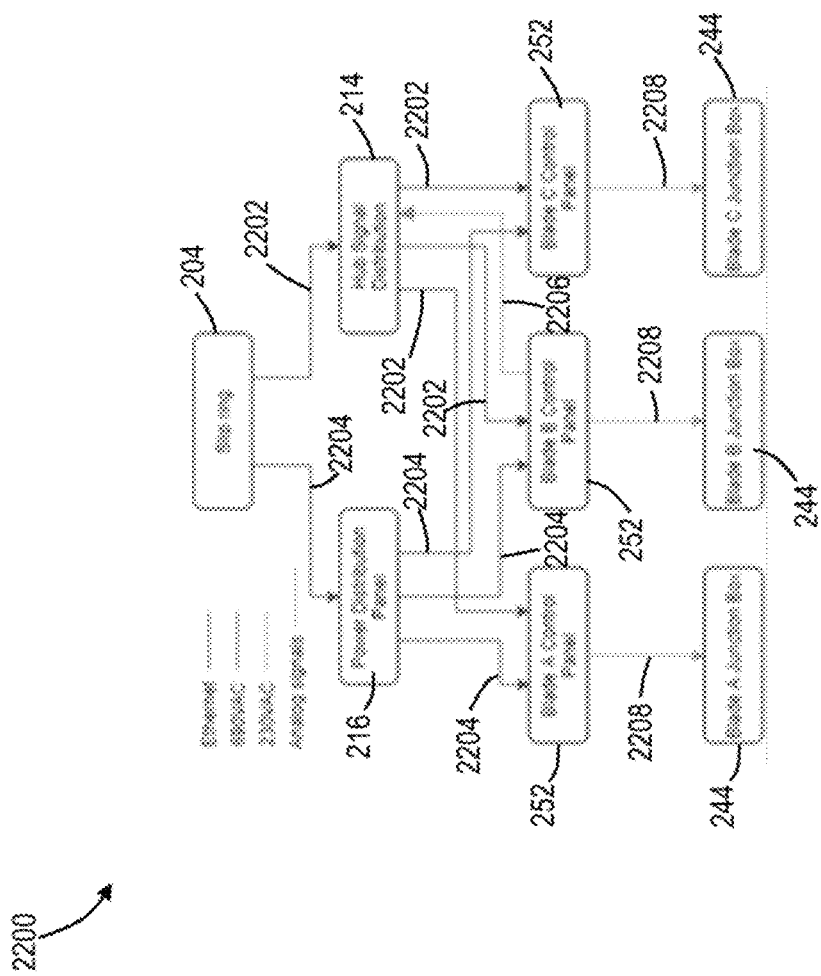
FIG. 22 is a block diagram of a panel network, according to an embodiment.
Figure 24A:
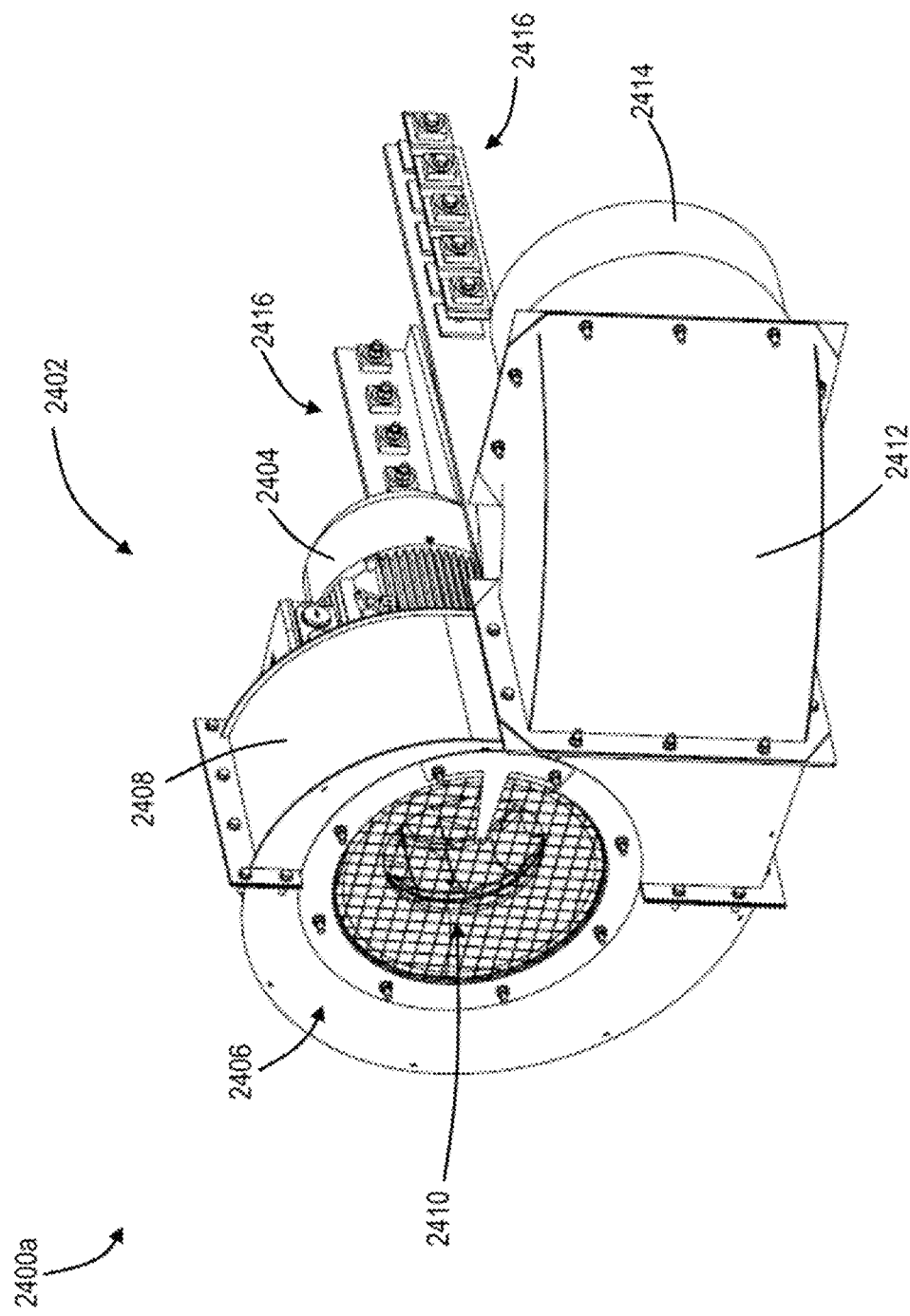
FIG. 24A is a front perspective view schematic diagram of a blower assembly, according to an embodiment.
Figure 24B:
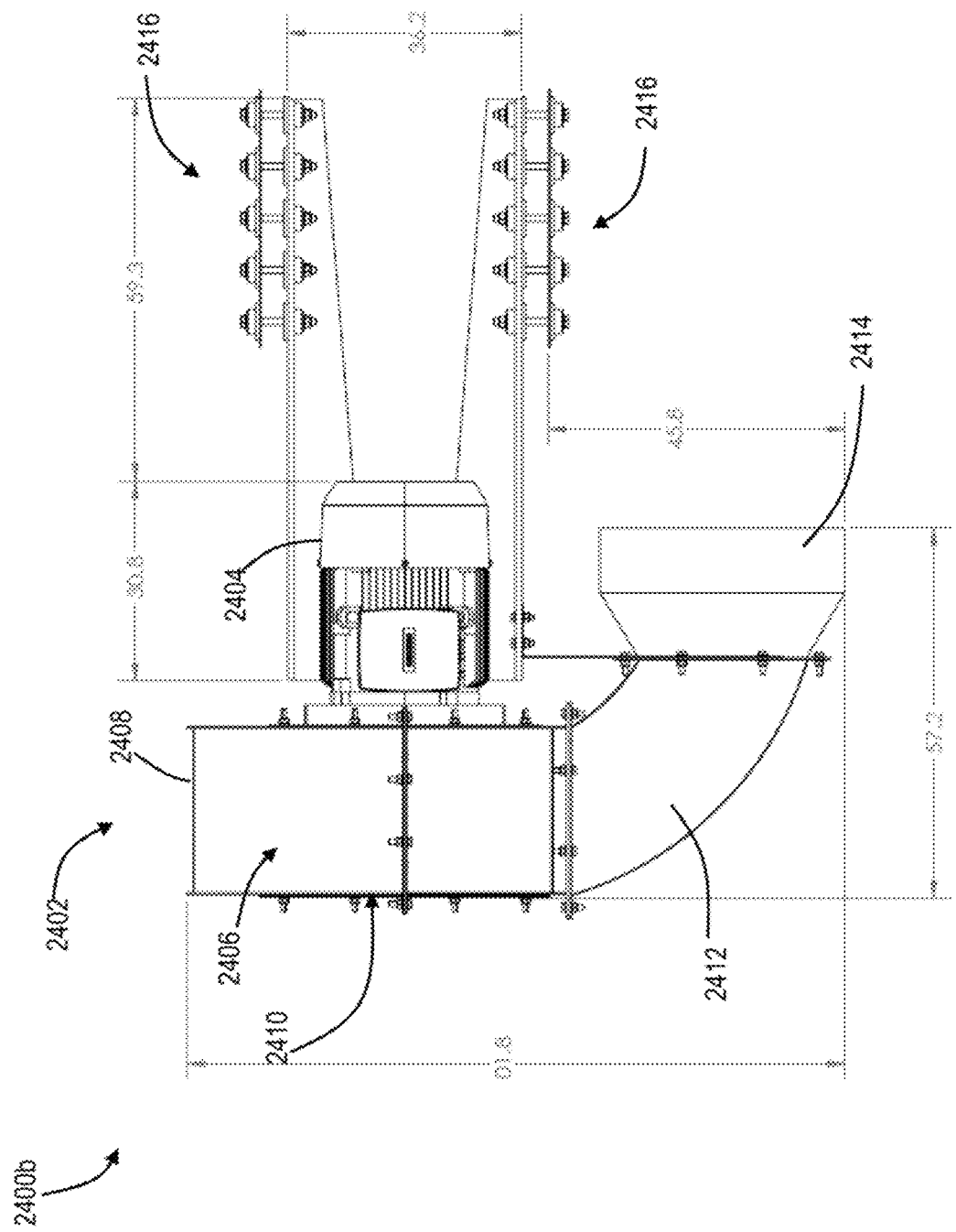
FIG. 24B is a top view schematic diagram of the blower assembly of FIG. 24A.
Figure 24C:
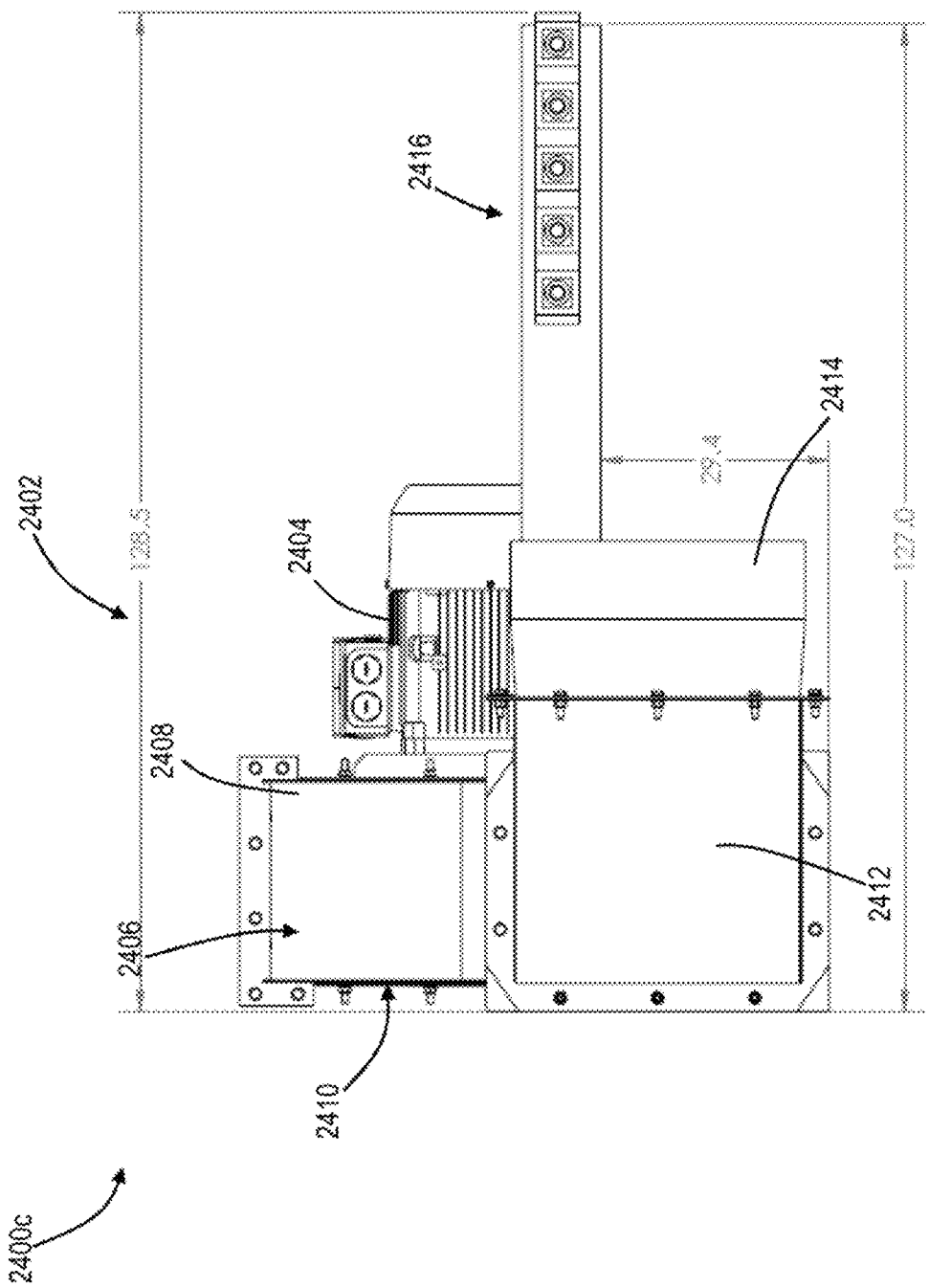
FIG. 24C is a side view schematic diagram of the blower assembly of FIG. 24A.
Figure 24D:
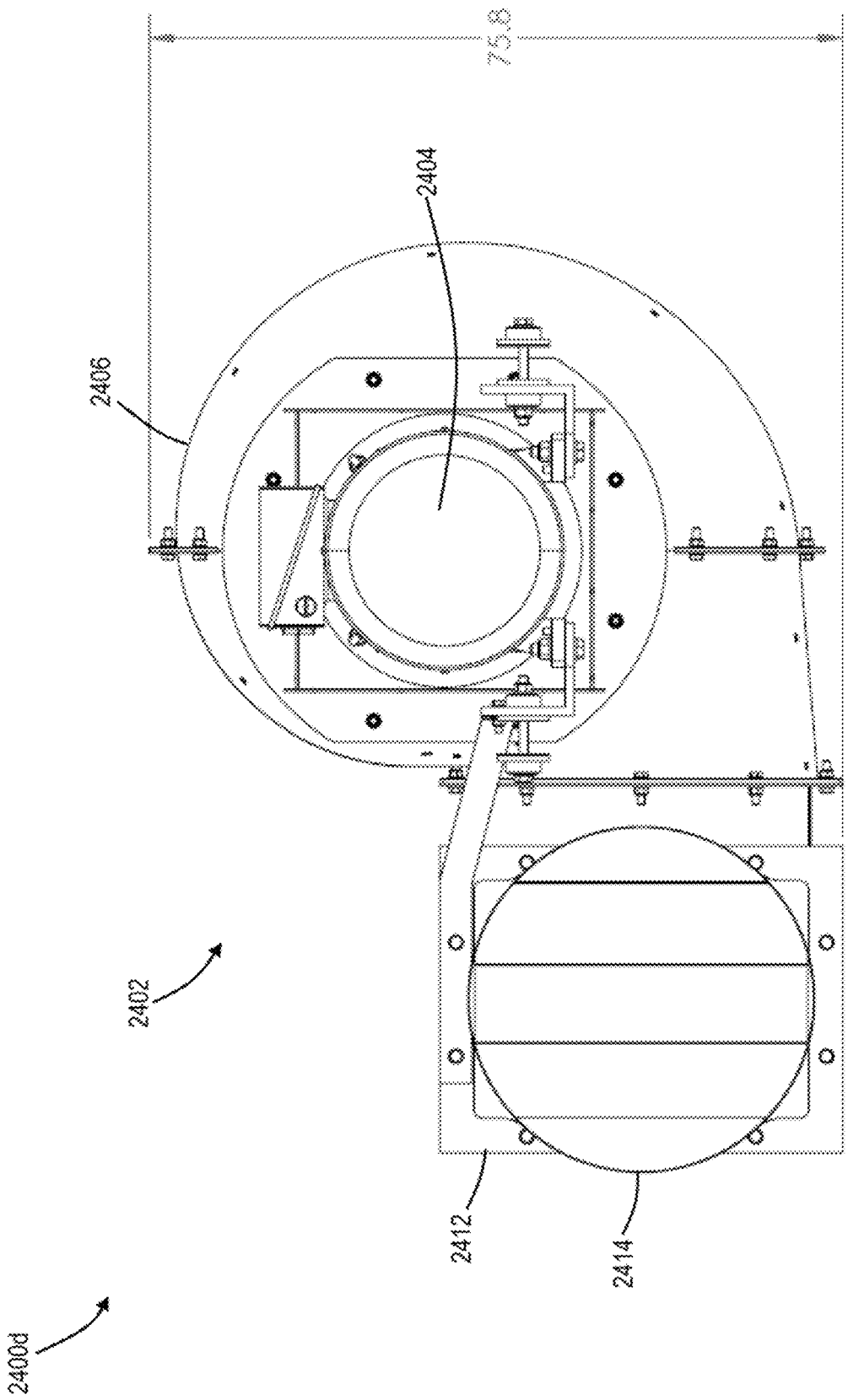
FIG. 24D is a rear view schematic diagram of the blower assembly of FIG. 24A.
Figure 24E:
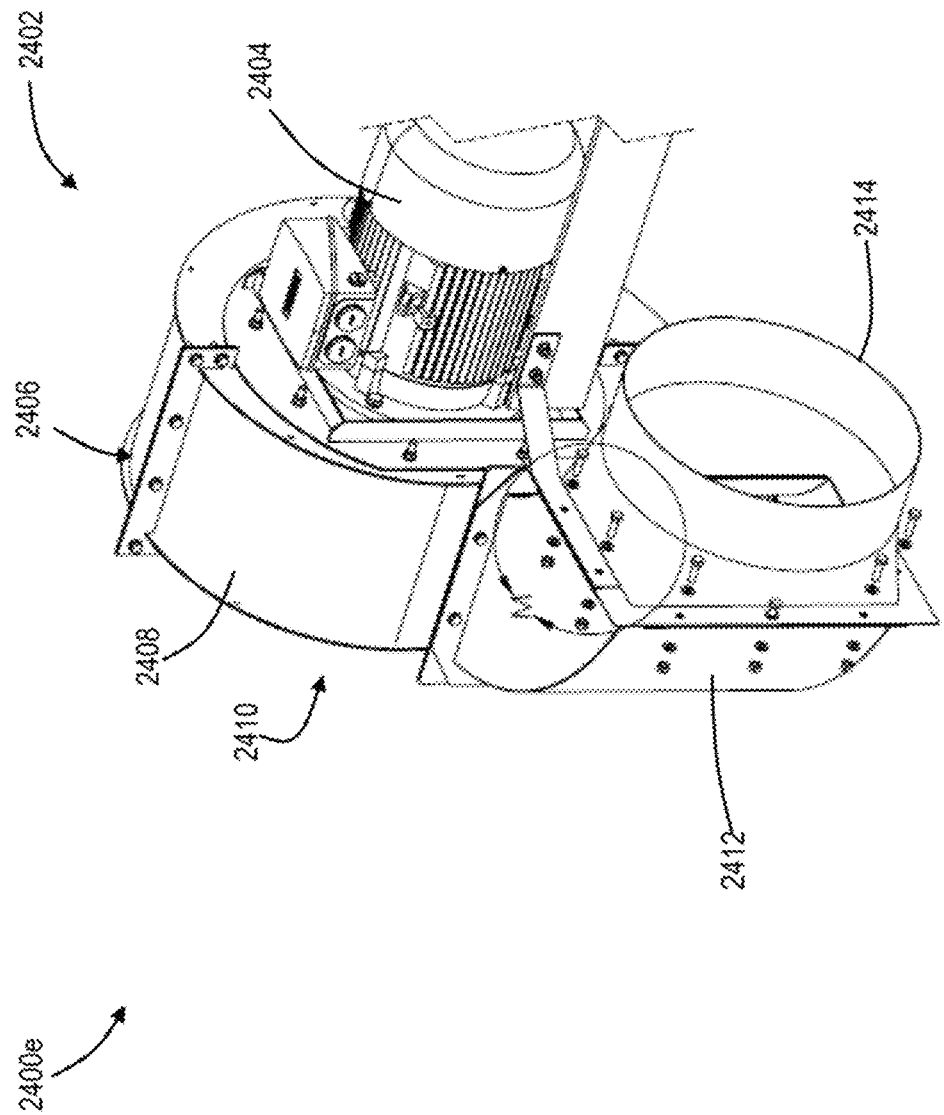
FIG. 24E is a rear perspective view schematic diagram of the blower assembly of FIG. 24A.

Referring now to FIG. 22, shown therein is a panel network 2200 for use with an ice protection system in a wind turbine, according to an embodiment. The panel network 2200 may be used, for example, in a SWT3.2 G2.0 or an LM45 G1.0 wind turbine design.

The panel network 2200 includes a slip ring 204, a power distribution panel 216, a hub signal distribution module 214, blade control panels 252, and blade junction boxes 244.

The various components of the panel network 2200 communicate via ethernet connection 2202, 690 VAC 2204, 230 VAC 2206, and analog signals 2208.

The slip ring 204 outputs signals to the power distribution panel 216 via 690 VAC 2204 and the hub signal distribution module 214 via ethernet connection 2202.

The power distribution panel 216 outputs signals to each of the blade control panels 252 via 690 VAC 2104.

The hub signal distribution module 214 outputs signals to the blade control panels 252 via ethernet connection 2202.

A blade control panel 252 (Blade B Control Panel) outputs signals to the hub signal distribution module 214 via 230 VAC 2206.

The blade control panels 252 receive the signals from the power distribution panel 216 and the hub signal distribution module 214 and each output signals to respective blade junction boxes 244 via analog signals 2108.

Referring now to FIG. 23, shown therein is a photograph of a mounting configuration 2300 of a blade control panel 252 to a bearing plate 250, according to an embodiment. FIG. 23 also shows a plurality of cables 2302 which connect to the blade control panel 252. The cables are configured to send and receive signals to and from the blade control panel 252.

Referring now to FIGS. 24A to 24E, shown therein are front perspective 2400*a*, top 2400*b*, side 2400*c*, rear 2400*d*, and rear perspective 2400*e* views of a blower assembly 2402, according to an embodiment. The blower assembly 2402 may be the blower assembly 110 of FIG. 2. The blower assembly 2402 may function similarly, and similar components may function similarly, to the blower assembly of FIGS. 10A to 10D.

The blower assembly 2402 includes a blower motor 2404, a blower fan component 2406 including a blower shell 2408 and a blower fan 2410, a blower duct 2412, and a blower duct connector 2414. The blower duct connector 2414 also provides an outlet for the blower assembly 2402. The blower assembly 2402 also includes attachment points 2016 with connectors for mounting the blower assembly 2402 in the wind turbine blade.

Figure 29:
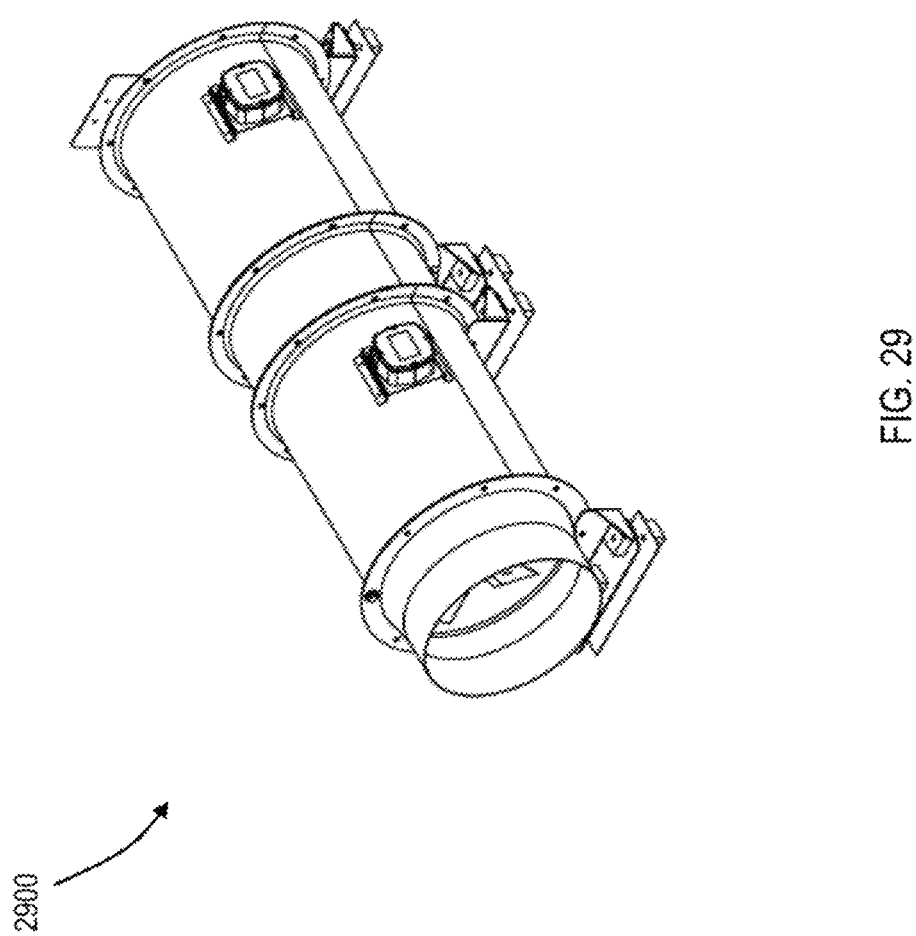
FIG. 29 is a perspective view schematic diagram of a blower assembly, according to an embodiment.

A further embodiment of a blower assembly which may be used in an ice protection system of the present disclosure (e.g. as blower assembly 110 of FIG. 2) is shown in FIG. 29. The blower assembly 2900 of FIG. 29 may be a duplex fan assembly. The blower assembly 2900 may be used, for example, in an Re45 G1.0 wind turbine design.

Figure 25:
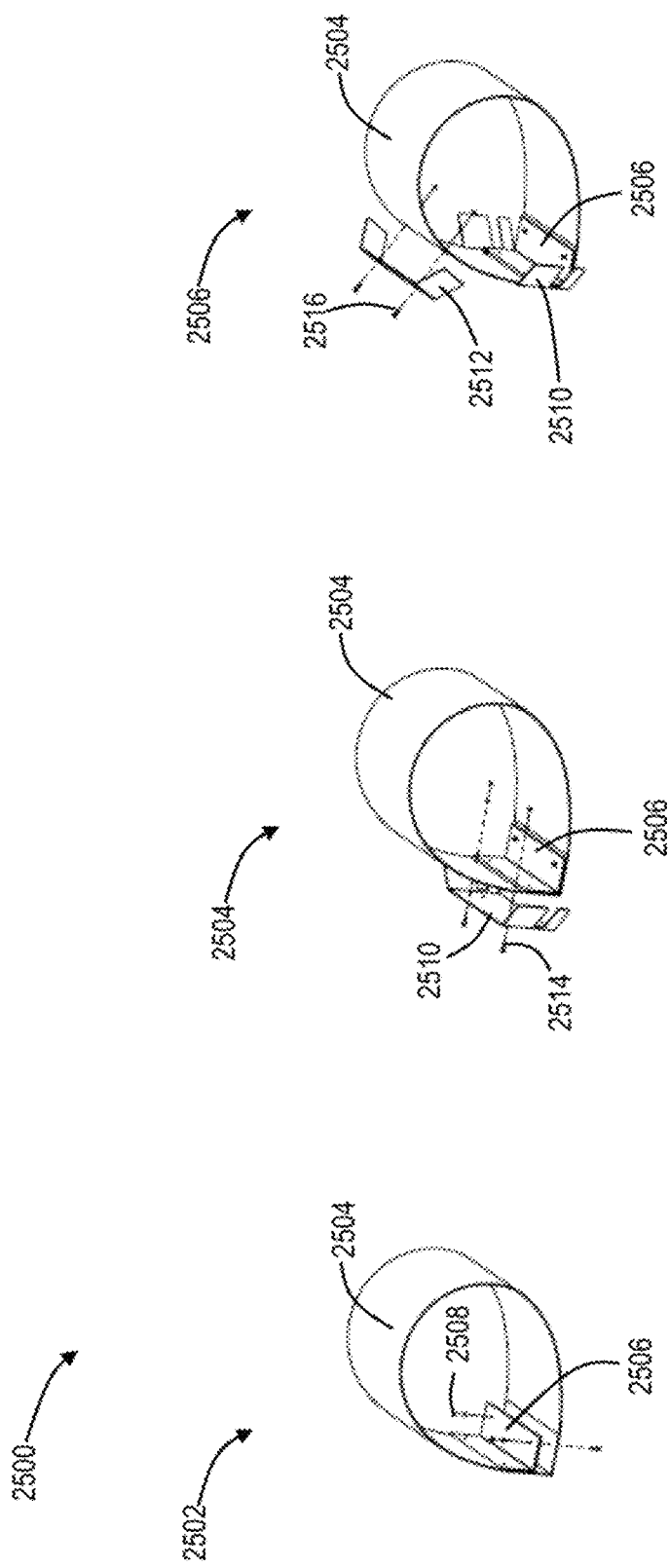
FIG. 25 is schematic diagram of a hoop duct support in various stages of assembly, according to an embodiment.

Referring now to FIG. 25, shown therein is a hoop duct support 2500 in various stages of assembly 2502, 2504, 2506, according to an embodiment. The hoop duct support 2500 may be the duct support 249 of FIG. 2. The assembly sequence shown in FIG. 25 may be used The hoop duct support 2500 may function similarly to the hoop duct support of FIGS. 15A and 15B.

The hoop duct support 2500 includes a hoop component 2504 and an interior bracket component 2506 positioned inside the hoop component 2504. The interior bracket component 2506 is secured to an interior surface of the hoop component 2504 via connectors 2508. The hoop duct assembly 2504 also includes first and second external bracket components 2510, 2512, which are secured to an exterior surface of the hoop component 2504 via connectors 2514, 2516, respectively. The external bracket components 2510, 2512 may be skid plates that help to get through bulkheads in the wind turbine (e.g. bulkhead 166).

Figure 26:
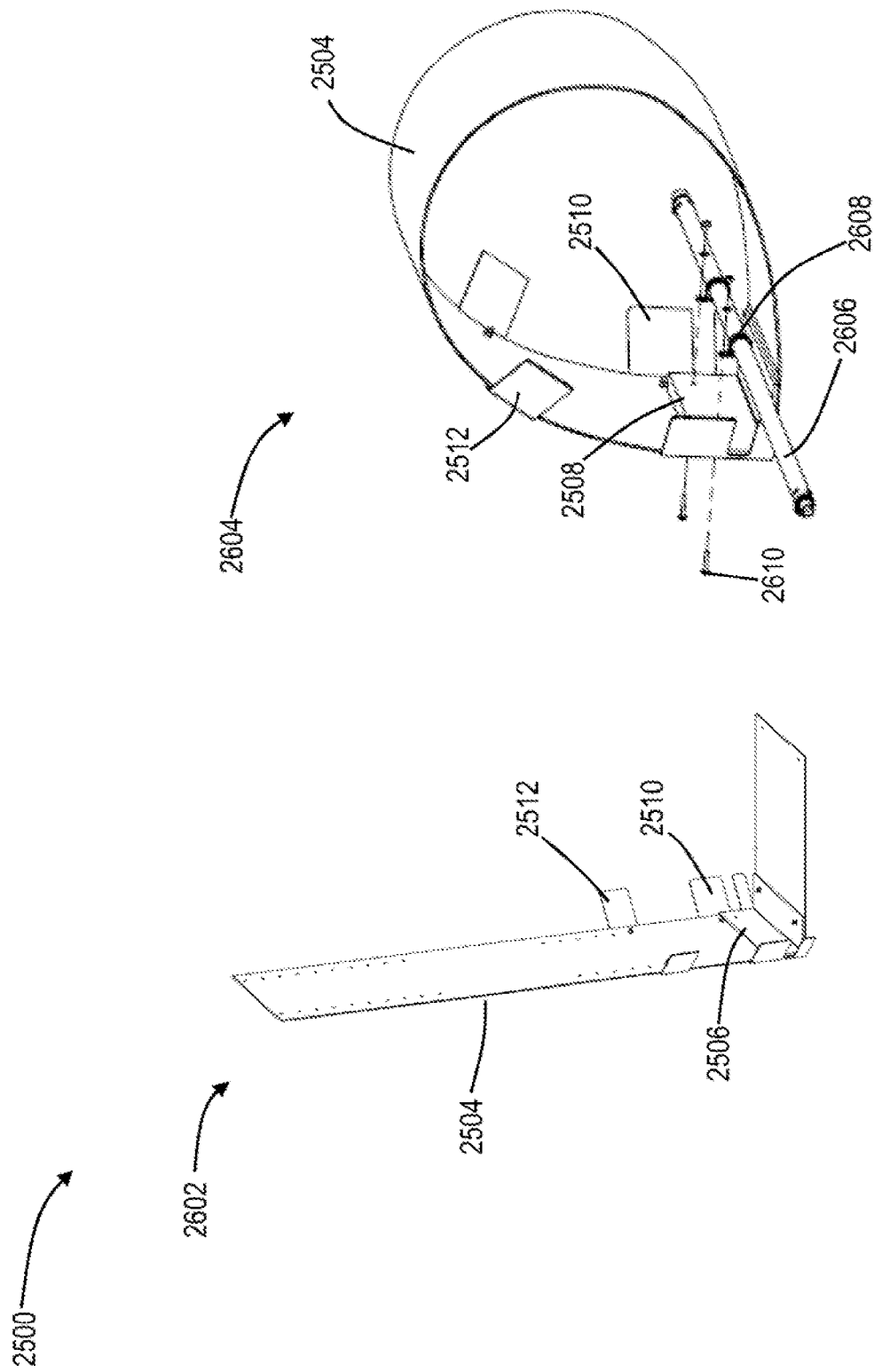
FIG. 26 is a schematic diagram of a hoop duct support in unassembled and assembled configurations, according to an embodiment.

Referring now to FIG. 26, shown therein is the hoop duct support 2500 of FIG. 25 in a preassembled configuration 2602 and an assembled configuration 2604, according to an embodiment. The assembly shown in FIG. 26 may be used in an up-tower assembly. FIG. 26 also includes in the assembled configuration a rod 2606 forming part of a spine (e.g. spine 124 of FIG. 1 or FIG. 15A) of a duct. The rod 2606 is secured to the duct support 2500 via rings 2608, which are secured to the interior bracket component 2508 via connectors 2610.

Referring now to FIGS. 27A and 27B, shown therein is a C-shaped duct support assembly 2700 in non-exploded and exploded views, respectively, according to an embodiment.

The duct support assembly 2700 includes a C-shaped duct support 2702, which includes a first component 2704, a second component 2706, and a third component 2708. The first, second, and third components 2704, 2706, 2708 form roughly a "C" shape when viewed from the side. The duct support assembly 2700 further includes rings 2710. The rings 2710 are connected to the second component 2706 via connectors 2712. The rings 2710 are configured to receive a rod 2714 therethrough, the rod 2714 forming part of the spine of a duct.

A c-shape duct support, such as C-shaped duct support assembly 2700 may be utilized in blades 108 which have their bulkheads 166 removed. Once the bulkheads 166 are removed, there may be a 1" to 3" large lip around the entire edge. The presence of this lip can require the duct support perimeter to change drastically as is passes through. But the space where these duct supports rest when the installation is complete may be too large for the flat supports to properly support the duct during operation. Therefore, a C-shaped duct support is provided which can change perimeter dramatically, but still support the duct in a large cavity. The c-shape support achieves this as it bends into a triangle (small perimeter) while it passes through the bulkhead lip, then expands back into a c-shape (4 or more points of contact with a large effective perimeter).

The c-shape duct supports may be equipped with flanges which act as skid plates to encourage the material to bend while passing through bulkheads 166. The flanges initiate the bending process and therefore should be equal to or larger than the profile of the obstructions.

C-shaped supports, such as support 2702, may be secured to the spine 124 (e.g. rod 2714) using similar hardware methods to those described in reference to FIG. 15 (except 1510*ai* may be removed).

Figure 28A:
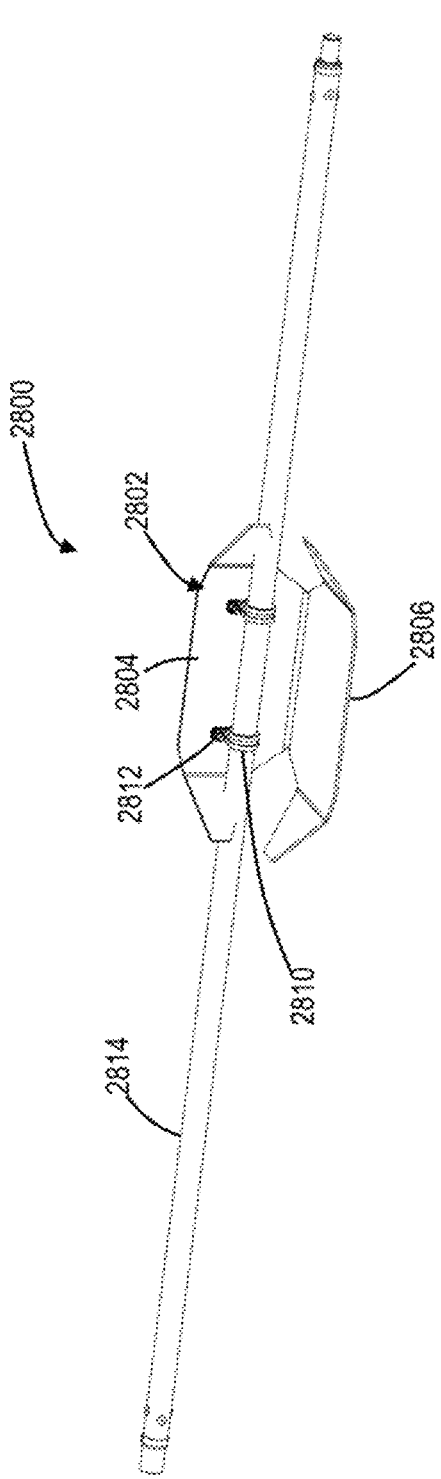
FIGS. 28A and 28B are a schematic diagram of an L-shaped duct support in non-exploded and exploded views, according to an embodiment.
Figure 28B:
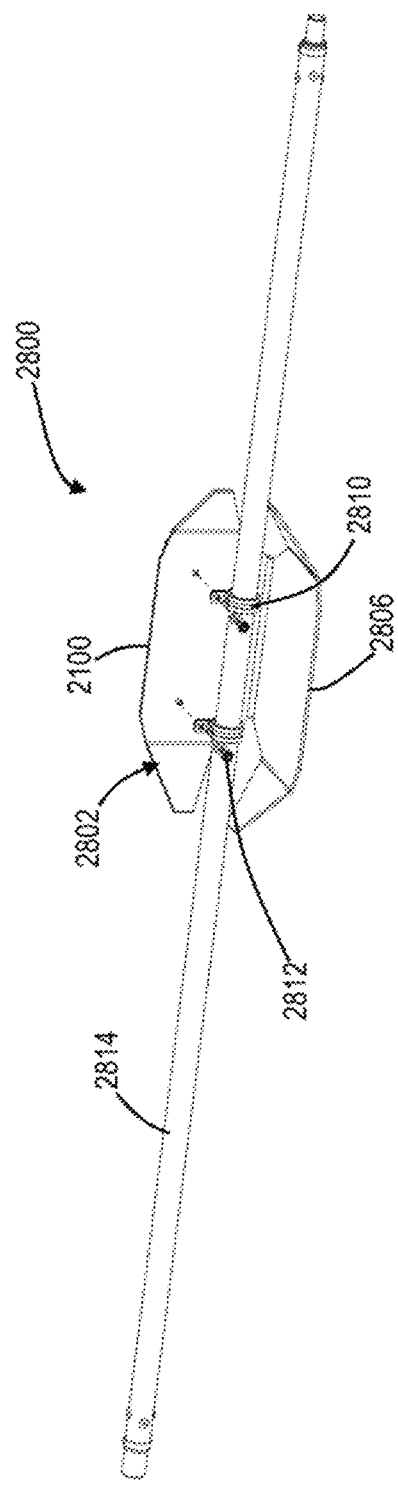

Referring now to FIGS. 28A and 28B, shown therein is an L-shaped duct support assembly 2800 in non-exploded and exploded views, respectively, according to an embodiment.

The duct support assembly 2800 includes an L-shaped duct support 2802, which includes a first component 2804 and a second component 2806. The first and second components 2804, 2806 form roughly an "L" shape when viewed from the side. The duct support assembly 2800 further includes rings 2810. The rings 2810 are connected to the first component 2804 via connectors 2812. The rings 2810 are configured to receive a rod 2814 therethrough, the rod 2814 forming part of the spine of a duct.

While the above description provides examples of one or more apparatus, methods, or systems, it will be appreciated that other apparatus, methods, or systems may be within the scope of the claims as interpreted by one of skill in the art.

The invention claimed is:

1. An ice protection system for heating a wind turbine blade of a wind turbine, the system comprising:
 a heater disposed in an interior of the wind turbine blade, the heater for heating air;
 a blower disposed in the interior of the wind turbine blade and for moving the air across the heater to generate a heated airflow;
 a duct disposed in the interior of the wind turbine blade, the duct for receiving the heated airflow and releasing the heated airflow into the interior of the wind turbine blade; and
 an electrical control subsystem disposed in the wind turbine for controlling one or more components of the ice protection system, wherein the electrical control subsystem includes a blade control panel mounted to a blade-side of a bearing plate positioned at the root of the wind turbine blade where the wind turbine blade meets a hub of the wind turbine, the blade control panel controlling one or more of the components of the ice protection system.

2. The system of claim 1, wherein the electrical control subsystem includes: a hub input-output ("IO") panel mounted to an interior surface of the hub of the wind turbine; a power distribution panel mounted to the interior surface of the hub; and a transformer panel mounted to the interior surface of the hub.

3. The system of claim 1, wherein the electrical control subsystem includes a nacelle panel mounted to an interior surface of a nacelle of the wind turbine.

4. The system of claim 1, wherein the electrical control subsystem includes a blade junction box within the interior of the wind turbine blade and configured to receive signals from at least one sensor in the wind turbine blade and transmit sensor data towards the blade control panel.

5. An ice protection system for heating a wind turbine blade, the system comprising:
 a heater disposed in an interior of the wind turbine blade, the heater for heating air;
 a blower disposed in the interior of the wind turbine blade and for moving the air across the heater to generate a heated airflow;
 a duct disposed in the interior of the wind turbine blade, the duct for receiving the heated airflow and releasing the heated airflow into the interior of the wind turbine blade, the duct having a proximal end and a distal end, wherein the duct includes a plurality of duct outlets positioned between the proximal end and distal end of the duct; and
 an electrical control subsystem disposed in a wind turbine for controlling one or more components of the ice protection system, wherein the electrical control subsystem includes a blade control panel mounted to a blade-side of a bearing plate positioned at the root of the wind turbine blade where the wind turbine blade meets a hub of the wind turbine, the blade control panel controlling one or more of the components of the ice protection system.

6. The system of claim 5, wherein the duct comprises a plurality of duct sections connected together to form a continuous duct.

7. The system of claim 5, wherein the duct is attached to the wind turbine blade at a plurality of attachment points defining an attachment line that extends along a length of the duct and wherein the plurality of duct outlets are positioned to release the heated airflow generally opposite the attachment line.

8. The system of claim 7, wherein the plurality of duct outlets include a first row of duct outlets extending longitudinally along a first side of the duct and a second row of duct outlets extending longitudinally along a second side of the duct, the first and second sides defined by a plane extending from the attachment line through an interior of the duct and bisecting the duct longitudinally into the first and second sides.

9. The system of claim 5, wherein the duct comprises a plurality of longitudinally arranged portions and wherein the portion of the duct nearest the heater is impermeable.

10. The system of claim 5, wherein the plurality of duct outlets includes a subset of duct outlets located in a distal third of the wind turbine blade when the duct is installed in the wind turbine blade.

11. The system of claim 5, wherein the blower is configured to pull air from any one or more of an interior of the hub of the wind turbine, an interior of a nacelle of the wind turbine, and generator exhaust to reduce the amount of heat energy needed to reach a positive Celsius temperature.

12. The system of claim 5, wherein the plurality of duct outlets are positioned circumferentially on the duct to direct the heated airflow towards a leading edge of the wind turbine blade when installed in the wind turbine blade.

13. The system of claim 5, wherein the plurality of duct outlets are positioned along a length of the duct to facilitate release of the heated airflow out of the duct at a plurality of locations along the length of the duct and thus to a plurality of locations along a length of the wind turbine blade, and wherein the plurality of duct outlets are concentrated in a distal third portion of the wind turbine blade.

14. The system of claim 5, further comprising a spine for providing structural support along a length of the duct and comprising a plurality of spine sections connectable to form the spine, a duct support assembly for providing mounting and circumferential support to the duct, and a duct tip constraint for supporting and constraining a distal end of the duct.

15. An ice protection system for heating a wind turbine blade of a wind turbine, the system comprising:
   a heater disposed in an interior of the wind turbine blade, the heater for heating air;
   a blower disposed in the interior of the wind turbine blade and for moving the air across the heater to generate a heated airflow;
   a duct disposed in the interior of the wind turbine blade, the duct for receiving the heated airflow and releasing the heated airflow into the interior of the wind turbine blade;
   and
   a control system for controlling operation of the ice protection system, the control system including:
      a sensor subsystem including at least one sensor for collecting sensor data;
      a processing unit connected to the sensor subsystem and for generating a control signal based on the sensor data, the control signal for adjusting an operating state of at least one component of the ice protection system, wherein the at least one component includes the blower or the heater; and
      an electrical control subsystem disposed in the wind turbine for controlling one or more electrical components of the ice protection system, wherein the electrical control subsystem includes a blade control panel mounted to a blade-side of a bearing plate positioned at the root of the wind turbine blade where the wind turbine blade meets a hub of the wind turbine, the blade control panel controlling one or more of the components of the ice protection system.

16. The system of claim 15, wherein the control system monitors an environmental condition, the environmental condition comprising one or more of (i) an interior environment of the wind turbine blade and (ii) an exterior environment of the wind turbine blade.

17. The system of claim 15, wherein the at least one sensor includes a temperature sensor configured to measure a temperature of air entering or leaving the blower.

18. The system of claim 15, wherein the control system is configured to control operation of the ice protection system based on an RPM measurement of the wind turbine and a measured wind speed data.

19. The system of claim 15, wherein the processing unit is configured to increase an output of the ice protection system upon determining that (i) a temperature of the wind turbine blade is below a reference temperature based on data provided by the sensor subsystem, (ii) a threshold level of ice has accumulated on an exterior surface of the wind turbine blade based on data provided by the sensor subsystem, or (iii) the wind turbine is producing less energy than expected based on a known wind speed.

20. The system of claim 15, wherein the processing unit is further configured to generate an electronic notification upon generating the control signal and send the electronic notification to a technician device.

* * * * *